United States Patent
Nakayama et al.

(10) Patent No.: US 7,337,766 B2
(45) Date of Patent: Mar. 4, 2008

(54) GAS-MIXTURE-IGNITION-TIME ESTIMATION APPARATUS FOR INTERNAL COMBUSTION ENGINE, AND CONTROL APPARATUS FOR INTERNAL COMBUSTION ENGINE

(75) Inventors: Shigeki Nakayama, Susono (JP); Koji Kitano, Susono (JP); Taro Aoyama, Susono (JP); Ryo Hasegawa, Skyttelinjen Lund (SE); Takashi Koyama, Susono (JP); Kazuhisa Inagaki, Komaki (JP); Yoshifumi Wakisaka, Aichi-gun (JP); Matsuei Ueda, Nisshin (JP); Kiyomi Nakakita, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 40 days.

(21) Appl. No.: 10/587,576

(22) PCT Filed: Mar. 24, 2005

(86) PCT No.: PCT/JP2005/006230

§ 371 (c)(1),
(2), (4) Date: Jul. 31, 2006

(87) PCT Pub. No.: WO2005/090768

PCT Pub. Date: Sep. 29, 2005

(65) Prior Publication Data

US 2007/0169748 A1 Jul. 26, 2007

(30) Foreign Application Priority Data

Mar. 24, 2004 (JP) .............................. 2004-086098

(51) Int. Cl.
*F02M 7/00* (2006.01)
*F02D 41/00* (2006.01)
(52) U.S. Cl. ...................................... 123/435; 701/111
(58) Field of Classification Search ........ 123/435–436; 701/110–111
See application file for complete search history.

(56) References Cited

U.S. PATENT DOCUMENTS 6,530,361 B1  3/2003 Shiraishi et al.

FOREIGN PATENT DOCUMENTS

DE  100 32 232 A1  2/2001

(Continued)

*Primary Examiner*—Hai Huynh
(74) *Attorney, Agent, or Firm*—Oliff & Berridge PLC

(57) ABSTRACT

A gas-mixture-ignition-time estimation apparatus for an internal combustion engine estimates the temperature of a premixed gas mixture for PCCI combustion (i.e., cylinder interior temperature Tg), while relating it to the angle CA, on the basis of a state quantity of the cylinder interior gas at the time of start of compression (CAin) (heat energy of the cylinder interior gas at the time of start of compression), the amount of a change in the state quantity of the cylinder interior gas attributable to compression in a compression stroke (minute piston work), and the heat generation quantity of a cool flame generated in PCCI combustion prior to autoignition (hot flame) (cool flame heat generation quantity Aqlto). A time when the cylinder interior temperature Tg reaches a predetermined autoignition start temperature Tig is estimated as an autoignition start time (Caig) of the premixed gas mixture related to PCCI combustion. Since the cool flame heat generation quantity Oqlto is taken into consideration, the autoignition start time related to PCCI combustion can be estimated accurately.

15 Claims, 27 Drawing Sheets

FOREIGN PATENT DOCUMENTS

| | | |
|---|---|---|
| EP | 1 310 649 A1 | 5/2003 |
| EP | 1 365 134 A2 | 11/2003 |
| JP | A 10-238374 | 9/1998 |
| JP | A-11-148412 | 6/1999 |
| JP | A-11-324764 | 11/1999 |
| JP | A 2001-20765 | 1/2001 |
| JP | A 2001-207889 | 8/2001 |
| JP | A-2003-083119 | 3/2003 |
| JP | A-2003-286880 | 10/2003 |
| JP | 2005-273513 * | 10/2005 |
| WO | WO 03/016698 A1 | 2/2003 |

* cited by examiner

GAS-MIXTURE-IGNITION-TIME ESTIMATION APPARATUS FOR INTERNAL COMBUSTION ENGINE, AND CONTROL APPARATUS FOR INTERNAL COMBUSTION ENGINE

TECHNICAL FIELD

The present invention relates to a gas-mixture-ignition-time estimation apparatus for an internal combustion engine, which apparatus estimates a time at which a premixed gas mixture starts autoignition upon compression, wherein the premixed gas mixture is previously formed through mixing of a gas within a combustion chamber (cylinder interior gas) and fuel for PCCI (premixed-charge compression ignition) combustion which is injected into the combustion chamber earlier than the vicinity of compression top dead center (hereinafter referred to as "near compression top dead center").

BACKGROUND ART

In general, in a direct-injection-type internal combustion engine (in particular, a direct-injection-type diesel engine), fuel is injected into a combustion chamber at the near compression top dead center in a state in which the temperature and pressure of the cylinder interior gas have been increased through compression. Consequently, atomized fuel (fuel mist) diffuses within the combustion chamber, and successively autoignites and burns (i.e., diffusion combustion, diesel combustion).

In such diffusion combustion, the fuel concentration of the fuel mist (i.e., excess air ratio $\lambda$ or equivalent ratio $\phi$) becomes nonuniform in the course of diffusion of the fuel mist. Thus, in a region in which the equivalent ratio $\phi$ is near 1 (stoichiometric region), $NO_x$ is produced because of abrupt chemical reaction (heat generation), and in a region in which the equivalent ratio $\phi$ is greater than 1 (rich region), smoke, particulate matter, or the like (hereinafter collectively referred to as "PM") is produced because of deficiency of oxygen.

Conventionally, there have been known various techniques for individually reducing the generation quantities of $NO_x$ and PM. However, a trade-off unavoidably arises between the generation quantities of $NO_X$ and PM, so that when the generation quantity of one of these substances is reduced, the generation quantity of the other substance increases. Therefore, presently, simultaneous reduction of both the generation quantity of $NO_x$ and that of PM is very difficult.

In view of the foregoing, in recent years, there has been proposed a combustion scheme in which fuel is injected into a combustion chamber earlier than the near compression top dead center (in a state in which the cylinder interior gas has relatively low temperature and pressure), and the quantity of EGR gas (EGR ratio) is increased so as to render the ignition delay time relatively long, to thereby cause the premixed gas mixture diffused substantially uniformly within the combustion chamber to autoignite at the near compression top dead center (hereinafter referred to as "premixed combustion" or "PCCI (premixed-charge compression ignition) combustion").

In such PCCI combustion, since the premixed gas mixture having sufficiently and uniformly diffused within the combustion chamber ignites in a generally uniform lean state (state in which the equivalent ratio $\phi$ is less than 1), both $NO_x$ and PM are hardly generated. As a result, both the generation quantity of $NO_x$ and that of PM greatly decrease as compared with the case of the above-mentioned diffusion combustion.

However, when the entirety of the premixed gas mixture having been widely dispersed within the combustion chamber in a generally uniform lean state ignites simultaneously, a relatively loud explosion sound (noise) tends to be generated. This tendency becomes remarkable when the delay time of ignition of the premixed gas mixture is excessively short (accordingly, when autoignition of the premixed gas mixture starts too early). Further, since the premixed gas mixture is dispersed in a generally uniform lean state, misfire tends to occur easily. This tendency becomes remarkable when the delay time of ignition of the premixed gas mixture is excessively long (accordingly, when autoignition of the premixed gas mixture starts too late). In other words, in PCCI combustion, the timing at which autoignition of the premixed gas mixture starts (or the ignition delay time) must be accurately controlled such that the start timing coincides with a predetermined timing or falls within a predetermined range. For this accurate control, the autoignition start time of the premixed gas mixture must be estimated accurately.

In view of the above, a control apparatus for a diesel engine disclosed in Japanese Patent Application Laid-Open (kokai) No. H11-148412 is designed, on the basis of the fact that the ignition delay time is strongly influenced by the compression end temperature of cylinder interior gas, so as to obtain the compression end temperature of the cylinder interior gas, and to estimate the ignition delay time (accordingly, the autoignition start time of the premixed gas mixture) from only the obtained compression end temperature. Further, under the assumption that in the compression stroke the state of the cylinder interior gas causes a polytropic change (adiabatic change), the compression end temperature of the cylinder interior gas is obtained from the cylinder interior gas temperature at the compression start time (time of closure of the intake valve) and a formula representing a general polytropic change.

Incidentally, in the above-described PCCI combustion, a portion of the premixed gas mixture is known to cause a low-temperature oxidation reaction (called "cool flame" in the present specification and the claims) prior to autoignition of the premixed gas mixture (accordingly, generation of a hot flame). When such a cool flame is produced, the temperature of the cylinder interior gas may change greatly because of influence of the quantity of heat generated by the cool flame. Accordingly, the autoignition start time of the premixed gas mixture is considered to greatly depend on the heat generation quantity of the cool flame.

However, the apparatus described in the patent publication estimates the ignition delay time (accordingly, the autoignition start time of the premixed gas mixture) from only the compression end temperature of the cylinder interior gas which is obtained under the assumption that the state of the cylinder interior gas causes a polytropic change in the compression stroke, without consideration of the influence of the heat generation quantity of the cool flame. Accordingly, the conventional apparatus cannot accurately estimate the autoignition start time of the premixed gas mixture.

DISCLOSURE OF THE INVENTION

In view of the foregoing, an object of the present invention is to provide a gas-mixture-ignition-time estimation apparatus for an internal combustion engine, which apparatus can accurately estimate the time of autoignition of a premixed gas mixture for PCCI combustion in consideration of a heat generation quantity of a cool flame generated by a portion of the premixed gas mixture prior to the autoignition.

A gas-mixture-ignition-time estimation apparatus for an internal combustion engine according to the present invention comprises compression-start-time cylinder-interior-gas-state-quantity acquisition means, compression-attributable-cylinder-interior-gas-state-quantity-change-amount estimation means, cool-flame-heat-generation-quantity estimation means, and premixed-gas-mixture-autoignition-start-time estimation means. Hereinafter, these means will be described individually.

The compression-start-time cylinder-interior-gas-state-quantity acquisition means is means for acquiring a state quantity of a cylinder interior gas at the time when compression of the cylinder interior gas starts (that is, the time when an intake valve closes). Examples of the state quantity of the cylinder interior gas include, but are not limited to, temperature, pressure, and internal energy of the cylinder interior gas. The compression-start-time cylinder-interior-gas-state-quantity acquisition means may be means for acquiring the state quantity of the cylinder interior gas at the compression start time by physically detecting the state quantity by use of a sensor, or may be means for acquiring the state quantity by estimating the state quantity through a predetermined calculation.

The compression-attributable-cylinder-interior-gas-state-quantity-change-amount estimation means is means for estimating the amount of a change in the state quantity of the cylinder interior gas attributable to compression of the cylinder interior gas in a compression stroke. The compression-attributable-cylinder-interior-gas-state-quantity-change-amount estimation means may be means for estimating the amount of a change in the state quantity of the cylinder interior gas under an assumption that the state of the cylinder interior gas in the compression stroke changes adiabatically or means for calculating an amount of work that the piston performs against the cylinder interior gas in the compression stroke and for estimating the amount of a change in the state quantity of the cylinder interior gas by making use of the fact that the internal energy of the cylinder interior gas changes (increases) because of the amount of the work.

The cool-flame-heat-generation-quantity estimation means is means for estimating a cool-flame-heat-generation-quantity-corresponding value, which is a value corresponding to the heat generation quantity of a cool flame generated prior to autoignition of the premixed gas mixture. Examples of the cool-flame-heat-generation-quantity-corresponding value include the quantity of heat generated by a cool flame (heat generation energy) itself or an increase in temperature of the cylinder interior gas arising from the cool flame heat generation.

The cool flame heat generation quantity is known to be a value which is strongly influenced by the injection quantity of fuel for PCCI combustion, the nature (e.g., cetane number) of the fuel, the oxygen concentration of an intake gas taken into a combustion chamber, and the density of the cylinder interior gas at the cool flame start time. Accordingly, the cool-flame-heat-generation-quantity estimation means is preferably configured to estimate the cool-flame-heat-generation-quantity-corresponding value on the basis of at least the injection quantity of fuel for PCCI combustion, the nature of the fuel, the oxygen concentration of the intake gas taken into the combustion chamber, and the density of the cylinder interior gas.

The premixed-gas-mixture-autoignition-start-time estimation means is means for estimating a time at which a premixed gas mixture previously formed through mixing of fuel for PCCI combustion and the cylinder interior gas starts autoignition (hot flame) because of compression. This means is configured to estimate the premixed-gas-mixture autoignition start time on the basis of at least the acquired compression-start-time cylinder interior gas state quantity, the estimated compression-attributable interior gas state quantity change amount, and the estimated cool-flame-heat-generation-quantity-corresponding value. The premixed-gas-mixture-autoignition-start-time estimation means may be configured to estimate the premixed-gas-mixture autoignition start time in consideration of latent heat generated when (liquid) fuel injected changes to fuel vapor during the compression stroke, the heat energy of the fuel vapor itself, and loss energy transferred from the cylinder interior gas to the inner wall of the combustion chamber because of contact between the cylinder interior gas (premixed gas mixture) and the inner wall of the combustion chamber.

By means of the premixed-gas-mixture-autoignition-start-time estimation means, the state quantity of the cylinder interior gas which may change momentarily because of compression after the compression start time (i.e., intake valve closed time) can be obtained from the acquired compression-start-time cylinder interior gas state quantity and the estimated compression-attributable interior gas state quantity change amount. After generation of a cool flame, the state quantity of the cylinder interior gas is obtained in consideration of the estimated cool-flame-heat-generation-quantity-corresponding value. Since the premixed-gas-mixture autoignition start time is estimated on the basis of the state quantity (e.g., temperature) of the cylinder interior gas obtained in consideration of the cool frame heat generation quantity, the autoignition start time of the premixed gas mixture can be estimated accurately.

In this case, preferably, the premixed-gas-mixture-autoignition-start-time estimation means includes premixed-gas-mixture-temperature estimation means for estimating the temperature of the premixed gas mixture on the basis of at least the acquired compression-start-time cylinder interior gas state quantity, the estimated compression-attributable interior gas state quantity change amount, and the estimated cool-flame-heat-generation-quantity-corresponding value, and estimates, as the premixed-gas-mixture autoignition start time, a time when the estimated temperature of the premixed gas mixture reaches a predetermined value.

Various experiments, etc., have revealed that each of the cool flame and autoignition (hot flame) of the premixed gas mixture successively starts when the temperature of the premixed gas mixture (cylinder interior gas), which increases as a result of compression during the compression stroke, reaches a corresponding predetermined temperature (temperature corresponding to start of cool flame and temperature corresponding to start of autoignition). Accordingly, through employment of the above-described configuration for estimating, as the premixed-gas-mixture autoignition start time, the time at which the temperature of the premixed gas mixture estimated as the state quantity of the cylinder interior gas reaches a predetermined temperature (temperature corresponding to start of autoignition), the premixed-gas-mixture autoignition start time can be accurately estimated in a simple manner.

Preferably, any one of the gas-mixture-ignition-time estimation apparatuses according to the present invention comprises adhesion quantity estimation means for estimating a quantity of fuel which adheres to the inner wall surface of the combustion chamber at the cool flame start time, the fuel being a portion of fuel injected (directly) into the combustion chamber for PCCI combustion, and the cool-flame-heat-generation-quantity estimation means is configured to estimate the cool-flame-heat-generation-quantity-corresponding value in consideration of the estimated adhesion quantity. The fuel adhesion quantity is strongly influenced by, for example, the fuel injection quantity, the cylinder interior gas density at the time of injection, and the effective injection pressure (the difference between the injection pressure and the cylinder interior gas pressure at the time of injection). Accordingly, the adhesion quantity estimation means is preferably configured to estimate the fuel adhesion quantity on the basis of at least the fuel injection quantity for PCCI combustion, the cylinder interior gas density at the time of injection, and the effective injection pressure.

In the case where a portion of fuel injected for PCCI combustion at an early timing adheres to the inner wall surface of the combustion chamber (e.g., the side wall surface of the cylinder, the top surface of the piston, etc.) while maintaining the liquid form, the fuel adhering to the inner wall surface of the combustion chamber until the cool flame start time does not cause low temperature oxidation reaction (cool flame) even when the cylinder interior gas temperature reaches a temperature which corresponds to the start of the above-mentioned cool flame and which is relatively low, in part because the temperature of the fuel drops as a result of heat loss generated upon contact with the combustion chamber wall of low temperature. In other words, of the injected fuel, the fuel adhering to the inner wall surface of th e combustion chamber at the cool flame start time does not contribute to the cool flame heat generation.

Accordingly, through employment of the configuration for estimating the cool-flame-heat-generation-quantity-corresponding value in consideration of the quantity of fuel adhering to the inner wall surface of the combustion chamber at the cool flame start time, it becomes possible to correct the cool flame heat generation quantity—which is estimated under the assumption that the entirety of injected fuel contributes to the cool flame heat generation—by multiplying the cool flame heat generation quantity by a ratio of the quantity of fuel which does not adhere to the inner wall surface of the combustion chamber at the cool flame start time to the (entire) fuel injection quantity (i.e., the ratio of fuel actually contributing to the cool flame heat generation). Accordingly, the cool flame heat generation quantity can be estimated more accurately, and as a result, the premixed-gas-mixture autoignition start time can be estimated more accurately.

Preferably, any one of the gas-mixture-ignition-time estimation apparatuses according to the present invention comprises dispersion degree estimation means for estimating a value which represents the degree to which the premixed gas mixture disperses to the vicinity of the inner wall surface of the combustion chamber at the cool flame start time, on the basis of a time elapsed between start of injection of fuel for PCCI combustion into the combustion chamber and start of the cool flame, and the cool-flame-heat-generation-quantity estimation means is configured to estimate the cool-flame-heat-generation-quantity-corresponding value in consideration of the estimated value representing the degree of dispersion.

Of the premixed gas mixture within the combustion chamber, the premixed gas mixture which disperses to the vicinity of the inner wall surface of the combustion chamber (e.g., the vicinity of the side wall surface of the cylinder) at the cool flame start time does not cause low temperature oxidation reaction (cool flame), as in the case of the fuel adhering to the inner wall surface of the combustion chamber, even when the cylinder interior gas temperature (the temperature of the premixed gas mixture which does not disperse in the vicinity of the inner wall surface of the combustion chamber) reaches a temperature which corresponds to the start of the above-mentioned cool flame, because the temperature drops as a result of heat loss generated upon contact with the combustion chamber wall of low temperature. In other words, of the premixed gas mixture within the combustion chamber, the premixed gas mixture which is present in a dispersed state in the vicinity of the inner wall surface of the combustion chamber at the cool flame start time does not contribute to the cool flame heat generation. Meanwhile, the degree to which the premixed gas mixture disperses to the vicinity of the inner wall surface of the combustion chamber until the cool flame start time increases with the elapsed time from the fuel injection start time to the cool flame start time.

As is understood from the above, through employment of the above-described configuration which estimates the cool-flame-heat-generation-quantity-corresponding value in consideration of the value representing the degree to which the premixed gas mixture disperses to the vicinity of the inner wall surface of the combustion chamber until the cool flame start time, which degree is estimated on the basis of the elapsed time from the fuel injection start time to the cool flame start time, it becomes possible to correct the cool flame heat generation quantity—which is estimated under the assumption that the entirety of the premixed gas mixture within the combustion chamber (i.e., the entirety of the injected fuel) contributes to the cool flame heat generation—such that the cool flame heat generation quantity decreases with an increase in the degree to which the premixed gas mixture disperses to the vicinity of the inner wall surface of the combustion chamber until the cool flame start time. Accordingly, the cool flame heat generation quantity can be estimated more accurately, and as a result, the premixed-gas-mixture autoignition start time can be estimated more accurately.

Preferably, the gas-mixture-ignition-time estimation apparatus according to the present invention including the premixed-gas-mixture-temperature estimation means further comprises nonuniformity degree estimation means for estimating a value representing the degree of nonuniformity of the premixed gas mixture at the cool flame start time, and the premixed-gas-mixture-temperature estimation means is configured to estimate the temperature of the premixed gas mixture in consideration of the value representing the degree of nonuniformity (in fuel concentration) of the premixed gas mixture. Since the degree of nonuniformity of the premixed gas mixture within the combustion chamber at the cool flame start time is influenced by, for example, the elapsed time between the fuel injection start time and the cool flame start time, the above-mentioned effective injection pressure, the swirl flow rate, the nature of fuel (e.g., fuel density), the value representing the degree of nonuniformity of the premixed gas mixture at the cool flame start time is preferably determined in consideration of these values.

Even in the case where the premixed gas mixture within the combustion chamber is generally uniformly dispersed in a lean state, in actuality, its fuel concentration is nonuniform to some degree. Further, the temperature of the premixed gas mixture after generation of a cool flame (the flame temperature of the cool flame) tends to become higher in a zone in which the fuel concentration is high. Accordingly, the greater the degree of nonuniformity (in fuel concentration)

of the premixed gas mixture at the cool flame start time, the higher the maximum value in the fuel concentration distribution at the cool flame start time and the higher the highest temperature in the temperature distribution of the premixed gas mixture after generation of a cool flame.

Meanwhile, in actuality, the autoignition (hot flame) of the premixed gas mixture is considered to start when the highest temperature in the temperature distribution of the premixed gas mixture reaches a temperature corresponding to start of the autoignition. Accordingly, the premixed-gas-mixture autoignition start time is influenced by the nonuniformity degree of the premixed gas mixture at the cool flame start time, and tends to become earlier as the nonuniformity degree increases.

As is understood from the above, through employment of the above-described configuration which estimates the temperature of the premixed gas mixture in consideration of the value representing the nonuniformity degree of the premixed gas mixture at the cool flame start time, it becomes possible to correct the temperature of the premixed gas mixture—which is estimated under the assumption that the premixed gas mixture within the combustion chamber is uniformly disperse—such that the temperature of the premixed gas mixture increases with an increasing degree of nonuniformity of the premixed gas mixture at the cool flame start time. In other words, the highest temperature in the temperature distribution of the premixed gas mixture after the cool flame start time can be estimated as the temperature of the premixed gas mixture. As a result, since the premixed-gas-mixture autoignition start time can be estimated on the basis of the highest temperature in the temperature distribution of the premixed gas mixture, the premixed-gas-mixture autoignition start time can be estimated more accurately.

In any one of the gas-mixture-ignition-time estimation apparatuses according to the present invention, the premixed-gas-mixture-autoignition-start-time estimation means is preferably configured to complete estimation of the premixed-gas-mixture autoignition start time at a predetermined point in time after start of compression of the cylinder interior gas and before start of injection of fuel for PCCI combustion. In this case, the predetermined point in time is preferably immediately after start of compression of the cylinder interior gas.

As described previously, in the case of PCCI combustion, there exists a range for the premixed-gas-mixture autoignition start time in which problems such as generation of loud noise and misfire do not occur and which is suitable for PCCI combustion (hereinafter called the "PCCI control performable range"). Such PCCI control performable range changes depending on the operation state of the engine (e.g., the speed of the engine, the fuel injection quantity, and the equivalent ratio of the premixed gas mixture). The relation between the operation state of the engine and the PCCI control performable range can be acquired in the form of data (specifically, a map, table, or the like) through, for example, an experiment in which the engine is operated in different steady operation states.

Meanwhile, in the case where the autoignition start time of the premixed gas mixture in the present operation cycle falls within the PCCI control performable range, the following fuel injection mode is preferably employed. That is, the entirety of fuel of a demanded fuel injection quantity determined in accordance with the operation state in the present operation cycle (specifically, the steady-state suitable value of the fuel injection quantity) is injected as fuel for PCCI combustion earlier than the near compression top dead center. In the case where the autoignition start time of the premixed gas mixture in the present operation cycle falls outside the PCCI control performable range, a different fuel injection mode is preferably employed in the present operation cycle. In other words, the fuel injection mode in the present operation cycle is preferably changed (controlled) immediately, depending on whether the autoignition start time of the premixed gas mixture in the present operation cycle falls within the PCCI control performable range. In order to perform such change (control), for the case where the entirety of fuel of the above-mentioned demanded fuel injection quantity is assumed to be injected for PCCI combustion earlier than the near compression top dead center, the estimation of the premixed-gas-mixture autoignition start time in the present operation cycle must be completed at least before start of injection of the fuel for PCCI combustion.

As is understood from the above, through employment of the above-described configuration which completes the estimation of the premixed-gas-mixture autoignition start time at a predetermined point in time after start of compression of the cylinder interior gas and before start of injection of fuel for PCCI combustion (for the case where the entirety of fuel of the above-mentioned demanded fuel injection quantity is assumed to be injected for PCCI combustion earlier than the near compression top dead center), it becomes possible to immediately change (control) the fuel injection mode in the present operation cycle in accordance with the result of estimation of the premixed-gas-mixture autoignition start time in the present operation cycle.

Specifically, the control apparatus for an internal combustion engine according to the present invention, which apparatus can immediately change the fuel injection mode in the present operation cycle in accordance with the result of estimation of the premixed-gas-mixture autoignition start time in the present operation cycle, comprises data storage means for storing data (map, table, etc.) which define the relation between an operation state quantity of the internal combustion engine and the above-mentioned PCCI control performable range (for the case where the engine is in a steady operation state); operation state quantity acquisition means for acquiring the operation state quantity of the engine; determination means for determining whether the premixed-gas-mixture autoignition start time in the present operation cycle estimated by means of the gas-mixture-ignition-time estimation apparatus falls within the PCCI control performable range obtained on the basis of the acquired operation state quantity of the engine and the data; and fuel injection mode control means for controlling the fuel injection mode in the present operation cycle on the basis of the results of determination by the determination means.

In this case, the control apparatus preferably includes data correction means for correcting the data in accordance with at least one of the oxygen concentration of the intake gas taken into the combustion chamber and the quantity of a gas within the combustion chamber when the engine is in a transitional operation state. It is known that the PCCI control performable range changes depending on whether the engine is in a transitional operation state or a steady operation state, even when the parameter values (instantaneous values) representing the operation state of the engine are the same. It is also known that the trend of change of the PCCI control performable range changes in accordance with at least the oxygen concentration of the intake gas taken into the combustion chamber and the quantity (mass) of the gas within the combustion chamber.

As is understood from above, by virtue of the above-described configuration, when the engine is in a transitional operation state, the data can be corrected in such a manner that the data enable more accurate determination as to whether the estimated premixed-gas-mixture autoignition start time in the present operation cycle falls within the PCCI control performable range. Accordingly, when the engine is in a transitional operation state, the fuel injection mode in the present operation cycle can be controlled more properly.

In the control apparatus according to the present invention, preferably, the fuel injection mode control means operates as follows. When the estimated premixed-gas-mixture autoignition start time in the present operation cycle falls within the obtained PCCI control performable range, the engine is in a state suitable for PCCI combustion. Therefore, the fuel injection mode control means injects into the combustion chamber the entirety of fuel of a demanded fuel injection quantity determined in accordance with the operation state (e.g., the steady-state suitable value) determined in accordance with the operation state quantity as fuel for PCCI combustion earlier than the near compression top dead center (in the present operation cycle) as described previously. With this operation, PCCI combustion occurs for the entire quantity of the injected fuel, and the generation quantities of $NO_x$ and PM greatly decrease as compared to the case of diffusion combustion.

Moreover, when the estimated premixed-gas-mixture autoignition start time in the present operation cycle deviates from the obtained PCCI control performable range in the delaying direction, a misfire may occur as described above. Therefore, the fuel injection mode control means injects into the combustion chamber the entirety of fuel of the demanded fuel injection quantity (e.g., the steady-state suitable value) as fuel for diffusion combustion at the near compression top dead center (in the present operation cycle). This is because, in the case of diffusion combustion, the fuel concentration (i.e., the equivalent ratio $\phi$) of fuel mist becomes nonuniform, and therefore, there exists within the combustion chamber a rich region in which the equivalent ratio $\phi$ is greater than 1 and autoignition easily occurs. With this operation, diffusion combustion occurs for (substantially) the entirety of the injected fuel, and therefore occurrence of misfire can be prevented without fail, although the generation quantities of $NO_x$ and PM cannot be reduced.

Meanwhile, when the estimated premixed-gas-mixture autoignition start time in the present operation cycle deviates from the obtained PCCI control performable range in the advancing direction, a loud noise may be generated as described above. Here, the PCCI control performable range tends to move to an earlier time as the quantity of fuel injected for PCCI combustion decreases (the details will be described later). Accordingly, in this case, when the quantity of fuel injected for PCCI combustion is set to a predetermined quantity smaller than the demanded fuel injection quantity, the estimated premixed-gas-mixture autoignition start time in the present operation cycle can be brought into the PCCI control performable range.

That is, in this case, preferably, of the demanded fuel injection quantity (e.g., the steady-state suitable value) of fuel, a predetermined quantity of fuel is injected as fuel for PCCI combustion earlier than the near compression top dead center (in the present operation cycle), and the remaining quantity of fuel is injected as fuel for diffusion combustion at the near compression top dead center (in the present operation cycle). Further, the predetermined quantity is preferably set to a fuel injection quantity for premixed-charge compression ignition combustion which is necessary to bring the premixed-gas-mixture autoignition start time to the obtained PCCI control performable range. With this operation, the effect of reducing the quantities of $NO_x$ and PM generated because of PCCI combustion can be maximized without generation of loud noise or occurrence of misfire.

Preferably, any of the control apparatus according to the present invention comprises a nonuniformity degree estimation means for estimating a value representing the degree of nonuniformity of the premixed gas mixture at the time of start of the cool flame, and the determination means performs the above-described determination in consideration of the value representing the nonuniformity degree of the premixed gas mixture.

As described previously, even in the case of the premixed gas mixture within the combustion chamber substantially uniformly dispersed in a lean state, in actuality, its fuel concentration (i.e., the equivalent ratio $\phi$) involves some degree of nonuniformity. Meanwhile, as described previously, the PCCI control performable range changes in accordance with the operation state of the engine; in particular, the equivalent ratio $\phi$ of the premixed gas mixture. In actuality, the value of the equivalent ratio $\phi$, which determines the PCCI control performable range, is considered to be the maximum value of the equivalent ratio $\phi$ of the premixed gas mixture nonuniformly dispersed within the combustion chamber, and the maximum value of the equivalent ratio $\phi$ depends on the nonuniformity degree of the premixed gas mixture at the cool flame start time.

In view of the foregoing, through employment of a configuration which performs the determination as to whether the estimated premixed-gas-mixture autoignition start time in the present operation cycle falls within the obtained PCCI control performable range in consideration of the value representing the nonuniformity degree of the premixed gas mixture, it becomes possible to obtain the maximum value of the equivalent ratio $\phi$ of the premixed gas mixture on the basis of, for example, the value of the equivalent ratio $\phi$ of the premixed gas mixture estimated under the assumption that the premixed gas mixture within the combustion chamber is uniformly dispersed and from the nonuniformity degree of the premixed gas mixture at the cool flame start time, and to determine the PCCI control performable range on the basis of the maximum value of the equivalent ratio $\phi$ of the premixed gas mixture. As a result, since the PCCI control performable range can be determined more accurately, the manner of fuel injection in the present operation cycle can be controlled more properly.

In place of the above-described configuration, the fuel injection mode control means may have a configuration for achieving the following operation. When the estimated premixed-gas-mixture autoignition start time in the present operation cycle falls within the obtained PCCI control performable range, the entirety of fuel of the demanded fuel injection quantity determined in accordance with the operation state quantity is injected into the combustion chamber as fuel for premixed-charge compression ignition combustion from a predetermined injection start time (e.g., a steady-state suitable time) which is determined in accordance with the operation state quantity and is earlier than the near compression top dead center (in the present operation cycle). When the estimated premixed-gas-mixture autoignition start time in the present operation cycle falls outside the obtained PCCI control performable range, the predetermined injection start time is corrected in order to bring the actual premixed-gas-mixture autoignition start time in the present operation cycle into the obtained PCCI control performable range, and the entirety of fuel of the demanded fuel injection quantity determined in accordance with the operation state quantity is injected into the combustion chamber as fuel for premixed-charge compression ignition combustion from the corrected injection start time (in the present operation cycle).

As described previously, when the elapsed time from the fuel injection start time to the cool flame start time increases, the degree to which the premixed gas mixture disperses to the vicinity of the inner wall surface of the combustion chamber until the cool flame start time increases, and as a result, the portion of the premixed gas mixture contributing to the cool fame heat generation tends to decrease, with a resultant decrease in the cool flame heat generation quantity. Moreover, the smaller the cool flame heat generation quantity, the lower the temperature of the premixed gas mixture after generation of the cool flame and the greater the degree to which the autoignition start time of the premixed gas mixture delays.

In other words, through adjustment of the elapsed time from the fuel injection start time to the cool flame start time, the autoignition start time of the premixed gas mixture can be adjusted. Accordingly, even when the estimated premixed-gas-mixture autoignition start time in the present operation cycle is determined to fall outside the PCCI control performable range, (in some cases) the actual premixed-gas-mixture autoignition start time in the present operation cycle can be controlled to the PCCI control performable range through adjustment of the elapsed time from the fuel injection start time to the cool flame start time in the present operation cycle.

Meanwhile, in general, the elapsed time from the fuel injection start time to the cool flame start time tends to increase as the fuel injection start time becomes earlier. Therefore, the elapsed time from the fuel injection start time to the cool flame start time can be adjusted through adjustment of the fuel injection start time.

As is understood from the above, in the case where the control apparatus is configured as described above, even when the estimated premixed-gas-mixture autoignition start time in the present operation cycle is determined to fall outside the PCCI control performable range, (in some cases) through control of the fuel injection time for PCCI combustion in the present operation cycle, the entirety of fuel of the demanded fuel injection quantity determined in accordance with the operation state quantity can be injected into the combustion chamber as fuel for PCCI combustion earlier than the near compression top dead center (in the present operation cycle). In an increased number of cases, PCCI combustion can be performed for the entirety of the demanded fuel injection quantity without occurrence of problems such as loud noise and misfire. Consequently, the generation quantities of $NO_x$ and PM can be reduced in an increased number of cases.

In place of the above-described configuration, the fuel injection mode control means may have a configuration for achieving the following operation. When the estimated premixed-gas-mixture autoignition start time in the present operation cycle falls within the obtained PCCI control performable range, the entirety of fuel of the demanded fuel injection quantity determined in accordance with the operation state quantity is injected into the combustion chamber as fuel for premixed-charge compression ignition combustion earlier than the near compression top dead center and under a predetermined injection pressure (e.g., steady-state suitable pressure) determined in accordance with the operation state quantity. When the estimated premixed-gas-mixture autoignition start time in the present operation cycle falls outside the obtained PCCI control performable range, the predetermined injection pressure is corrected in order to bring the actual premixed-gas-mixture autoignition start time in the present operation cycle into the obtained PCCI control performable range, and the entirety of fuel of the demanded fuel injection quantity determined in accordance with the operation state quantity is injected into the combustion chamber as fuel for premixed-charge compression ignition combustion earlier than the near compression top dead center and under the corrected predetermined injection pressure.

In general, in the case where the load of the engine is relatively high, the premixed-gas-mixture autoignition start time tends to advance as the fuel injection pressure increases. This tendency occurs mainly because of the fact that the higher the fuel injection pressure, the higher the speed (evaporation speed) at which liquid fuel is atomized. Moreover, in the case where the load of the engine is relatively low, the premixed-gas-mixture autoignition start time tends to become earlier as the fuel injection pressure decreases. This is mainly based on the fact that the lower the fuel injection pressure, the greater the degree to which the excess dispersion of the premixed gas mixture is suppressed (i.e., the greater the degree of nonuniformity of the premixed gas mixture), whereby the autoignition start time advances as described above.

Accordingly, even when the estimated premixed-gas-mixture autoignition start time in the present operation cycle is determined to deviate from the PCCI control performable range in the delaying direction (i.e, a misfire is determined to occur), (in some cases) the actual premixed-gas-mixture autoignition start time in the present operation cycle can be controlled to the PCCI control performable range through adjustment of the fuel injection pressure of fuel for PCCI combustion in the present operation cycle in accordance with the load state of the engine.

As is understood from the above., in the case where the control apparatus is configured as described above, even when the estimated premixed-gas-mixture autoignition start time in the present operation cycle is determined to deviate from the PCCI control performable range (specifically, deviate in the delaying direction), (in some cases) through adjustment of the fuel injection pressure for PCCI combustion in the present operation cycle in accordance with the load state of the engine, the entirety of fuel of the demanded fuel injection quantity determined in accordance with the operation state quantity can be injected into the combustion chamber as fuel for PCCI combustion earlier than the near compression top dead center (in the present operation cycle). This configuration also enables PCCI combustion to be performed for the entirety of the demanded fuel injection quantity in an increased number of cases without occurrence of problems such as loud noise and misfire. Consequently, the generation quantities of $NO_x$ and PM can be reduced in an increased number of cases.

Moreover, in place of the above-described fuel injection mode control means, any of the above-described control apparatuses according to the present invention may comprise premixed-gas-mixture temperature adjustment means. When the estimated premixed-gas-mixture autoignition start time in the present operation cycle deviates from the obtained PCCI control performable range, the premixed-gas-mixture temperature adjustment means (forcedly) increases or lowers the temperature of the premixed gas mixture in the present operation cycle by a predetermined amount in order to bring the actual premixed-gas-mixture autoignition start time in the present operation cycle into the PCCI control performable range.

In general, the higher the temperature of the premixed gas mixture at a certain point in the compression stroke, the greater the degree to which the autoignition start time of the premixed gas mixture advances. Accordingly, when the premixed-gas-mixture autoignition start time in the present operation cycle is determined to deviate from the PCCI control performable range in the delaying direction (i.e., a misfire is determined to occur), the actual premixed-gas-mixture autoignition start time in the present operation cycle can be controlled to the PCCI control performable range by forcedly increasing the temperature of the premixed gas mixture in the present operation cycle.

Meanwhile, when the premixed-gas-mixture autoignition start time in the present operation cycle is determined to deviate from the PCCI control performable range in the advancing direction (i.e., loud noise is determined to be generated), the actual premixed-gas-mixture autoignition start time in the present operation cycle can be controlled to the PCCI control performable range by forcedly lowering the temperature of the premixed gas mixture in the present operation cycle.

As is understood from the above, by virtue of the above-described premixed-gas-mixture temperature adjustment means, even when the estimated premixed-gas-mixture autoignition start time in the present operation cycle is determined to deviate from the PCCI control performable range, the actual premixed-gas-mixture autoignition start time in the present operation cycle can be forcedly controlled to the PCCI control performable range. This configuration also enables PCCI combustion to be performed for the entirety of the demanded fuel injection quantity in an increased number of cases without occurrence of problems such as loud noise and misfire. Consequently, the generation quantities of $NO_x$ and PM can be reduced in an increased number of cases.

Notably, when the temperature of the premixed gas mixture must be forcedly increased, the premixed-gas-mixture temperature adjustment means increases the quantity of the cylinder interior gas by, for example, newly injecting a predetermined gas into the combustion chamber, increases the compression ratio of the engine, or heats the combustion chamber by use of a glow plug. When the temperature of the premixed gas mixture must be forcedly lowered, the premixed-gas-mixture temperature adjustment means decreases the quantity of the cylinder interior gas by, for example, releasing a portion of the cylinder interior gas to the outside of the combustion chamber, lowers the compression ratio of the engine, or newly injects a cooling medium (e.g., water) into the combustion chamber.

BEST MODE FOR CARRYING OUT THE INVENTION

With reference to the drawings, there will now be described a control apparatus of an internal combustion engine (diesel engine) (hereinafter simply referred to as the "engine control apparatus"), which apparatus includes a gas-mixture-ignition-time estimation apparatus for an internal combustion engine of the present invention.

Figure 1:
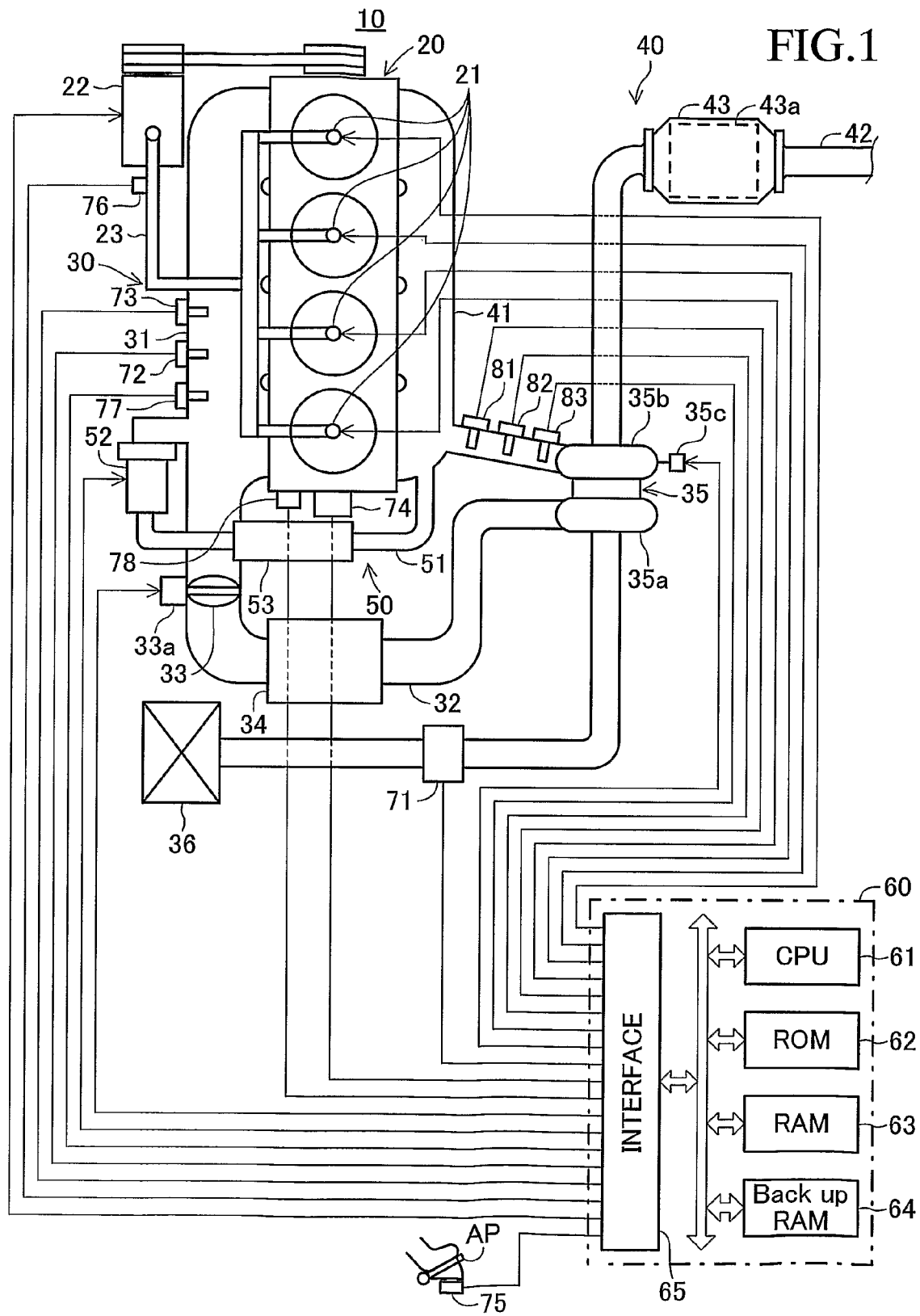
FIG. 1 a schematic diagram showing the overall configuration of a system in which an control apparatus containing a gas-mixture-ignition-time estimation apparatus for an internal combustion engine according to an embodiment of the present invention is applied to a four-cylinder internal combustion engine (diesel engine)

FIG. 1 schematically shows the entire configuration of a system in which the engine control apparatus of the present invention is applied to a four-cylinder internal combustion engine (diesel engine) 10. This system comprises an engine main body 20 including a fuel supply system; an intake system 30 for introducing gas to combustion chambers (cylinder interiors) of individual cylinders of the engine main body 20; an exhaust system 40 for discharging exhaust gas from the engine main body 20; an EGR apparatus 50 for performing exhaust circulation; and an electronic control apparatus 60.

Fuel injection valves (injection valves, injectors) 21 are disposed above the individual cylinders of the engine main body 20. The fuel injection valves 21 are connected via a fuel line 23 to a fuel injection pump 22 connected to an unillustrated fuel tank. The fuel injection pump 22 is electrically connected to the electronic control apparatus 60. In accordance with a drive signal from the electronic control apparatus 60 (an instruction signal corresponding to an instruction fuel injection pressure Pcr to be described later), the fuel injection pump 22 pressurizes fuel in such a manner that the actual injection pressure (discharge pressure) of fuel becomes equal to the instruction fuel injection pressure Pcr.

Thus, fuel pressurized to the fuel injection pressure Pcr is supplied from the fuel injection pump 22 to the fuel injection valves 21. Moreover, the fuel injection valves 21 are electrically connected to the electronic control apparatus 60. In accordance with a drive signal (an instruction signal corresponding to an instruction final fuel injection quantity for PCCI combustion qfinpcci (and/or an instruction signal corresponding to an instruction final fuel injection quantity for diffusion combustion qfindiff) from the electronic control apparatus 60, each of the fuel injection valves 21 opens for a predetermined period of time so as to inject, directly to the combustion chamber of the corresponding cylinder, the fuel pressurized to the instruction fuel injection pressure Pcr, in an amount corresponding to the instruction final fuel injection quantity for PCCI combustion qfinpcci (and/or the instruction final fuel injection quantity for diffusion combustion qfindiff). Notably, in the present embodiment, " . . . fuel injection quantity" refers to the relevant volume of injected fuel.

The intake system 30 includes an intake manifold 31, which is connected to the respective combustion chambers of the individual cylinders of the engine main body 20; an intake pipe 32, which is connected to an upstream-side branching portion of the intake manifold 31 and constitutes an intake passage in cooperation with the intake manifold 31; a throttle valve 33, which is rotatably held within the intake pipe 32; a throttle valve actuator 33a for rotating the throttle valve 33 in accordance with a drive signal from the electronic control apparatus 60; an intercooler 34, which is interposed in the intake pipe 32 to be located on the upstream side of the throttle valve 33; a compressor 35a of a turbocharger 35, which is interposed in the intake pipe 32 to be located on the upstream side of the intercooler 34; and an air cleaner 36, which is disposed at a distal end portion of the intake pipe 32.

The exhaust system 40 includes an exhaust manifold 41, which is connected to the individual cylinders of the engine main body 20; an exhaust pipe 42, which is connected to a downstream-side merging portion of the exhaust manifold 41; a turbine 35b of the turbocharger 35 interposed in the exhaust pipe 42; a turbocharger throttle valve 35c; and a diesel particulate filter (hereinafter referred to as "DPNR") 43, which is interposed in the exhaust pipe 42. The exhaust manifold 41 and the exhaust pipe 42 constitute an exhaust passage.

The turbocharger throttle valve 35c is connected to the electronic control apparatus 60, and, in response to a drive signal from the electronic control apparatus 60, changes the cross-sectional area of a passage through which exhaust gas flows into the turbine 35b so as to change the capacity of the turbocharger 35. When the cross-sectional area of the passage through which exhaust gas flows into the turbine 35b is reduced by closing the turbocharger throttle valve 35c, the boosted pressure increases. When the cross-sectional area of the passage through which exhaust gas flows into the turbine 35b is increased by opening the turbocharger throttle valve 35c, the boosted pressure decreases.

The DPNR 43 is a filter unit which accommodates a filter 43a formed of a porous material such as cordierite and which collects, by means of a porous surface, the particulate matter contained in exhaust gas passing through the filter. In the DPNR 43, at least one metal element selected from alkaline metals such as potassium K, sodium Na, lithium Li, and cesium Cs; alkaline-earth metals such as barium Ba and calcium Ca; and rare-earth metals such as lanthanum La and yttrium Y is carried, together with platinum, on alumina serving as a carrier. Thus, the DPNR 43 also serves as a storage-reduction-type $NO_x$ catalyst unit which, after absorption of $NO_x$, releases the absorbed $NO_x$ and reduces it.

The EGR apparatus 50 includes an exhaust circulation pipe 51, which forms a passage (EGR passage) for circulation of exhaust gas; an EGR control valve 52, which is interposed in the exhaust circulation pipe 51; and an EGR cooler 53. The exhaust circulation pipe 51 establishes communication between an exhaust passage (the exhaust manifold 41) located on the upstream side of the turbine 35b, and an intake passage (the intake manifold 31) located on the downstream side of the throttle valve 33. The EGR control valve 52 responds to a drive signal from the electronic control apparatus 60 so as to change the quantity of exhaust gas to be circulated (exhaust-gas circulation quantity, EGR-gas flow rate).

The electronic control apparatus 60 is a microcomputer which includes a CPU 61, ROM 62, RAM 63, backup RAM 64, an interface 65, etc., which are connected to one another by means of a bus. The ROM 62 stores a program to be executed by the CPU 61, tables (lookup tables, maps), constants, etc. The RAM 63 allows the CPU 61 to provisionally store data when necessary. The backup RAM 64 stores data in a state in which the power supply is on, and holds the stored data even after the power supply is shut off. The interface 65 contains A/D converters.

The interface 65 is connected to a hot-wire-type airflow meter 71, which serves as air flow rate (new air flow rate) measurement means, and is disposed in the intake pipe 32; an intake gas temperature sensor 72, which is provided in the intake passage to be located downstream of the throttle valve 33 and downstream of a point where the exhaust circulation pipe 51 is connected to the intake passage; an intake pipe pressure sensor 73, which is provided in the intake passage to be located downstream of the throttle valve 33 and downstream of the point where the exhaust circulation pipe 51 is connected to the intake passage; a crank position sensor 74; an accelerator opening sensor 75; a fuel temperature sensor 76 provided in the fuel line 23 to be located near the discharge port of the fuel injection pump 22; an intake-gas oxygen concentration sensor 77 provided in the intake passage to be located downstream of the throttle valve 33 and downstream of the point where the exhaust circulation pipe 51 is connected to the intake passage; a water temperature sensor 78; an exhaust-gas oxygen concentration sensor 81 provided in the downstream-side merging portion of the exhaust manifold 41; an exhaust-gas temperature sensor 82 provided in the downstream-side merging portion of the exhaust manifold 41; and an exhaust-gas pressure sensor 83 provided in the downstream-side merging portion of the exhaust manifold 41. The interface 65 receives respective signals from these sensors, and supplies the received signals to the CPU 61. Further, the interface 65 is connected to the fuel injection valves 21, the fuel injection pump 22, the throttle valve actuator 33a, the turbocharger throttle valve 35c, and the EGR control valve 52; and outputs corresponding drive signals to these components in accordance with instructions from the CPU 61.

The hot-wire-type airflow meter 71 measures the mass flow rate of intake air passing through the intake passage (intake air quantity per unit time; new air quantity per unit time), and generates a signal indicating the mass flow rate Ga (air flow rate Ga). The intake gas temperature sensor 72 detects the temperature of a gas taken into a cylinder (i.e., a combustion chamber) of the engine 10 (that is, intake gas temperature), and generates a signal representing the intake gas temperature Tb. The intake pipe pressure sensor 73 measures the pressure of the gas taken into the cylinder of the engine 10 (that is, intake pipe pressure), and generates a signal representing the intake pipe pressure Pb.

The crank position sensor 74 detects the absolute crank angle of each cylinder, and generates a signal representing the actual rank angle CAact and engine speed NE; i.e., rotational speed of the engine 10. The accelerator opening sensor 75 detects an amount by which an accelerator pedal AP is operated (accelerator opening), and generates a signal representing the accelerator opening Accp. The fuel temperature sensor 76 detects the temperature of fuel passing through the fuel line 23, and generates a signal representing the fuel temperature Tcr.

The intake-gas oxygen concentration sensor 77 detects the oxygen concentration of the intake gas, and generates a signal representing the intake-gas oxygen concentration RO2in. The water temperature sensor 78 detects the temperature of cooling water for cooling the engine 10, and generates a signal representing the cooling water temperature THW. The exhaust-gas oxygen concentration sensor 81 detects the oxygen concentration of the exhaust gas, and generates a signal representing the exhaust-gas oxygen concentration RO2ex. The exhaust-gas temperature sensor 82 detects the temperature of exhaust gas, and generates a signal representing the exhaust gas temperature Tex. The exhaust-gas pressure sensor 83 detects the pressure of exhaust gas, and generates a signal representing the exhaust gas pressure Pex.

Outline of Gas-Mixture-Ignition-Time Estimation Method

Figure 2:
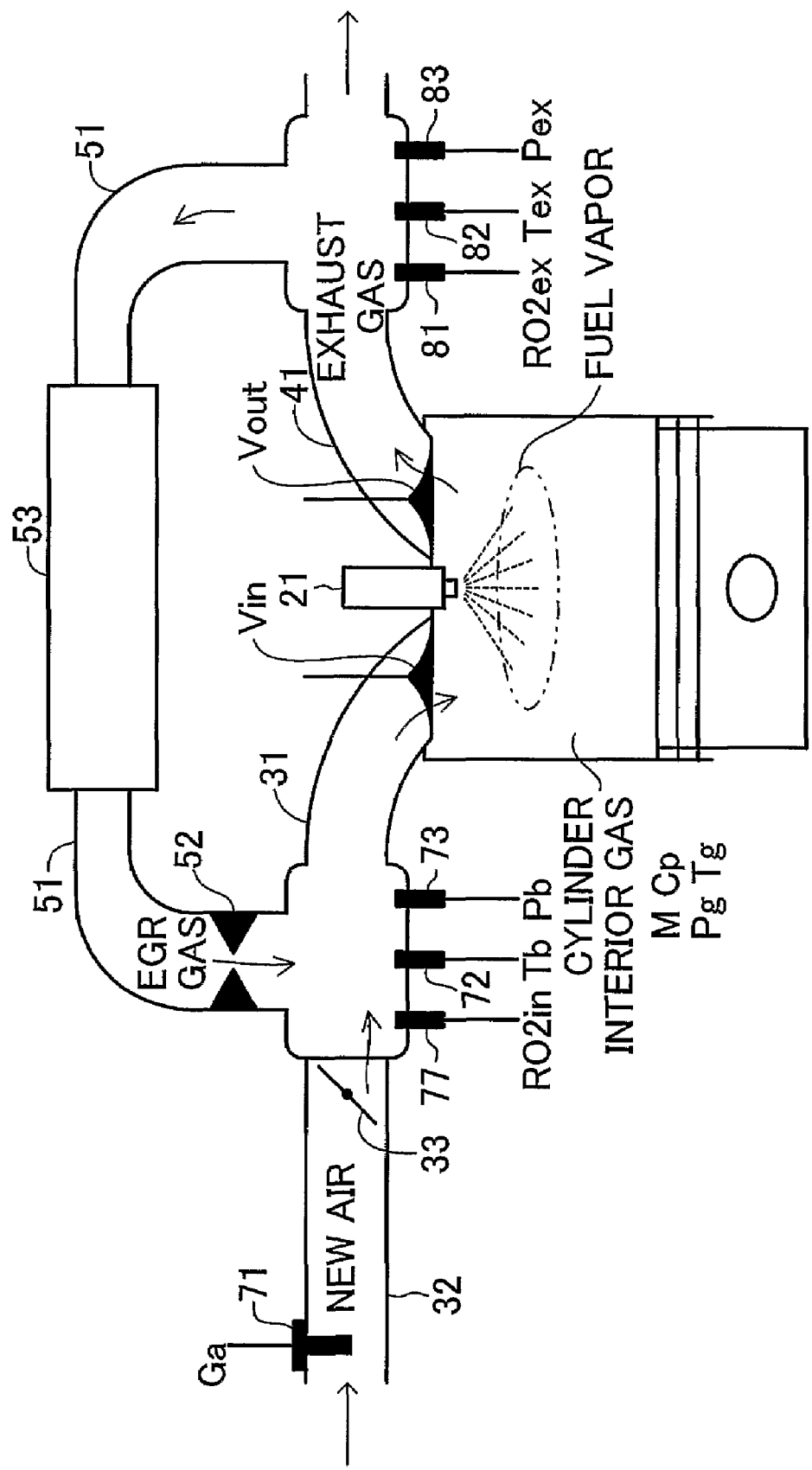
FIG. 2 is a diagram schematically showing a state in which gas is taken from an intake manifold to a certain cylinder and is then discharged to an exhaust manifold.

Next, there will be described an outline of a gas-mixture-ignition-time estimation method performed by the engine control apparatus which includes the gas-mixture-ignition-time estimation apparatus configured as described (hereinafter, the control apparatus may be referred to as the "present apparatus"). FIG. 2 is a diagram schematically showing a state in which gas is taken from the intake manifold 31 into a certain cylinder (cylinder interior) of the engine 10 and is then discharged to the exhaust manifold 41.

As shown in FIG. 2, a gas taken into a combustion chamber (accordingly, cylinder interior gas) includes new air taken from the tip end of the intake pipe 32 via the throttle valve 33, and (external) EGR gas taken from the exhaust circulation pipe 51 via the EGR control valve 52. The ratio (i.e., EGR ratio) of the quantity (mass) of the taken EGR gas to the sum of the quantity (mass) of the taken new air and the quantity (mass) of the taken EGR gas changes depending on the opening of the EGR control valve 52, which is properly controlled by the electronic control apparatus 60 (CPU 61) in accordance with the operation state. As will be described later, the present apparatus basically selects a fuel injection mode for PCCI combustion, and, depending on the operation state, selects a fuel injection mode for diffusion combustion or both the fuel injection modes. In principle, when the fuel injection mode for PCCI combustion is selected, the EGR ratio is set to a higher value, as compared with a case where the fuel injection mode for diffusion combustion is selected.

During an intake stroke, the new air and the EGR gas are taken in the combustion chamber via an opened intake valve Vin as the piston moves downward, and the thus-formed gas mixture serves as cylinder interior gas. The cylinder interior gas is confined within the cylinder when the intake valve Vin closes at a predetermined point in time during a compression stroke after the piston has reached compression bottom dead center, and is then compressed as the piston moves upward. As a result, the temperature of the cylinder interior gas (hereinafter referred to as "cylinder interior temperature Tg") increases.

In the case where the fuel injection mode for PCCI combustion has been selected, when a predetermined time earlier than compression top dead center domes in the compression stroke (specifically, when the crank angle CA coincides with a fuel-injection-start-time crank angle for PCCI combustion CAqpcci to be described later), the present apparatus opens the corresponding fuel injection valve 21 for a predetermined period of time corresponding to the instruction final fuel injection quantity for PCCI combustion qfinpcci, to thereby inject fuel directly into the cylinder. In this case, the cylinder interior temperature Tg at the time of fuel injection is low, and the EGR ratio assumes a large value as described above. Therefore, the injected fuel (fuel mist or premixed gas mixture) does not autoignite immediately, but sufficiently disperses within the combustion chamber until a generally uniform condition is established. The temperature and pressure of the premixed gas mixture, which widely disperses within the combustion chamber in this manner, increase because of compression as the piston moves upward; and when the near compression top dead center is reached, the entire premixed gas mixture autoignites substantially simultaneously (accordingly, PCCI combustion is achieved).

Meanwhile, in the case where the fuel injection mode for diffusion combustion has been selected, when a predetermined time in the compression stroke near the compression top dead center comes (specifically, when the crank angle CA coincides with a fuel-injection-start-time crank angle for diffusion combustion CAqpdiff to be described later), the present apparatus opens the corresponding fuel injection valve 21 for a predetermined period of time corresponding to the instruction final fuel injection quantity for diffusion combustion qfindiff, to thereby inject fuel directly into the cylinder. As a result, the injected (liquid) fuel immediately becomes fuel vapor due to heat received from the cylinder interior gas already having a high temperature because of compression, and then mixes with the cylinder interior gas with elapse of time to produce a gas mixture. The gas mixture starts combustion by means of autoignition (accordingly, diffusion combustion is achieved).

Figure 3:
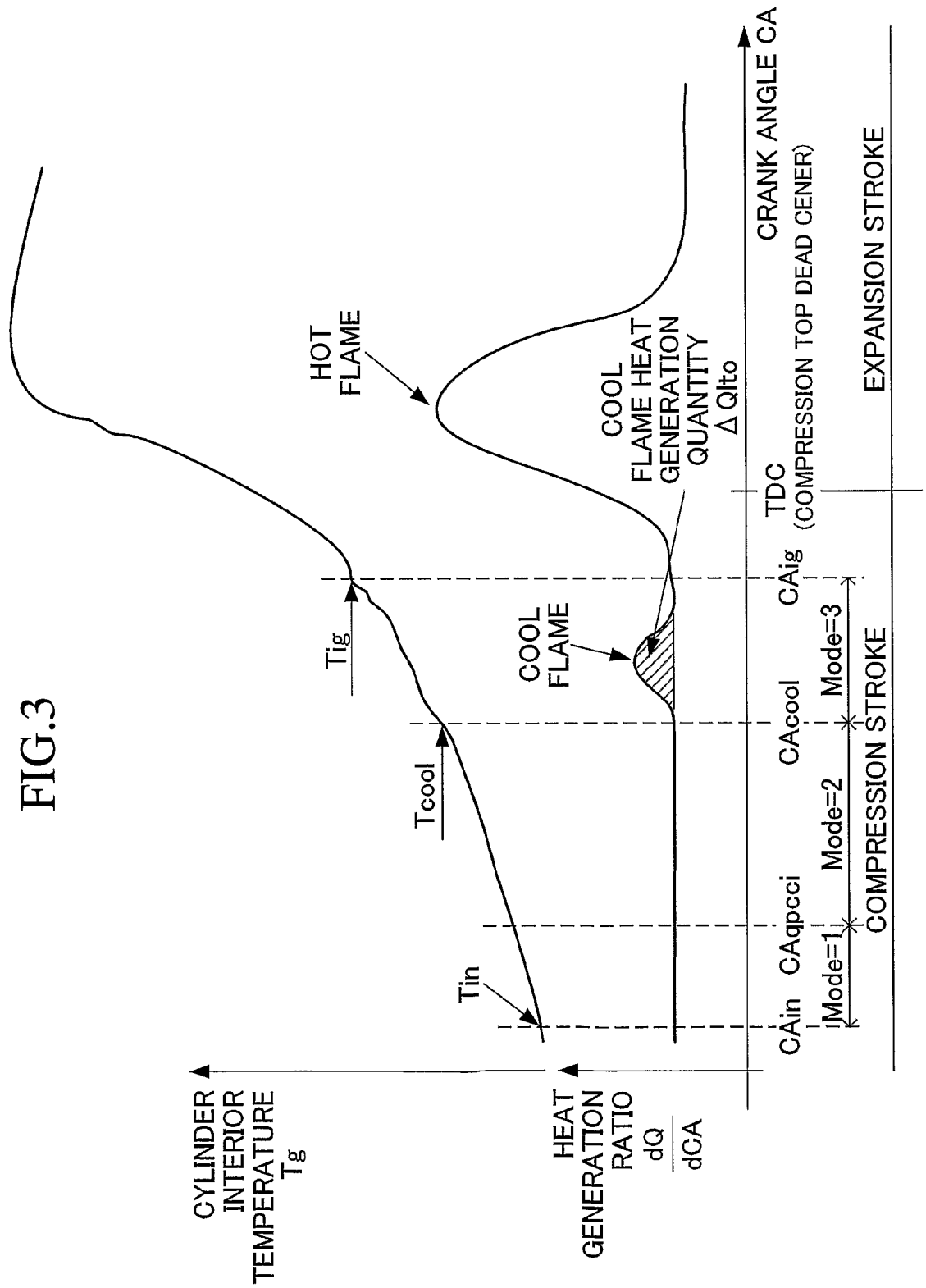
FIG. 3 is a chart showing example changes in cylinder interior temperature and heat generation ratio in a compression stroke (and an expansion stroke)

Specific Method for Estimating Autoignition Start Time of Premixed Gas Mixture in PCCI Combustion A specific method for estimating the autoignition start time of a premixed gas mixture in PCCI combustion will now be described with reference to FIG. 3. FIG. 3 is a chart showing example changes in the cylinder interior temperature Tg and the ratio of heat generation within the combustion chamber (dQ/dCA; heat generation quantity per unit time) in a compression stroke (and in an expansion stroke).

In FIG. 3, CAin represents a compression-start-time crank angle (i.e., crank angle when the intake valve Vin closes); CAqpcci represents a fuel-injection-start-time crank angle for PCCI combustion; CAcool represents a cool-flame-start-time crank angle; and CAig represents an autoignition (hot flame)-start-time crank angle. For convenience of description, a period during which the crank angle CA is between the compression-start-time crank angle CAin and the fuel-injection-start-time crank angle for PCCI combustion CAqpcci will be called a first mode period (Mode=1); a period during which the crank angle CA is between the fuel-injection-start-time crank angle for PCCI combustion CAqpcci and the cool-flame-start-time crank angle CAcool will be called a second mode period (Mode=2); and a period during which the crank angle CA is between the cool-flame-start-time crank angle CAcool and the autoignition-start-time crank angle CAig will be called a third mode period (Mode=3).

As will be described later, the fuel-injection-start-time crank angle for PCCI combustion CAqpcci is determined when the time for calculating a demanded fuel injection quantity (instruction total fuel injection quantity) qfin is reached (specifically, a time point near compression bottom dead center; i.e., a time point before start of compression). The fuel-injection-start-time crank angle for PCCI combustion CAqpcci is determined from the operation state at the present point in time and a predetermined map (table) as a steady-state suitable value (a value which is previously determined through, for example, experiments and which is optimized so as to bring the engine into an optimal state when the engine operates steadily in that operation state).

In the present embodiment, a cool flame (low-temperature oxidation reaction) of the premixed gas mixture is assumed to start when the temperature of the premixed gas mixture (i.e., cylinder interior temperature Tg), which increases upon compression in the compression stroke, reaches a certain temperature corresponding to start of a cool flame (hereinafter referred to as "cool flame start temperature Tcool"). Similarly, in the present embodiment, autoignition (hot flame) of the premixed gas mixture is assumed to start when the temperature of the premixed gas mixture (i.e., cylinder interior temperature Tg) reaches a certain temperature corresponding to start of autoignition (hereinafter referred to as "autoignition start temperature Tig").

The present apparatus performs the following prediction and estimation operation under the assumption that when the actual crank angle CAact of a cylinder to which fuel must be injected in the present operation cycle (hereinafter referred to as "fuel injection cylinder") reaches the compression-start-time crank angle CAin (i.e., when the intake valve Vin of the fuel injection cylinder closes), (in principle) the entire quantity of fuel of the demanded fuel injection quantity qfin is immediately injected at the fuel injection time for PCCI combustion, and the entire quantity serves as the fuel injection quantity for PCCI combustion qpcci. After start of compression, the present apparatus predicts or estimates, for each small crank angle $\Delta CA$, a change in the cylinder interior temperature Tg (accordingly, the temperature of the premixed gas mixture) during the present compression stroke while relating it with the crank angle CA. Then, the present apparatus estimates, as a premixed-gas-mixture autoignition start time (i.e., autoignition-start-time crank angle CAig), the time point when the estimated cylinder interior temperature Tg reaches the autoignition start temperature Tig. Accordingly, the present apparatus completes the estimation of the premixed-gas-mixture autoignition start time immediately after start of compression (accordingly, before start of fuel injection for PCCI combustion).

Next, there will be described a method for predicting or estimating, for every small crank angle $\Delta CA$, the cylinder interior temperature Tg during the present compression stroke, while relating it with the crank angle CA, under the assumption that the entire quantity of the demanded fuel injection quantity qfin is injected at the fuel injection time for PCCI combustion as the fuel injection quantity for PCCI combustion qpcci.

In general, the heat energy Q of a gas within a combustion chamber (cylinder interior gas) at cylinder interior temperature Tg can be represented by the following Eq. (1). In Eq. (1), M represents the total mass of the cylinder interior gas (cylinder interior gas mass), and Cp represents a constant-pressure specific heat of the cylinder interior gas. Accordingly, when the heat energy Q of the cylinder interior gas, the cylinder interior gas mass M, and the constant-pressure specific heat Cp of the cylinder interior gas are successively obtained (updated) for every small crank angle $\Delta CA$, the cylinder interior temperature Tg can be obtained in accordance with the following Eq. (2) for every small crank angle $\Delta CA$ in such a manner that the cylinder interior temperature Tg is related to the crank angle CA. A method for obtaining the cylinder interior gas mass M will first be described.

$$Q = M \cdot Cp \cdot Tg \quad (1)$$

$$Tg = Q/(M \cdot Cp) \quad (2)$$

Cylinder Interior Gas Mass M

In the period before injection of fuel for PCCI combustion (i.e., the first mode period), the cylinder interior gas mass M is maintained equal to a compression-start-time cylinder interior gas mass M0, which is the mass of the cylinder interior gas confined within the combustion chamber at the compression start time. In the period after the fuel injection (i.e., the second mode and third mode periods), the cylinder interior gas mass M is maintained equal to a value (M0+qpcci·$\rho$f) obtained through addition of the mass (qpcci·$\rho$f) of fuel of the fuel injection quantity for PCCI combustion qpcci (=qfin) to the compression-start-time cylinder interior gas mass M0. Here, $\rho$f represents the density of fuel. The compression-start-time cylinder interior gas mass M0 can be obtained in accordance with Eq. (3), which is based on the state equation of gas regarding the cylinder interior gas at the time of start of compression.

$$M0 = Pgin \cdot Vain/(R \cdot Tin) \quad (3)$$

In Eq. (3), R is the gas constant of the cylinder interior gas (gas constant R used herein is a value obtained by dividing the universal gas constant by the average molecular weight of the cylinder interior gas). Pgin represents the cylinder interior gas pressure Pg at the compression start time. At the time of start of compression, the cylinder interior gas pressure is considered to be substantially equal to the intake pipe pressure Pb. Therefore, the compression-start-time cylinder interior gas pressure Pgin can be obtained from the intake pipe pressure Pb detected by means of the intake pipe pressure sensor 73 at the compression start time.

Vain represents a cylinder interior volume at the compression start time. The cylinder interior volume can be represented as a function Va(CA) of the crank angle CA on the basis of the design specifications of the engine 10. Therefore, the compression-start-time cylinder interior volume Vain can be obtained as Va(CAin) from the compression-start-time crank angle CAin and the function Va. Tin represents the cylinder interior temperature at the compression start time. The compression-start-time cylinder interior temperature Tin can be represented by the following Eq. (4).

$$Tin = Tb + \Delta Tin \quad (4)$$

In Eq. (4), Tb represents the temperature of intake gas detected by means of the intake gas temperature sensor 72 at the compression start time. The intake gas temperature Tb is a value which reflects the influences of new air taken in via the throttle valve 33 and the external EGR gas taken in via the EGR control valve 52. $\Delta$Tin represents an intake gas temperature correction amount, which represents an increase in the intake gas temperature caused by heat which the intake gas receives after passing through the intake gas temperature sensor 72 and before entering the combustion chamber. Conceivably, this heat is mainly composed of heat from the remaining gas (internal EGR gas) which remains within the combustion chamber after the previous combustion and heat from the surface of the intake valve Vin, the inner wall surface of the intake manifold 31, and the like.

The quantity of heat received from the internal EGR gas remaining within the combustion chamber changes depending on the quantity and temperature of the internal EGR gas. The quantity of the internal EGR gas is determined from the engine speed NEb at a predetermined time during the previous exhaust stroke, the exhaust gas pressure Pexb at that predetermined time, and the exhaust gas temperature Texb at that predetermined time. The temperature of the internal EGR gas is determined from the previous (demanded) fuel injection quantity qfinb. Further, the quantity of heat received from the surface of the intake valve Vin or the like changes depending on the cooling water temperature THW at the compression start time. Accordingly, the intake gas temperature correction amount $\Delta$Tin can be obtained in accordance with the following Eq. (5), which uses a function func$\Delta$Tin whose arguments are qfinb, NEb, Pexb, Texb, and THW.

$$\Delta Tin = func\Delta Tin \text{ (qfinb, NEb, Pexb, Texb, THW)} \quad (5)$$

The above-described calculations enables the compression-start-time cylinder interior gas mass M0 to be obtained in accordance with Eq. (3). Accordingly, the cylinder interior gas mass M (=M0) in the first mode period, and the cylinder interior gas mass M (=M0+qpcci·ρf) in the second mode and third mode periods can be obtained.

Constant-Pressure Specific Heat Cp of Cylinder Interior Gas

Next, a method for obtaining the constant-pressure specific heat Cp of the cylinder interior gas will be described. In general, in relation to the specific heat ratio κ of the cylinder interior gas, there exist the relations κ=Cp/Cv, and Cp=Cv+R. When Cv is eliminated by combining these equations, the following Eq. (6) can be obtained, which represents the relation between the constant-pressure specific heat Cp of the cylinder interior gas and the specific heat ratio κ of the cylinder interior gas. Cv represents the constant-volume specific heat of the cylinder interior gas.

$$\kappa = Cp/(Cp-R) \quad (6)$$

The specific heat ratio κ of the cylinder interior gas changes in accordance with the proportions of components of the cylinder interior gas. In the period before injection of fuel for PCCI combustion (i.e., the first mode period), the cylinder interior gas mainly includes oxygen $O_2$, carbon dioxide $CO_2$, nitrogen $N_2$, and water $H_2O$. In the period after the fuel injection (i.e., the second mode and third mode periods), the cylinder interior gas further contains components that constitute fuel. The proportions of these components greatly depend on the oxygen concentration RO2in of the intake gas, the exhaust-gas oxygen concentration RO2exb at a predetermined time in the previous exhaust stroke, and the cylinder interior temperature Tg at the present point in time (additionally, the fuel injection quantity for PCCI combustion qpcci in the period after fuel injection).

Accordingly, the specific heat ratio κ of the cylinder interior gas (accordingly, the constant-pressure specific heat Cp of the cylinder interior gas) in the second mode and third mode periods, which are after fuel injection for PCCI combustion, can be represented by the following Eq. (7), which uses a function funcCp whose arguments are RO2in, RO2exb, Tg, and qpcci. Meanwhile, the specific heat ratio κ of the cylinder interior gas (accordingly, the constant-pressure specific heat Cp of the cylinder interior gas) in the first mode period, which is before fuel injection for PCCI combustion, can be obtained in accordance with the following Eq. (8), which is derived from Eq. (7) by substituting 0 for qpcci.

$$Cp = \text{funcCp}(RO2\text{in}, RO2\text{exb}, Tg, q\text{pcci}) \quad (7)$$

$$Cp = \text{funcCp}(RO2\text{in}, RO2\text{exb}, Tg, 0) \quad (8)$$

As can be understood from Eq. (7) and Eq. (8), the constant-pressure specific heat Cp of the cylinder interior gas changes in accordance with the cylinder interior temperature Tg. As described above, the constant-pressure specific heat Cp of the cylinder interior gas in the first mode period can be obtained in accordance with Eq. (8), and the constant-pressure specific heat Cp of the cylinder interior gas in the second mode and third mode periods can be obtained in accordance with Eq. (7).

Heat Energy Q of Cylinder Interior Gas

Next, the heat energy Q of the cylinder interior gas will be described. First, the heat energy Qin of the cylinder interior gas at the compression start time can be obtained from the relation "Qin=M0·Cp·Tin." Since the constant-pressure specific heat Cp of the cylinder interior gas used here is that in the first mode period, it can be obtained in accordance with Eq. (8).

Further, over the first mode period to the third mode period, the heat energy Q of the cylinder interior gas is continuously influenced by the work that the piston performs for the cylinder interior gas (piston work Wpiston) and the energy transferred from the cylinder interior gas to the combustion chamber wall because of contact between the inner wall of the combustion chamber and the cylinder interior gas (energy loss Wloss).

Now, a minute amount of piston work ΔWpiston produced during a period in which the crank angle CA advances by a minute crank angle ΔCA is considered. When the cylinder interior volume decreases by ΔV (>0) as a result of advancement of the crank angle CA by the minute crank angle ΔCA, by use of the cylinder interior gas pressure Pg at the present point in time, the minute amount of piston work ΔWpiston can be represented by the following Eq. (9). The cylinder interior gas pressure Pg at the present point in time can be obtained from the cylinder interior gas mass M at the present point in time, the cylinder interior temperature Tg at the present point in time, the cylinder interior volume Va(CA) at the present point in time, and the state equation of gas regarding the cylinder interior gas at the present point in time; i.e., from the relation "Pg=M·R·Tg/Va(CA)."

$$\Delta W\text{piston} = Pg \cdot \Delta V \quad (9)$$

Further, the value (dVa/dCA), which is obtained through differentiation of the cylinder interior volume Va with respect to the crank angle CA, can be obtained as a function (dVa/dCA)(CA) of the crank angle CA on the basis of the design specifications of the engine 10. Therefore, the value ΔV can be represented by the following Eq. (10). Accordingly, from Eq. (9) and Eq. (10), the minute amount of piston work ΔWpiston can be obtained as shown in the following Eq. (11).

$$\Delta V = (-dVa/dCA)(CA) \cdot \Delta CA \quad (10)$$

$$\Delta W\text{piston} = Pg \cdot (-dVa/dCA)(CA) \cdot \Delta CA \quad (11)$$

Next, a minute energy loss ΔWloss produced during a period in which the crank angle CA advances by the minute crank angle ΔCA is considered. The energy loss per unit time (dWloss/dt); i.e., the energy transmitted from the cylinder interior gas to the combustion chamber wall per unit time, can be considered to be a value corresponding to the difference (Tg−THW) between the cylinder interior temperature Tg and the cooling water temperature THW. Therefore, the energy loss per unit time can be represented by the following Eq. (12), which uses a function funcWloss whose argument is (Tg−THW).

$$dW\text{loss}/dt = \text{funcWloss}(Tg - THW) \quad (12)$$

When the length of the period during which the crank angle CA advances by the minute crank angle ΔCA is represented by Δt, the minute energy loss ΔWloss can be represented by the following Eq. (13). The Δt can be represented by the following Eq. (14), which uses the engine speed NE at the present point in time and the minute crank angle ΔCA. Accordingly, from the above described Eq. (12) and the following Eq. (13) and Eq. (14), the minute energy loss ΔWloss can be obtained in accordance with the following Eq. (15).

$$\Delta W\text{loss} = dW\text{loss}/dt \cdot \Delta t \quad (13)$$

$$\Delta t = (dt/dCA) \cdot \Delta CA = (1/NE) \cdot \Delta CA \quad (14)$$

$$\Delta W\text{loss} = \text{funcWloss}(Tg - THW) \cdot (1/NE) \cdot \Delta CA \quad (15)$$

As can be understood from the above, an increase ΔQ1 in the internal energy of the cylinder interior gas because of the influences of the piston work and the energy loss during the period in which the crank angle CA advances by the minute crank angle ΔCA can be obtained from the following Eq. (16).

$$\Delta Q1 = \Delta W\text{piston} - \Delta W\text{loss} \quad (16)$$

Further, the heat energy Q of the cylinder interior gas is influenced by latent heat ΔQlatent generated when (liquid) fuel injected for PCCI combustion changes to fuel vapor, and heat energy ΔQqpcci of the fuel vapor itself. Since the latent heat ΔQlatent is considered to be a value corresponding to the fuel injection quantity for PCCI combustion qpcci, the latent heat ΔQlatent can be obtained by the following Eq. (17), which uses a function funcΔQlatent whose argument is qpcci. Meanwhile, the heat energy ΔQqpcci of the fuel vapor can be obtained by the following Eq. (18). In Eq. (18), Cf represents the specific heat of fuel vapor, and Tcr represents the temperature of liquid fuel detected by means of the fuel temperature sensor 76 at the time of fuel injection for PCCI combustion.

$$\Delta Q\text{latent} = \text{func}\Delta Q\text{latent}(q\text{pcci}) \quad (17)$$

$$\Delta Q\text{qpcci} = (q\text{pcci} \cdot \rho f) \cdot Cf \cdot Tcr \quad (18)$$

In addition, the heat energy Q of the cylinder interior gas is influenced by the heat generation quantity of a cool flame of the premixed gas mixture (cool flame heat generation quantity ΔQlto). The cool flame heat generation quantity ΔQlto is known to be strongly influenced by the fuel injection quantity for PCCI combustion qpcci, the nature (in the present embodiment, cetane number CN) of fuel, intake-gas oxygen concentration RO2in, and cylinder interior gas density ρcool at the cool flame start time. Accordingly, through experiments or the like, a table MapΔQlto for obtaining the cool flame heat generation quantity ΔQlto by use of the above-mentioned various values as arguments can be prepared in advance. Further, the cylinder interior gas density ρcool at the cool flame start time can be obtained through division of the cylinder interior gas mass M(=M0+qpcci·ρf) at the cool flame start time by the cylinder interior volume Va(CAcool) at the cool flame start time. Accordingly, the cool flame heat generation quantity ΔQlto can be obtained by use of the above-described table MapΔQlto as shown in the following Eq. (19). In actuality, as shown by a hatched area in FIG. 3, the cool flame heat generation quantity ΔQlto is the cumulative of cool flame heat generated over a predetermined period of time in the third mode period. However, in the present embodiment, the cool flame heat is assumed to be generated instantaneously at the cool flame start time (CAcool).

$$\Delta Q\text{lto} = \text{Map}(CN, q\text{pcci}, RO2\text{in}, \rho\text{cool}) \quad (19)$$

As described above, the heat energy Q of the cylinder interior gas increases by an amount corresponding to the increase amount ΔQ1 of the above-mentioned internal energy every time the crank angle CA advances by the minute crank angle ΔCA over the first to third mode periods. In addition, at the fuel injection (start) time (CAqpcci) for PCCI combustion, the heat energy Q of the cylinder interior gas increases by an amount corresponding to the heat energy ΔQqpcci of the fuel vapor, decreases by an amount corresponding to the above-mentioned latent heat ΔQlatent, and, at the cool flame start time (CAcool), increases by an amount corresponding to the cool flame heat generation quantity ΔQlto. The above-described procedure enables successive obtainment of the heat energy Q of the cylinder interior gas for every minute crank angle ΔCA.

In the above-described manner, the cylinder interior gas M, the constant-pressure specific heat Cp, and the heat energy Q of the cylinder interior gas can be successively obtained every time the crank angle CA advances by the minute crank angle ΔCA, starting from the compression-start-time crank angle CAin. Therefore, the cylinder interior temperature Tg can be obtained in accordance with the above-described Eq. (2) for every minute crank angle ΔCA in a manner related to the crank angle CA.

As described above, the present apparatus successively obtains the cylinder interior temperature Tg by the above-described method for every minute crank angle ΔCA while relating it to the crank angle CA. Then, the present apparatus estimates, as a cool flame start time (i.e., cool-flame-start-time crank angle CAcool), a point in time at which the cylinder interior temperature Tg reaches the cool flame start temperature Tcool in the second mode period, and estimates as a premixed-gas-mixture autoignition start time (i.e., autoignition-start-time crank angle CAig), a point in time at which the cylinder interior temperature Tg reaches the autoignition start temperature Tig in the third mode period. As described above, such estimation is completed immediately after the compression start time (CAin). The above is a specific method for estimating the autoignition start time of the premixed gas mixture under the assumption that all the demanded fuel injection quantity qfin of fuel is injected at the fuel injection time for PCCI combustion as the fuel injection quantity for PCCI combustion qpcci.

Determination as to Whether PCCI Control Can Be Performed

As previously described, at the time when a premixed gas mixture for PCCI combustion starts autoignition, there exists a PCCI control performable range in which the problem of loud noise or misfire does not occur. Such a PCCI control performable range changes mainly depending on the engine speed NE, the fuel injection quantity for PCCI combustion qpcci, and the equivalent ratio φ of the premixed gas mixture.

Figure 4:
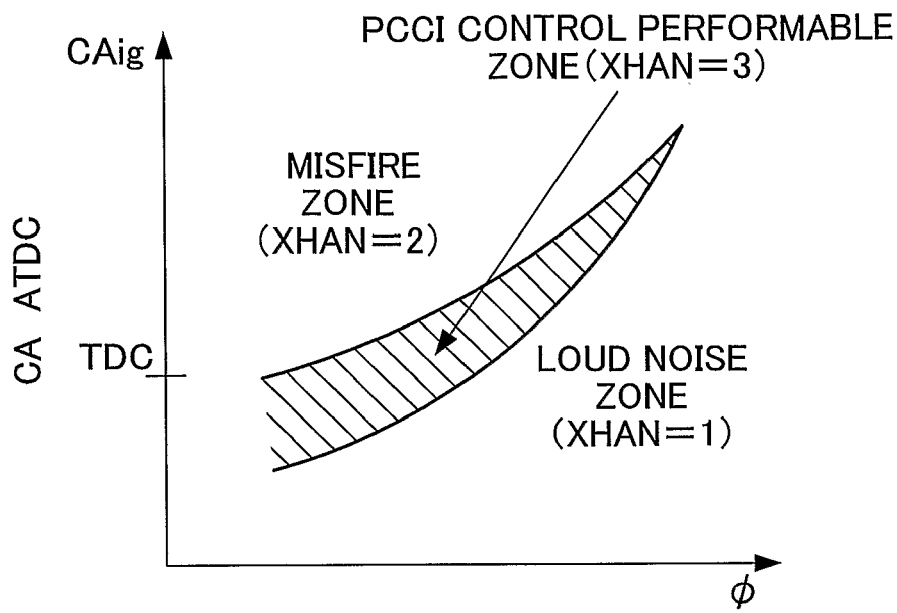
FIG. 4 is a graph showing an example relation between the equivalent ratio of premixed gas mixture and a PCCI control performable zone for the case where the engine is in a steady operation state.

FIG. 4 is a graph showing an example relation between the equivalent ratio φ of the premixed gas mixture and the PCCI control performable range for the case where the engine speed NE and the fuel injection quantity for PCCI combustion qpcci have a certain combination relation, and the engine 10 is in a steady operation state. The PCCI control performable range corresponds to a PCCI control performable zone indicated by hatching in FIG. 4. As shown in FIG. 4, the PCCI control performable range (zone) shifts to a delayed angle direction as the equivalent ratio φ of the premixed gas mixture increases. This shift is based on the trend that the higher the equivalent ratio φ of the premixed gas mixture, the higher the noise level and the lower the possibility of occurrence of misfire.

The relation between the equivalent ratio φ of the premixed gas mixture and the PCCI control performable range for the case where the engine 10 is in a steady operation state as shown in FIG. 4 may change in accordance with the combination of the engine speed NE and the fuel injection quantity for PCCI combustion qpcci. Such a relation can be obtained in advance as a map for each combination of the engine speed NE and the fuel injection quantity for PCCI combustion qpcci, through, for example, experiments which are performed while successively changing the operation state of the engine 10 among various steady operation states.

The present apparatus (ROM 62) stores the previously obtained map Mapjudge corresponding to each combination of the engine speed NE and the fuel injection quantity for PCCI combustion qpcci.

Figure 5:
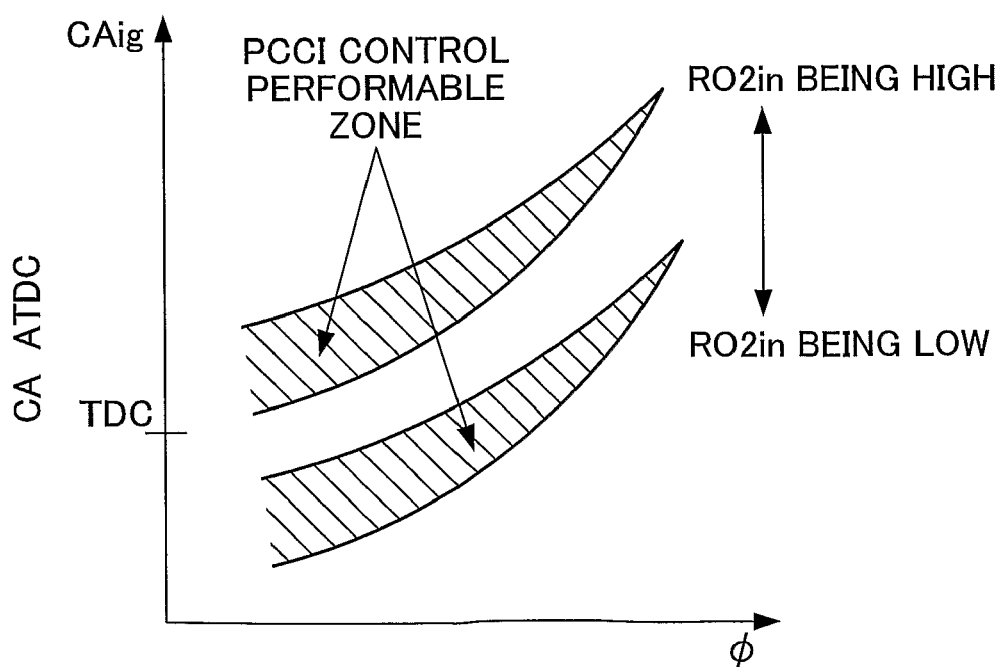
FIG. 5 is a graph showing an example relation between intake-gas oxygen concentration and the PCCI control performable zone for the case where the engine is in a transitional operation state.

When the engine 10 is in a transitional operation state, as shown in FIG. 5, the PCCI control performable range shifts toward the delayed angle direction, as compared with the case of the steady operation state, as the intake-gas oxygen concentration RO2in increases, and shifts toward the advanced angle direction, as compared with the case of the steady operation state, as the intake-gas oxygen concentration RO2in decreases. This shift is based on the trend that the higher the intake-gas oxygen concentration RO2in, the higher the noise level and the lower the possibility of occurrence of misfire.

Figure 6:
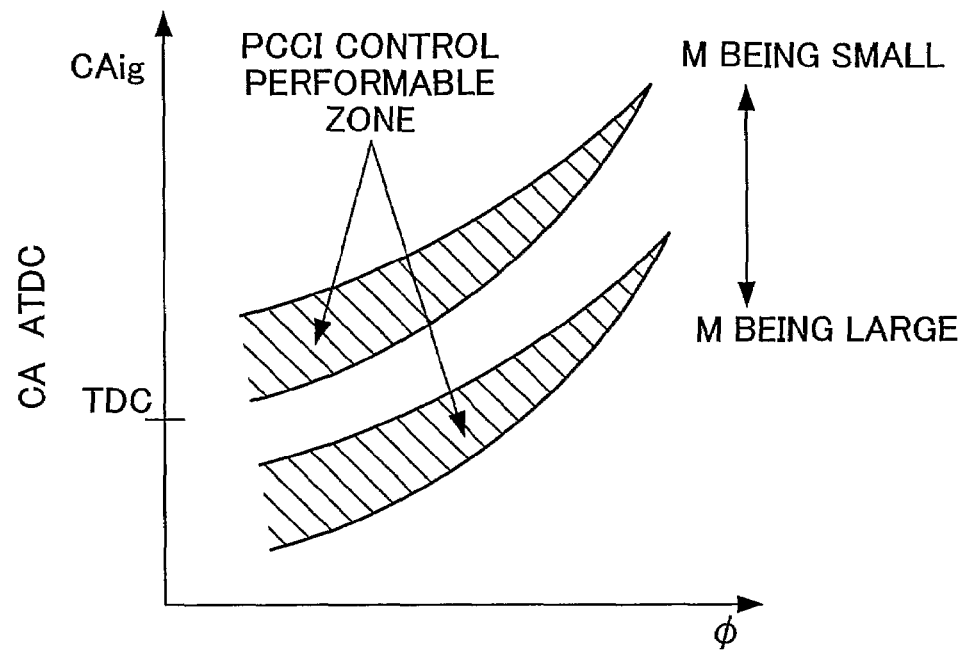
FIG. 6 is a graph showing an example relation between the mass of cylinder interior gas and the PCCI control performable zone for the case where the engine is in a transitional operation state.

Further, when the engine 10 is in a transitional operation state, as shown in FIG. 6, the PCCI control performable range shifts toward the delayed angle direction, as compared with the case of the steady operation state, as the cylinder interior gas mass M decreases, and shifts toward the advanced angle direction, as compared with the case of the steady operation state, as the cylinder interior gas mass M increases. This shift is based on the trend that the greater the cylinder interior gas mass M, the greater the heat capacity (M·Cp) of the cylinder interior gas, with a resultant decrease in the noise level and the increased possibility of occurrence of misfire.

In view of the above, the present apparatus estimates the premixed-gas-mixture-autoignition-start-time crank angle CAig immediately after the compression start time (CAin) as described above, and immediately after that, selects the above-mentioned map Mapjudge from the combination of the engine speed NE and the fuel injection quantity for PCCI combustion qpcci (=qfin) at the present point in time. When the engine 10 is in a transitional operation state, the present apparatus properly corrects the selected map Mapjudge from the combination of the intake-gas oxygen concentration RO2in and the cylinder interior gas mass M at the present point in time.

Subsequently, by use of the selected map Mapjudge, the equivalent ratio φ of the premixed gas mixture, and the estimated autoignition-start-time crank angle CAig, the present apparatus determines whether the relation between φ and CAig corresponds the PCCI control performable zone, the misfire zone, or the loud noise zone in the map Mapjudge. Such determination is also completed immediately after the compression start time (CAin) (before start of fuel injection for PCCI combustion). Under the assumption that the premixed gas mixture has been uniformly dispersed within the combustion chamber, the equivalent ratio φ of the premixed gas mixture can be obtained by the following Eq. (20), which uses a function funcφ whose arguments are the intake air flow rate Ga (value subjected to first-order lag processing) and the fuel injection quantity for PCCI combustion qpcci. The above is the outline of the determination as to whether PCCI Control can be performed.

$$\phi = \text{func}\phi(Ga, qpcci) \quad (20)$$

Selection of Fuel Injection Mode and Feedback Control of Engine

When the relation between the equivalent ratio φ and the autoignition-start-time crank angle CAig falls within the PCCI control performable zone, the present apparatus actually injects the entirety of fuel of the demanded fuel injection quantity qfin of fuel (=qpci) as an instruction final fuel injection quantity for PCCI combustion qfinpcci upon arrival of the fuel injection start time for PCCI combustion (CAqpcci) in the present operation cycle.

Further, when the relation between the equivalent ratio φ and the autoignition-start-time crank angle CAig falls within the misfire zone, the present apparatus actually injects the entirety of fuel of the demanded fuel injection quantity qfin of fuel as an instruction final fuel injection quantity for diffusion combustion qfindiff upon arrival of the fuel injection start time for diffusion combustion (CAqdiff) in the present operation cycle, the fuel injection start time for diffusion combustion being set to the vicinity of compression top dead center. With this operation, generation of misfire can be presented without fail.

In this case, the present apparatus decreases the opening of the EGR control valve 52 by a predetermined amount, and opens the turbocharger throttle valve 35c by a predetermined amount. As a result, in the next operation cycle and subsequent operation cycles, the intake-gas oxygen concentration RO2in is corrected in an increasing direction and the cylinder interior gas mass M is corrected in a decreasing direction. Thus, as can be understood from FIGS. 5 and 6, the PCCI control performable zone shifts toward the delayed angle direction, and in the next operation cycle and subsequent operation cycles, the engine 10 is feedback-controlled such that the autoignition-start-time crank angle CAig shifts from the misfire zone to the PCCI control performable zone.

Meanwhile, when the relation between the equivalent ratio φ and the autoignition-start-time crank angle CAig falls within the loud noise zone, the present apparatus divides the demanded fuel injection quantity qfin (=qpcci) into an instruction final fuel injection quantity for PCCI combustion qfinpcci and an instruction final fuel injection quantity for diffusion combustion qfindiff. At this time, the present apparatus calculates the division ratio Ratioqpcci (=qfinpcci/qfin) as follows.

Figure 7:
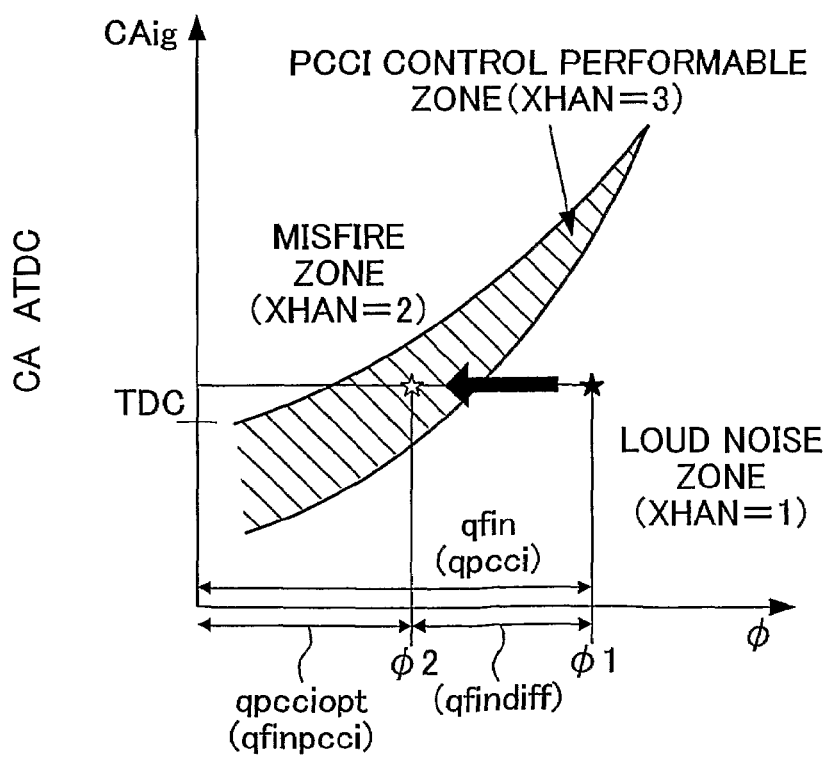
FIG. 7 is a graph for facilitating the understanding of a concept of a division ratio at which a demanded fuel injection quantity is divided into an injection quantity for PCCI combustion and an injection quantity for diffusion combustion when loud noise is determined to be generated.

For example, a case in which the relation between the equivalent ratio φ and the autoignition-start-time crank angle CAig corresponds to a black star mark in the loud noise zone on the selected map Mapjudge shown in FIG. 7 is considered. In this case, when the equivalent ratio φ is decreased with the autoignition-start-time crank angle CAig maintained constant, the relation between the equivalent ratio φ and the autoignition-start-time crank angle CAig can be brought into the PCCI control performable zone in FIG. 7 (at a generally central portion along the φ axis; see a white star mark on the map Mapjudge).

When the quantity of new air in the intake gas is assumed to be constant, the equivalent ratio φ and the fuel injection quantity for PCCI combustion qpcci have a proportional relation therebetween. Accordingly, as shown in FIG. 7, changing the equivalent ratio φ from a value φ1 corresponding to the black star mark to a value φ2 corresponding to the white star mark corresponds to changing the fuel injection quantity for PCCI combustion qpcci from the demanded fuel injection quantity qfin to an optimal injection quantity for PCCI combustion qpcciopt. That is, when the division ratio Ratioqpcci is set to "φ2/φ1" and the instruction final fuel injection quantity for PCCI combustion qfinpcci and the instruction final fuel injection quantity for diffusion combustion qfindiff are obtained in accordance with the following Eqs. (21) and (22), respectively, the autoignition-start-time crank angle CAig can be brought into the PCCI control performable zone.

$$qfinpcci = qfin \cdot Ratioqpcci \quad (21)$$

$$qfindiff = qfin \cdot (1 - Ratioqpcci) \quad (22)$$

Therefore, in this case, the present apparatus obtains the division ratio Ratioqpcci in the above-described manner, and actually injects fuel in an amount corresponding to the instruction final fuel injection quantity for PCCI combustion qfinpcci obtained by Eq. (21) when the fuel injection start time for PCCI combustion (CAqpcci) comes in the present operation cycle. Subsequently, the present apparatus injects fuel in an amount corresponding to the instruction final fuel injection quantity for diffusion combustion qfindiff obtained by Eq. (22) when the fuel injection start time for diffusion combustion (CAqdiff) comes. This operation maximizes the effect of reducing the quantities of $NO_x$ and PM generated because of PCCI combustion, without generation of loud noise or occurrence of misfire.

In this case, the present apparatus increases the opening of the EGR control valve 52 by a predetermined amount, and closes the turbocharger throttle valve 35c by a predetermined amount. As a result, in the next operation cycle and subsequent operation cycles, the intake-gas oxygen concentration RO2in is corrected in a decreasing direction and the cylinder interior gas mass M is corrected in an increasing direction. Thus, as can be understood from FIGS. 5 and 6, the PCCI control performable zone shifts toward the advanced angle direction, and in the next operation cycle and subsequent operation cycles, the engine 10 is feedback-controlled such that the autoignition-start-time crank angle CAig shifts from the loud noise zone to the PCCI control performable zone. The above is the out line of selection of the fuel injection mode and feedback control.

Actual Operation

Next, there will be described actual operation of the control apparatus including the gas-mixture-ignition-time estimation apparatus for an internal combustion engine, which is configured as described above.

Calculation of Fuel Injection Quantity, Etc.

Figure 8:
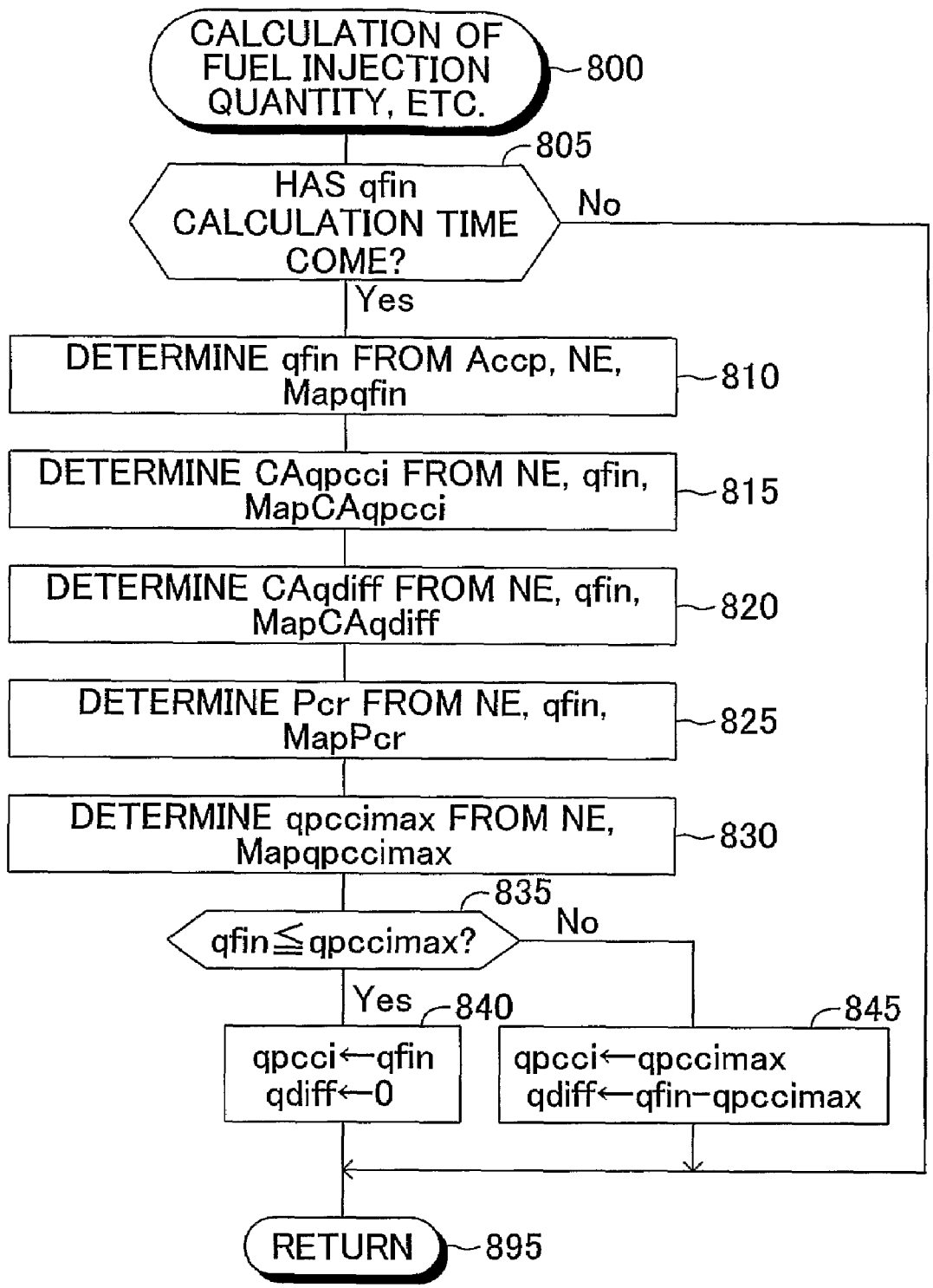
FIG. 8 is a flowchart showing a routine which the CPU shown in FIG. 1 executes so as to calculate fuel injection quantity, etc.

The CPU 61 repeatedly executes, at predetermined intervals, a routine shown by the flowchart of FIG. 8 and adapted to calculate fuel injection quantity, etc. Therefore, when a predetermined timing has been reached, the CPU 61 starts the processing from step 800, and then proceeds to step 805 so as to determine whether time for calculating the demanded fuel injection quantity qfin (specifically, the near compression bottom dead center) in the present operation cycle comes. When the CPU 61 makes a "No" determination, the CPU 61 proceeds directly to step 895 so as to end the current performance of the present routine.

Figure 9:
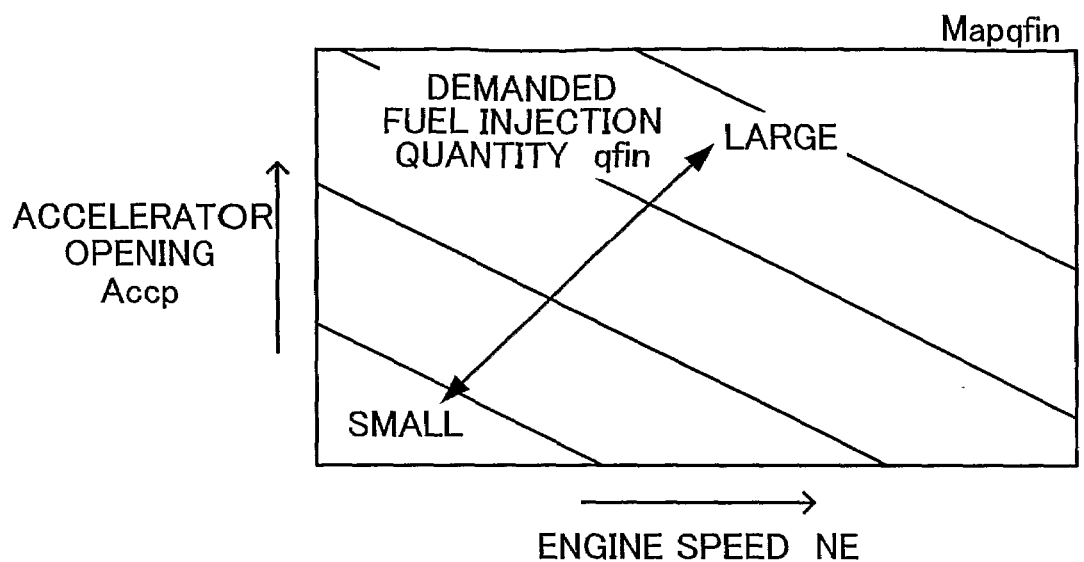
FIG. 9 is a table for determining a demanded fuel injection quantity, to which the CPU shown in FIG. 1 refers during execution of the routine shown in FIG. 8.

Here, the time for calculating the demanded fuel injection quantity qfin in the present operation cycle is assumed to have come. In this case, the CPU 61 makes a "Yes" determination in step 805, and proceeds to step 810 so as to obtain the demanded fuel injection quantity qfin from the accelerator opening Accp, the engine speed NE, and a table (map) Mapqfin shown in FIG. 9. The table Mapqfin defines the relation between the accelerator opening Accp and the engine speed NE, and the fuel injection quantity qfin; and is stored in the ROM 62.

Figure 10:
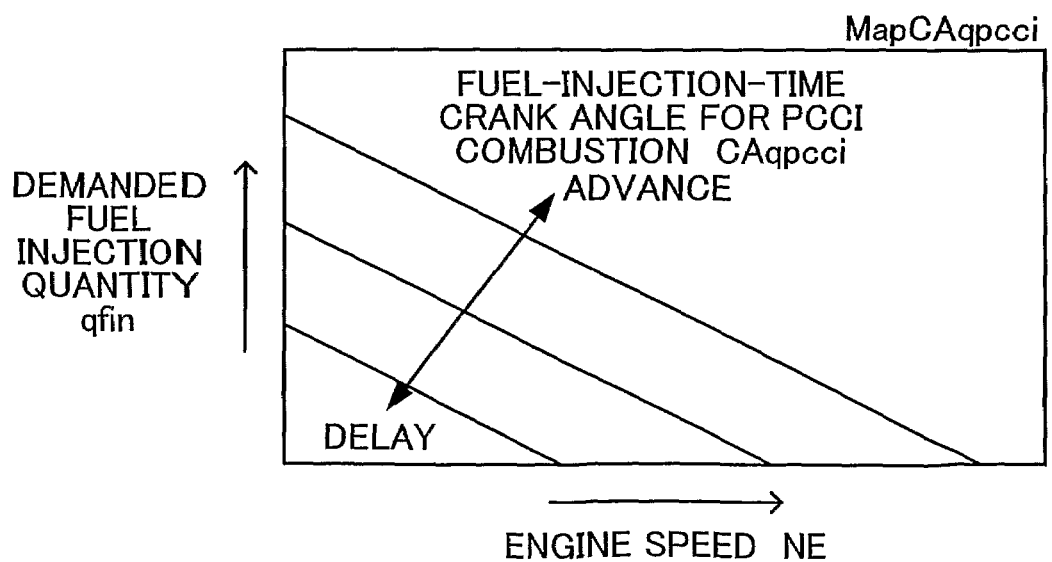
FIG. 10 is a table for determining a fuel-injection-time crank angle for PCCI combustion, to which the CPU shown in FIG. 1 refers during execution of the routine shown in FIG. 8.

Subsequently, the CPU 61 proceeds to step 815 so as to determine the fuel-injection-start-time crank angle for PCCI combustion CAqpcci from the demanded fuel injection quantity qfin, the engine speed NE, and a table (map) MapCAqpcci shown in FIG. 10. The table MapCAqpcci defines the relation between the demanded fuel injection quantity qfin and the engine speed NE, and the fuel-injection-start-time crank angle for PCCI combustion CAqpcci; and is stored in the ROM 62.

Figure 11:
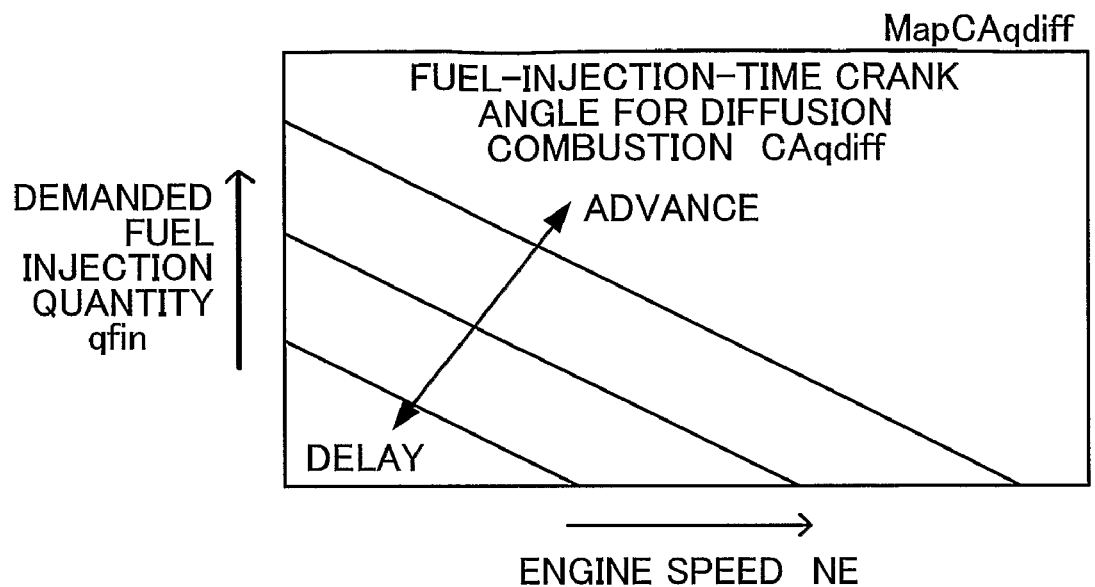
FIG. 11 is a table for determining a fuel-injection-time crank angle for diffusion combustion, to which the CPU shown in FIG. 1 refers during execution of the routine shown in FIG. 8.

Subsequently, the CPU 61 proceeds to step 820 so as to determine the fuel-injection-start-time crank angle for diffusion combustion CAqdiff from the demanded fuel injection quantity qfin, the engine speed NE, and a table (map) MapCAqdiff shown in FIG. 11. The table MapCAqdiff defines the relation between the demanded fuel injection quantity qfin and the engine speed NE, and the fuel-injection-start-time crank angle for diffusion combustion CAqdiff; and is stored in the ROM 62.

Figure 12:
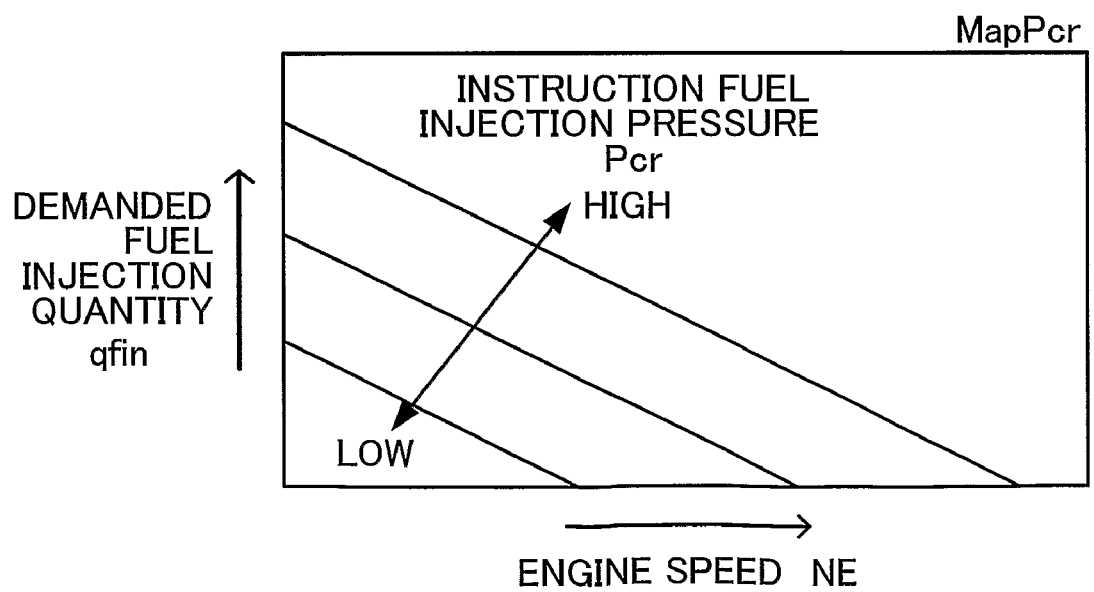
FIG. 12 is a table for determining an instruction fuel injection pressure, to which the CPU shown in FIG. 1 refers during execution of the routine shown in FIG. 8.

Next, the CPU 61 proceeds to step 825 so as to determine the instruction fuel injection pressure Pcr from the demanded fuel injection quantity qfin, the engine speed NE, and a table (map) MapPcr shown in FIG. 12. The table MapPcr defines the relation between the demanded fuel injection quantity qfin and the engine speed NE, and the instruction fuel injection pressure Pcr; and is stored in the ROM 62.

Figure 13:
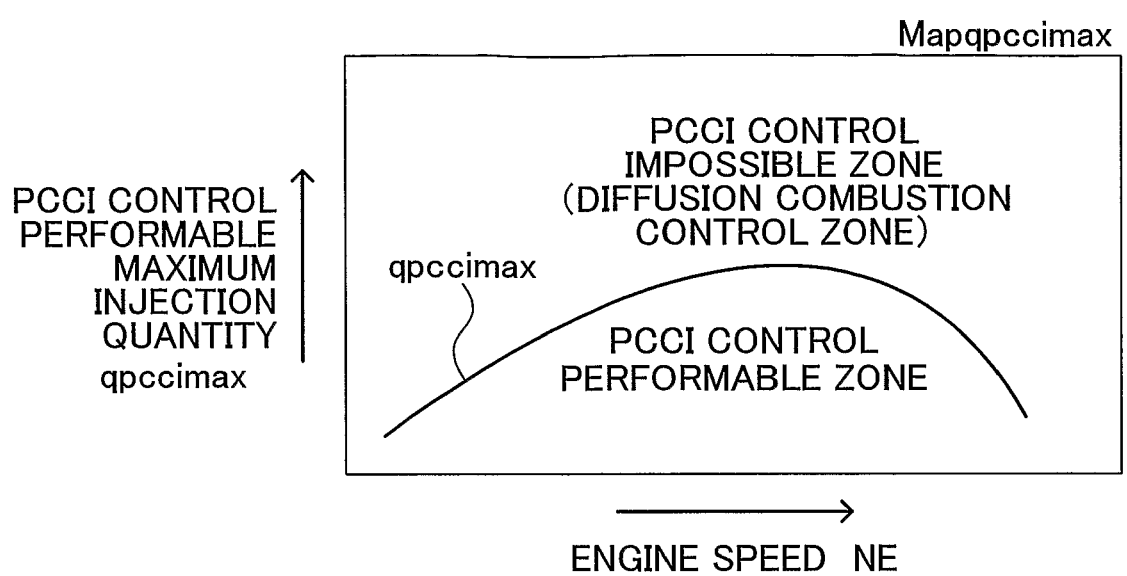
FIG. 13 is a table for determining a PCCI control performable maximum injection quantity, to which the CPU shown in FIG. 1 refers during execution of the routine shown in FIG. 8.
Figure 14:
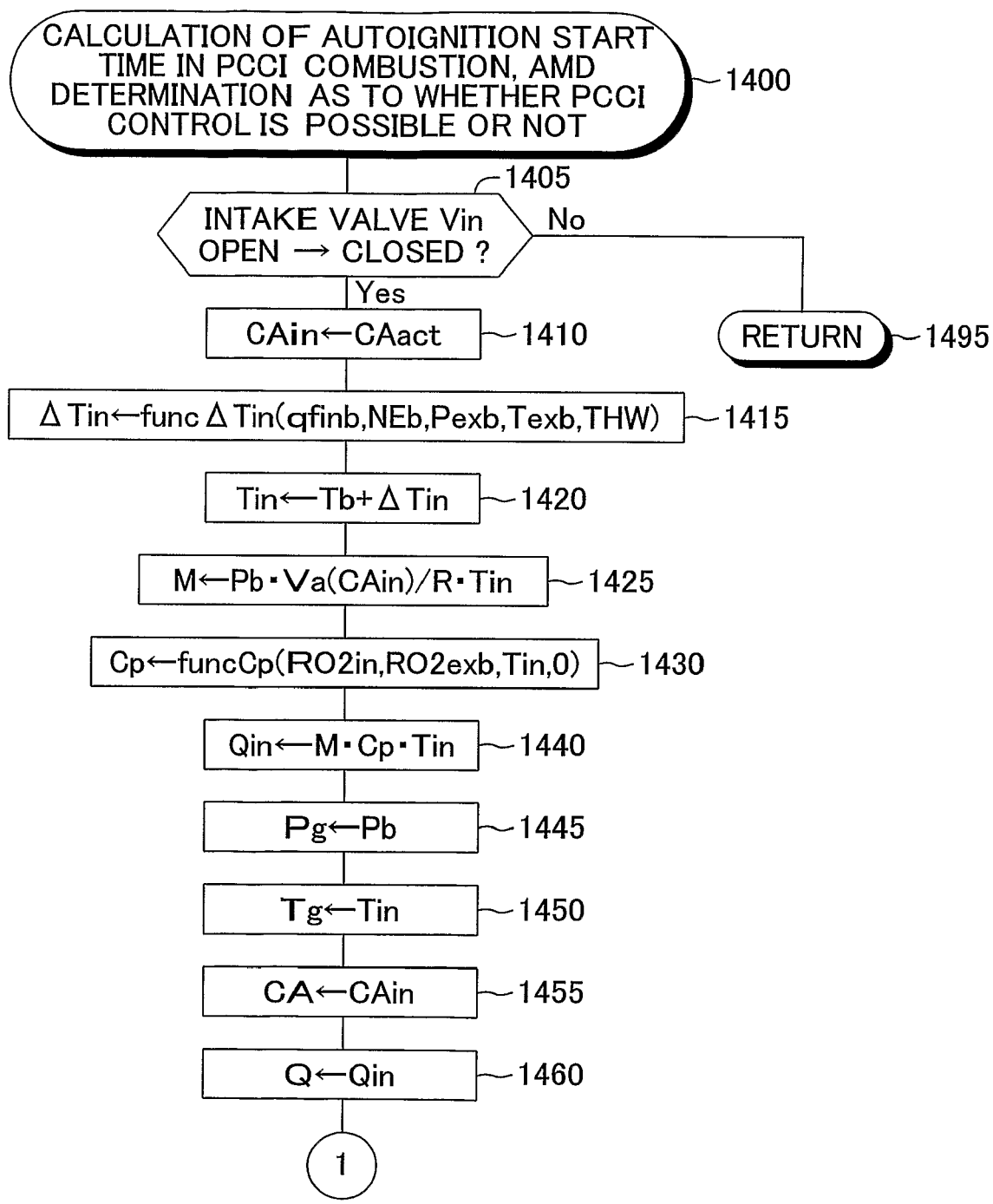
FIG. 14 shows a first portion of a routine which the CPU shown in FIG. 1 executes so as to calculate autoignition start time in PCCI combustion and determine whether PCCI control can be performed.

Next, the CPU 61 proceeds to step 830 so as to determine the PCCI control performable maximum injection quantity qpccimax from the engine speed NE and a table (map) Mapqpccimax shown in FIG. 13. The table Mapqpccimax defines the relation between the engine speed NE and the PCCI control performable maximum injection quantity qpccimax (for the case where the engine 10 is in a steady operation state); and is stored in the ROM 62.

Subsequently, the CPU 61 proceeds to step 835 so as to determine whether the demanded fuel injection quantity qfin obtained in step 810 is equal to or less than the PCCI control performable maximum injection quantity qpccimax. When the CPU 61 makes a "Yes" determination, the CPU 61 proceeds step 840 so as to (provisionally) set the entirety of the demanded fuel injection quantity qfin as the fuel injection quantity for PCCI combustion qpcci, and (provisionally) set the fuel injection quantity for diffusion combustion qdiff to zero. After that, the CPU 61 ends the current execution of the present routine.

When the CPU 61 makes a "No" determination in step 835, the CPU 61 proceeds step 845 so as to (provisionally) set the above-mentioned PCCI control performable maximum injection quantity qpccimax as the fuel injection quantity for PCCI combustion qpcci, and (provisionally) set, as the fuel injection quantity for diffusion combustion qdiff, a value obtained through subtraction of the PCCI control performable maximum injection quantity qpccimax from the demanded fuel injection quantity qfin. After that, the CPU 61 ends the current execution of the present routine. With this operation, the fuel injection quantity for PCCI combustion qpcci is prevented from being set to a value greater than the PCCI control performable maximum injection quantity qpccimax.

After that, the CPU 61 repeatedly executes the processing of steps 800, 805, and 895 until the time for calculating the demanded fuel injection quantity qfin comes in the next operation cycle. In this manner, the fuel injection quantity for PCCI combustion qpcci for the present operation cycle and the fuel injection quantity for diffusion combustion qpdiff for the present operation cycle are (provisionally) determined in the vicinity of the compression bottom dead center.

Calculation of Autoignition Start Time in PCCI Combustion, etc.

The CPU 61 repeatedly executes, at predetermined intervals, a routine shown by the flowcharts of FIGS. 14 to 18 and adapted to calculate the autoignition start time in PCCI combustion, etc. Therefore, when a predetermined timing has been reached, the CPU 61 starts the routine from step 1400, and then proceeds to step 1405 so as to determine whether the closing time of the intake valve Vin (time when the intake valve Vin changes from an open state to a closed state; time after the above-mentioned near compression bottom dead center) has come. When the CPU 61 makes a "No" determination, the CPU 61 proceeds directly to step 1495 so as to end the current performance of the present routine.

Here, the closing time of the intake valve Vin is assumed to have come. In this case, the CPU 61 makes a "Yes" determination in step 1405, and proceeds to step 1410 so as to set, as the compression-start-time crank angle CAin, the present actual crank angle CAact detected by means of the crank position sensor 74.

Next, the CPU 61 proceeds to step 1415 so as to obtain the intake-gas-temperature correction amount $\Delta$Tin in accordance with the above-described Eq. (5). Here, the value stored in step 1870 of FIG. 18 during the previous execution of the present routine is used as the previous demanded fuel injection quantity qfinb; the values obtained from the corresponding sensors 74, 83, and 82 at a predetermined time in the exhaust stroke of the previous operation cycle are used as NEb, Pexb, and Texb, respectively; and the value presently obtained from the water temperature sensor 78 is used as THW.

Next, the CPU 61 proceeds to step 1420 so as to obtain the compression-start-time cylinder interior temperature Tin from the intake-gas temperature Tb obtained by means of the intake-gas temperature sensor 72 at the present time (i.e., compression start time), the obtained intake-gas-temperature correction amount $\Delta$Tin, and the above-described Eq. (4).

Subsequently, the CPU 61 proceeds to step 1425 so as to obtain the cylinder interior gas mass M (=compression-start-time cylinder interior gas mass M0) from the intake pipe pressure Pb obtained by means of the intake pipe pressure sensor 73 at the present time (i.e., compression start time), the cylinder interior volume Va(CAin) at the present time, the obtained compression-start-time cylinder interior temperature Tin, and an equation described in the box of step 1425 and corresponding to the above-described Eq. (3).

Subsequently, the CPU 61 proceeds to step 1430 so as to obtain the constant-pressure specific heat Cp of the cylinder interior gas (at the compression start time) from the intake-gas oxygen concentration RO2in obtained by means of the intake-gas oxygen concentration sensor 77 at the present time (i.e., compression start time), the exhaust-gas oxygen concentration RO2exb obtained by means of the exhaust-gas oxygen concentration sensor 81 at a predetermined time in the exhaust stroke of the previous operation cycle, the obtained compression-start-time cylinder interior temperature Tin, and an equation corresponding to the above-described Eq. (8).

After that, the CPU 61 proceeds to step 1440 so as to obtain the heat energy Qin of the cylinder interior gas at the compression start time from the obtained cylinder interior gas mass M, the obtained constant-pressure specific heat Cp, the obtained compression-start-time cylinder interior temperature Tin, and an equation corresponding to the above-described Eq. (1).

The CPU 61 then proceeds to step 1445 so as to set, as the cylinder interior gas pressure Pg, the intake pipe pressure Pb used in step 1425, and then proceeds to step 1450 so as to set, as the cylinder interior temperature Tg, the compression-start-time cylinder interior temperature Tin obtained as described above. The CPU 61 then proceeds to step 1455 so as to set, as the crank angle CA, the compression-start-time crank angle CAin, and proceeds to step 1460 so as to set, as the heat energy Q of the cylinder interior gas, the value of the heat energy Qin of the cylinder interior gas at the compression start time. Through this processing, values (initial values) at the compression start time are set to Pg, Tg, CA, and Q, respectively.

Figure 15:
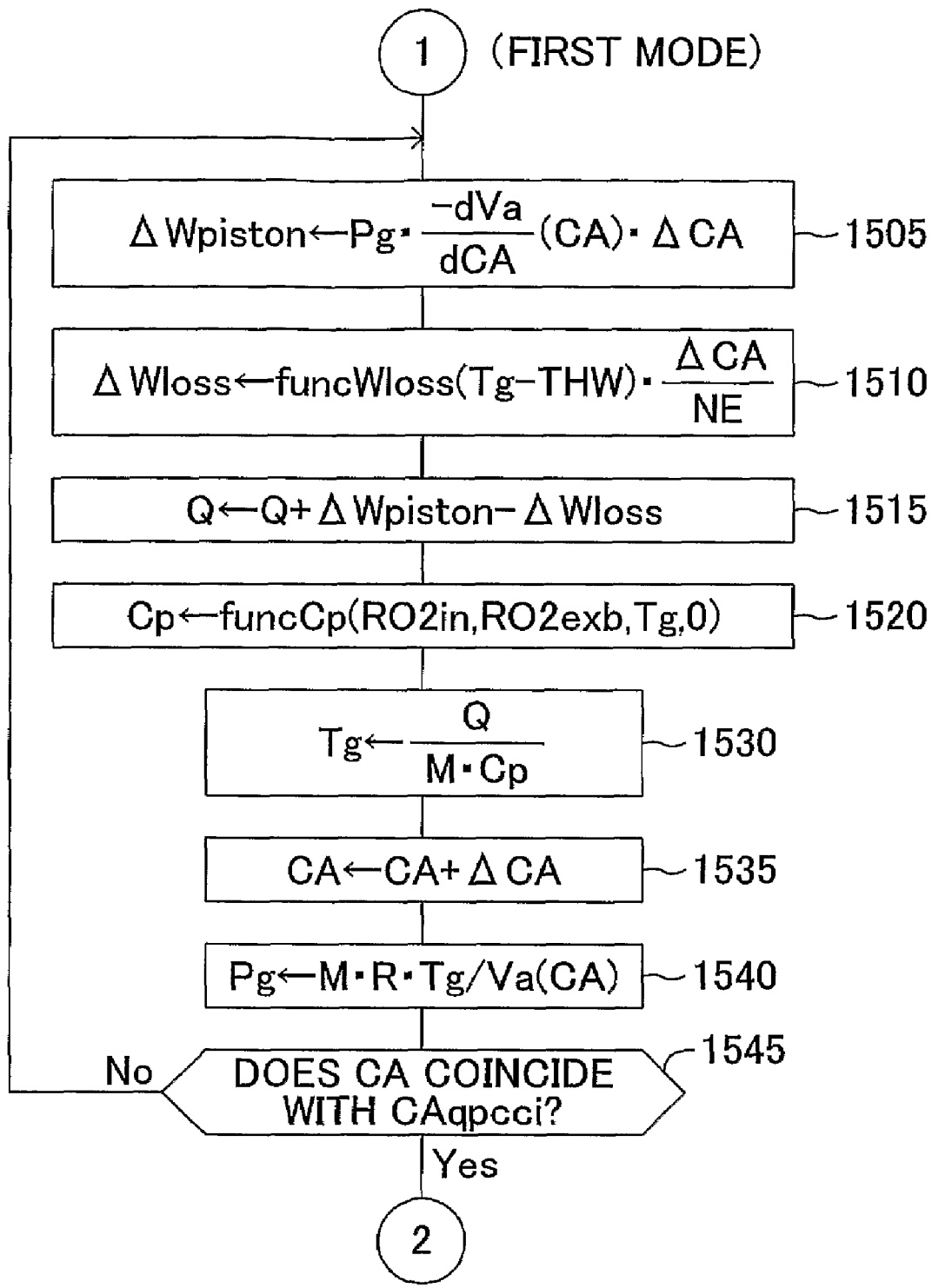
FIG. 15 shows a second portion of the routine which the CPU shown in FIG. 1 executes so as to calculate autoignition start time in PCCI combustion and determine whether PCCI control can be performed.

Next, the CPU 61 proceeds to step 1505 of FIG. 15 so as to start calculation in the first mode period. First, in step 1505, the CPU 61 obtains the minute piston work $\Delta$Wpiston in accordance with the above-described Eq. (11). For Pg and CA, the newest values (at this stage, the value set in step 1445 and the value set in step 1455) are used respectively.

Next, the CPU 61 proceeds to step 1510 so as to obtain the minute energy loss $\Delta$Wloss in accordance with the above-described Eq. (15). For Tg, the newest value (at this stage, the value set in step 1450) is used. For NE, the value at the compression start time is used. For THW, the value used in step 1415 (i.e., the value at the compression start time) is used.

Subsequently, the CPU 61 proceeds to step 1515 so as to set, as a new heat energy Q (its latest value) of the cylinder interior gas, a value obtained by adding the minute piston work $\Delta$Wpiston obtained in step 1505 to the latest value of the heat energy Q of the cylinder interior gas (at this stage, Qin) and subtracting therefrom the minute energy loss $\Delta$Wloss obtained in step 1510.

Next, the CPU 61 proceeds to step 1520 so as to obtain the constant-pressure specific heat Cp of the cylinder interior gas at the present stage in accordance with the above-described Eq. (8) as in the previously described step 1430. For RO2in and RO2exb, the respective values used in step 1430 are used. For Tg, the latest value (at the present stage, the value set in step 1450) is used.

Next, the CPU 61 proceeds to step 1530 so as to obtain the latest value of the cylinder interior temperature Tg from the latest value Q of the heat energy of the cylinder interior gas obtained in step 1515, the cylinder interior gas mass M obtained in the previously described step 1425, the constant-pressure specific heat Cp obtained in step 1525, and the above-described Eq. (2).

Subsequently, the CPU 61 proceeds to step 1535 so as to set, as a new crank angle CA (its latest value), a value obtained by adding the minute crank angle $\Delta$CA to the latest value of the crank angel CA (at the present stage, CAin), and then proceeds to step 1540 so as to obtain the latest value of the cylinder interior pressure Pg from the cylinder interior gas mass M obtained in the previously described step 1425, the latest value of the cylinder interior temperature Tg obtained in step 1530, the latest value of the crank angle CA, and the state equation of gas regarding the cylinder interior gas.

After that, the CPU 61 proceeds to step 1545 so as to determine whether the latest value of the crank angle CA obtained in step 1535 coincides with the fuel-injection-start-time crank angle for PCCI combustion CAqpcci set in sep 815 of FIG. 8. At the present stage, the latest value of the crank angle CA is (CAin+$\Delta$CA) and has not yet reached CAqpcci. Therefore, the CPU 61 makes a "No" determination in step 1545, and returns to step 1505 to thereby again perform the processing of steps 1505 to 1545. At this time, the values updated in steps 1540 and 1535, respectively, are used as the latest values of Pg and CA in step 1505; and the value updated in step 1530 is used as Tg in steps 1510 and 1520.

That is, the processing of steps 1505 to 1545 is repeatedly performed until the latest value of the crank angle CA reaches the fuel-injection-start-time crank angle for PCCI combustion CAqpcci as result of repeated performance of step 1535. Consequently, through repeated execution of step 1530, the cylinder interior temperature Tg in the first mode period in the present compression stroke is estimated for each minute crank angle ΔCA in a manner related to the crank angle CA.

Figure 16:
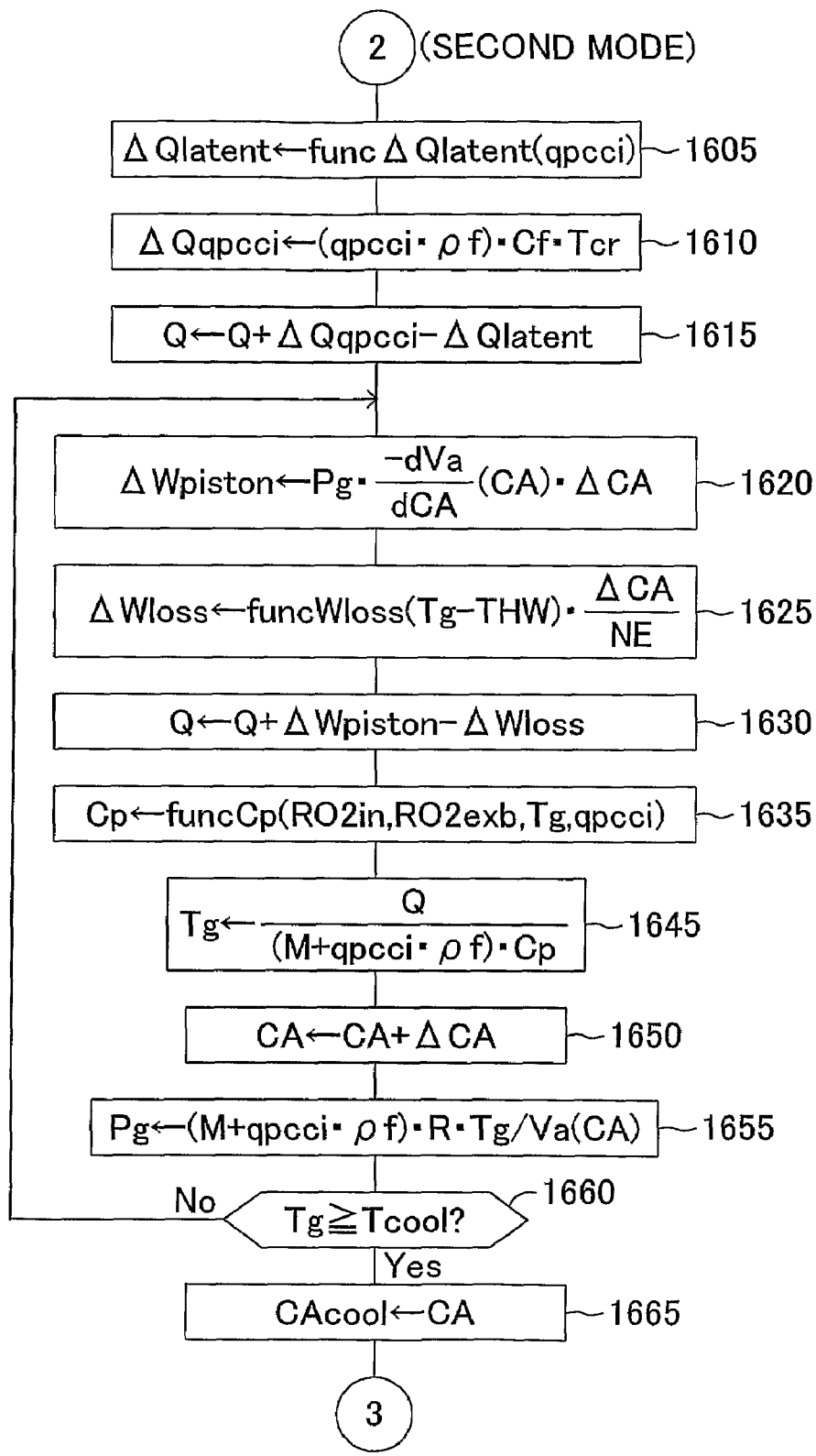
FIG. 16 shows a third portion of the routine which the CPU shown in FIG. 1 executes so as to calculate autoignition start time in PCCI combustion and determine whether PCCI control can be performed.

When the latest value of the crank angle CA has reached the fuel-injection-start-time crank angle for PCCI combustion CAqpcci as result of repeated performance of step 1535, the CPU 61 makes a "Yes" determination in step 1545, and then proceeds to step 1605 of FIG. 16. As a result, the calculation in the first mode period ends, and the calculation in the second mode period starts.

After having proceeded to step 1605, the CPU 61 obtains the latent heat ΔQlatent produced by the injection of fuel for PCCI combustion in accordance with the above-described Eq. (17). For the fuel injection quantity qpcci for PCCI combustion, the value obtained in step 840 or 845 of FIG. 8 is used. Next, the CPU 61 proceeds to step 1610 so as to obtain the heat energy ΔQqpcci of fuel vapor in accordance with the above-described Eq. (18). The value used in the step 1605 is used is used as qpcci, and for convenience, the value detected by means of the fuel temperature sensor 76 at the compression start time is used as Tcr. The CPU 61 then proceeds to step 1615 so as to set, as a new heat energy Q (its latest value) of the cylinder interior gas, a value obtained by adding the heat energy ΔQqpcci of fuel vapor to the latest value of the heat energy Q of the cylinder interior gas (at this stage, the value updated in the previously described step 1515 (the final value in the first mode period) and subtracting therefrom the above-mentioned latent heat ΔQlatent.

After that, the CPU 61 successively performs the processing of step 1620 to step 1655. Since the processing of step 1620 to step 1655 corresponds to that of step 1505 to step 1540 of FIG. 15, detailed descriptions of these steps are omitted. At the present stage, the values updated in steps 1540 and 1535, respectively, are used as the latest vales of Pg and CA in step 1620. The value updated in step 1530 is used as Tg in steps 1625 and 1635. Further, in step 1635 corresponding to step 1520, the above-described Eq. (7) is used instead of the above-described Eq. (8), and in steps 1645 and 1655, which correspond to step 1530 and 1540 respectively, (M+qpcci·ρf) is used instead of the cylinder interior gas mass M(=M0).

Subsequently, the CPU 61 proceeds to step 1660 so as to determine whether the latest value of the cylinder interior temperature Tg obtained in step 1645 is equal to or greater than the cool flame start temperature Tcool. At the present stage, the latest value of the cylinder interior temperature Tg is lower than the cool flame start temperature Tcool. Therefore, the CPU 61 makes a "No" determination in step 1660, and returns to step 1620 so as to again perform the processing of steps 1620 to 1655. At this time, the values updated in steps 1655 and 1650, respectively, are used as the latest values of Pg and CA in step 1620; and the value updated in step 1645 is used as Tg in steps 1625 and 1635.

That is, the processing of steps 1620 to 1655 is repeatedly performed until the latest value of the cylinder interior temperature Tg becomes equal to or greater than the cool flame start temperature Tcool as result of repeated performance of step 1645. Consequently, through repeated execution of step 1645, the cylinder interior temperature Tg in the second mode period in the present compression stroke is estimated for each minute crank angle ΔCA in a manner related to the crank angle CA.

When the latest value of the cylinder interior temperature Tg repeated updated in step 1645 has become equal to or greater than the cool flame start temperature Tcool, the CPU 61 makes a "Yes" determination in step 1660. In this case, after storing the crank angle CA at this stage as the cool-flame-start-time crank angle. CAcool, the CPU 61 proceeds to step 1705 of FIG. 17. As a result, the calculation in the second mode period ends, and the calculation in the third mode period starts.

After having proceeded to step 1705, the CPU 61 sets, as the cool-flame-start-time cylinder interior gas density ρcool, a value obtained by dividing the cylinder interior gas mass (M+qpcci·ρf) at the cool flame start time by the cylinder interior volume Va(CAcool) at the cool flame start time. In step 1710 subsequent thereto, the CPU 61 obtains the cool flame heat generation quantity ΔQlto in accordance with the above-described Eq. (19). For qpcci, the value used in the previously described step 1605 is used, and for RO2in, the value used in the previously described step 1520 is used.

Subsequently, the CPU 61 proceeds to step 1715 so as to set, as a new heat energy Q (its latest value) of the cylinder interior gas, a value obtained by adding the cool flame heat generation quantity ΔQlto to the latest value of the heat energy Q of the cylinder interior gas (at this stage, the value updated in the previously described step 1630 (the final value in the second mode period).

After that, the CPU 61 successively performs the processing of step 1720 to step 1755. Since the processing of step 1720 to step 1755 corresponds to that of step 1620 to step 1655 of FIG. 16, detailed descriptions of these steps are omitted. At the present stage, the values updated in steps 1655 and 1650, respectively, are used as the latest vales of Pg and CA in step 1720, and the value updated in step 1645 is used as Tg in steps 1725 and 1735.

Subsequently, the CPU 61 proceeds to step 1760 so as to determine whether the latest value of the cylinder interior temperature Tg obtained in step 1745 is equal to or greater than the autoignition start temperature Tig. At the present stage, the latest value of the cylinder interior temperature Tg is lower than the autoignition start temperature Tig. Therefore, the CPU 61 makes a "No" determination in step 1760, and returns to step 1720 so as to again perform the processing of steps 1720 to 1755. At this time, the values updated in steps 1755 and 1750, respectively, are used as the latest values of Pg and CA in step 1720; and the value updated in step 1745 is used as Tg in steps 1725 and 1735.

That is, the processing of steps 1720 to 1755 is repeatedly performed until the latest value of the cylinder interior temperature Tg becomes equal to or greater than the autoignition start temperature Tig as result of repeated performance of step 1745. Consequently, through repeated execution of step 1745, the cylinder interior temperature Tg in the third mode period in the present compression stroke is estimated for each minute crank angle ΔCA in a manner related to the crank angle CA.

When the latest value of the cylinder interior temperature Tg repeated updated in step 1745 has become equal to or greater than the autoignition start temperature Tig, the CPU 61 makes a "Yes" determination in step 1760. In this case, after storing the crank angle CA at this stage as the autoignition-start-time crank angle CAing, the CPU 61 proceeds to step 1805 of FIG. 18. As a result, the calculation in the third mode period and the calculation of the autoignition start time end, and determination as to whether the PCCI control is possible is performed.

After having proceeded to step 1805, the CPU 61 obtains the equivalent ratio φ of the cylinder interior gas from the value obtained by performing a predetermined first-order lag processing for the intake air flow rate Ga detected by means of the airflow meter 71, the fuel injection quantity for PCCI combustion qpcci determined in the previously described step 840 or 845, and the above-described Eq. (20).

Next, the CPU 61 proceeds to step 1810 selects a map Mapjudge on the basis of the combination of the engine speed NE and the fuel injection quantity for PCCI combustion qpcci at the present point in time. In step 1815 subsequent thereto, the CPU 61 determines whether the engine 10 is in a transitional operation state. Specifically, such determination is performed on the basis of the result of determination as to whether the differences between the maximum values and minimum values (peak-to-peak values) of the accelerator opening Accp and the engine speed NE during a predetermined period before the present time are equal to or less than corresponding predetermined values.

When at least one of the peak-to-peak values is in excess of the predetermined value, CPU 61 makes a "Yes" determination in step 1815 (i.e., determines that the engine 10 is in a transitional operation state), and then proceeds to step 1820 so as to correct the selected map Mapjudge from the combination of the intake-gas oxygen concentration RO2in and the cylinder interior gas mass M at the present time (i.e., the compression start time). After that, the CPU 61 proceeds to step 1825. Meanwhile, when both the peak-to-peak values are not greater than the predetermined values, CPU 61 makes a "No" determination in step 1815 (i.e., determines that the engine 10 is in a steady operation state), and then proceeds directly to step 1825. Accordingly, correction of the selected map Mapjudge is not performed.

In step 1825, the CPU 61 selects the value of a variable XHAN on the basis of the equivalent ratio $\phi$ obtained in step 1805, the autoignition-start-time crank angle CAig stored in the previously described step 1765, and the selected map Mapjudge. As shown in FIG. 7, the value of the variable XHAN is set to "1" when the relation between the equivalent ratio $\phi$ and the autoignition-start-time crank angle CAig corresponds to the noise large zone, set to "2" when the relation corresponds to the misfire zone, and set to "3" when the relation corresponds to the PCCI control performable zone.

Subsequently, in step 1830, the CPU 61 determines whether the value of the variable XHAN is "1." When the CPU 61 makes a "Yes" determination (i.e., determines that loud noise is generated), the CPU 61 proceeds to step 1835 so as to calculate the division ratio Ratioqpcci corresponding to "$\phi 2/\phi 1$" of FIG. 7 from $\phi$, CAig, and Mapjudge. In step 1840 subsequent thereto, the CPU 61 obtains the instruction final fuel injection quantity for PCCI combustion qfinpcci and the instruction final fuel injection quantity for diffusion combustion qfindiff in accordance with the above-described Eqs. (21) and (22), respectively, and on the basis of the demanded fuel injection quantity qfin having been determined in the previously described step 810 and the division ratio Ratioqpcci. Subsequently, the CPU 61 proceeds to step 1845 so as to open the EGR control value 52 by a predetermined amount from the present state, and close the turbocharger valve 35c by a predetermined amount from the present state. After that, the CPU 61 proceeds to step 1870.

Meanwhile, when the CPU 61 makes a "No" determination in step 1830, the CPU 61 proceeds to step 1850 so as to determine whether the value of the variable XHAN is "2." When the CPU 61 makes a "Yes" determination in step 1850 (i.e., determines that misfire occurs), the CPU 61 proceeds to step 1855 so as to set the instruction final fuel injection quantity for PCCI combustion qfinpcci to "0" and set the instruction final fuel injection quantity for diffusion combustion qfindiff to a value corresponding to the demanded fuel injection quantity qfin having been determined in the previously described step 810. Subsequently, the CPU 61 proceeds to step 1860 so as to close the EGR control value 52 by a predetermined amount from the present state, and open the turbocharger valve 35c by a predetermined amount from the present state. After that, the CPU 61 proceeds to step 1870.

On the other hand, when the CPU 61 makes a "No" determination in step 1850 (i.e., determines that PCCI control is possible), the CPU 61 proceeds to step 1865 so as to set, as the instruction final fuel injection quantity for PCCI combustion qfinpcci and the instruction final fuel injection quantity for diffusion combustion qfindiff, the values of the fuel injection quantity for PCCI combustion qpcci and the fuel injection quantity for diffusion combustion qdiff having been determined in the previously described step 840 or 845. After that, the CPU 61 proceeds to step 1870, while maintaining the EGR control valve 52 and the turbocharger throttle valve 35c in the present conditions.

In step 1870, the CPU 61 stores, as a previous demanded fuel injection quantity qfinb, the value of the present demanded fuel injection quantity qfin having been determined in the previously described step 810. After that, the CPU 61 proceeds to step 1495 so as to end the routine shown in FIGS. 14 to 18. The value stored here is used in step 1415 in the next execution of the present routine. After this point in time, until the intake valve Vin is closed again, the CPU 61 repeats the operation such that the CPU 61 makes a "No" determination when it proceeds to step 1405 of FIG. 14 and proceeds directly to step 1495 so as to end the present routine. In this manner, the autoignition start time (CAig) in PCCI combustion, determination as to whether PCCI control can be performed, and selection of the fuel injection mode are completed immediately after the compression start time (CAin) (before start of fuel injection for PCCI combustion (CAqpcci) at the latest)

Fuel Injection Control

Figure 19:
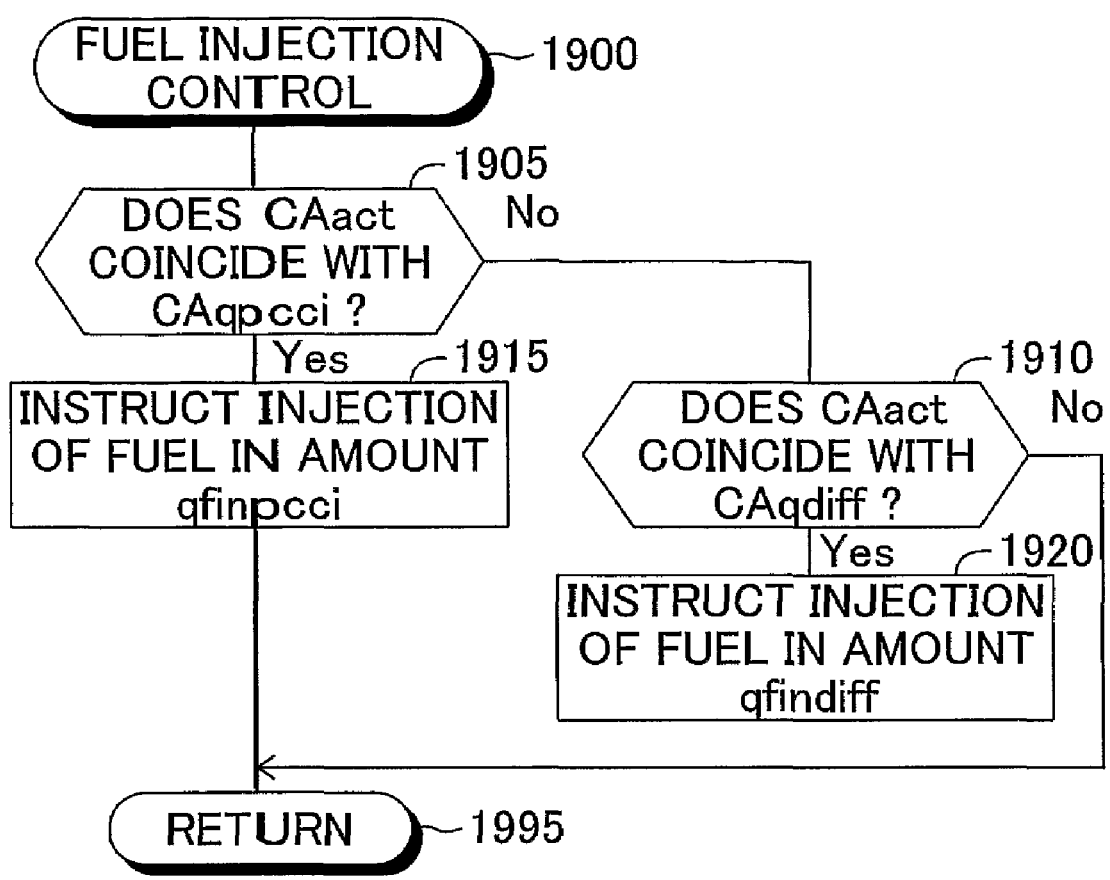
FIG. 19 is a flowchart showing a routine which the CPU shown in FIG. 1 executes so as to perform fuel injection control.

The CPU 61 repeatedly executes, at predetermined intervals, a routine shown by the flowchart of FIG. 19 and adapted to perform fuel injection control. Therefore, when a predetermined timing has been reached, the CPU 61 starts the routine from step 1900, and then proceeds to step 1905 so as to determine whether the actual crank angle CAact detected by means of the crank position sensor 74 coincides with the fuel injection crank angle for PCCI combustion CAqpcci having been determined in the previously described step 815.

Here, the present time is assumed to be immediately after the processing of the previously described steps 1830 to 1865 has been executed. In this case, since the actual crank angle CAact has not yet reached CAqpcci, the CPU 61 makes a "No" determination in step 1905, and then proceeds to step 1910 so as to determine whether the actual crank angle CAact coincides with the fuel injection crank angle for diffusion combustion CAqdiff having been determined in the previously described step 820. In this case, the CPU 61 makes a "No" determination in step 1910 as well, and then proceeds directly to step 1995 so as to end the current execution of the present routine.

After that, the CPU 61 repeatedly executes the processing of steps 1900, 1905, and 1910 until the actual crank angle CAact reaches CAqpcci. When the actual crank angle CAact has reached CAqpcci, the CPU 61 makes a "Yes" determination in step 1905, and then proceeds to step 1915 so as to instruct the corresponding fuel injection valve 21 to inject fuel in an amount corresponding to the instruction final fuel injection quantity for PCCI combustion qfinpcci having been set in the previously described step 1840, 1855, or 1865.

After that, the CPU 61 repeatedly executes the processing of steps 1900, 1905, and 1910 until the actual crank angle CAact reaches CAqdiff. When the actual crank angle CAact has reached CAqdiff, the CPU 61 makes a "Yes" determination in step 1910, and then proceeds to step 1920 so as to instruct the corresponding fuel injection valve 21 to inject fuel in an amount corresponding to the instruction final fuel injection quantity for diffusion combustion qfindiff having been set in the previously described step 1840, 1855, or 1865.

Notably, when the injection quantity has been set to "0," any fuel injection instruction is not issued in step 1915 or 1920. By virtue of the above-described processing, fuel injection control corresponding to the selected fuel injection mode is immediately performed in the present operation cycle.

As described above, in the embodiment of the control apparatus including the gas-mixture-ignition-time estimation apparatus for an internal combustion engine according to the present invention, at least the state quantity of the cylinder interior gas at the compression start time (CAin) (the heat energy Qin of the cylinder interior gas at the compression start time), the amount of a change in the state quantity of the cylinder interior gas because of compression in the compression stroke (minute piston work ΔWpistion), and the heat generation quantity of a cool flame generated prior to autoignition (hot flame) during PCCI combustion (cool flame heat generation quantity ΔQlto) are taken into consideration when the temperature of a premixed gas mixture for PCCI combustion (cylinder interior temperature Tg) is estimated while being related to the crank angel CA; and the point in time when the cylinder interior temperature Tg reaches a predetermined autoignition start temperature Tig is estimated as an autoignition start time (CAig) in relation to PCCI combustion. Since the cool flame heat generation quantity ΔQlto is taken into consideration, the autoignition start time (CAig) in relation to PCCI combustion can be estimated accurately.

Moreover, since estimation of the autoignition start time (CAig) in the current operation cycle ends immediately after the compression start time (CAin), a fuel injection mode (the ratio between the instruction final fuel injection quantity for PCCI combustion qfinpcci and the instruction final fuel injection quantity for diffusion combustion qfindiff) most suitable for the current operation cycle can be immediately determined and executed on the bases of the estimated result. Accordingly, the effect of reducing the quantities of $NO_x$ and PM generated because of PCCI combustion can be maximized without generation of large noise or occurrence of misfire.

FIRST MODIFICATION

Next, there will be described a control apparatus including a gas-mixture-ignition-time estimation apparatus for an internal combustion engine according to a first modification of the above-described embodiment. This first modification is configured to estimate the cylinder interior temperature Tg (accordingly, the autoignition start crank angle CAig) in consideration of the degree of nonuniformity of fuel density of the premixed gas mixture at the cool flame start time (CAcool), and determines whether the autoignition start crank angle CAig is in the PCCI control performable range (accordingly, selects a fuel injection mode) in consideration the degree of nonuniformity.

As previously described, in actuality, in the case of a premixed gas mixture dispersed nonuniformly, the temperature (flame temperature of a cool flame) after generation of the cool flame becomes higher in a zone where the fuel density of the premixed gas mixture is higher. Therefore, the greater the degree of nonuniformity (in fuel density) of the premixed gas mixture at the cool flame start time (CAcool), the higher the maximum temperature in the temperature distribution of the premixed gas mixture after generation of a cool flame (i.e., in the third mode period).

Meanwhile, in actuality, the autoignition of the premixed gas mixture is considered to start when the maximum temperature in the temperature distribution of the premixed gas mixture reaches the above-mentioned autoignition start temperature Tig. Therefore, there is a trend that the greater the degree of nonuniformity of the premixed gas mixture at the cool flame start time (CAcool), the greater the degree to which the autoignition start time (CAig) of the premixed gas mixture advances.

Moreover, the degree of nonuniformity of the premixed gas mixture at the cool flame start time (CAcool) is considered to greatly change depending on the elapsed time between the fuel injection start time for PCCI combustion (CAqpcci) to the cool flame start time (CAcool), the effective injection pressure ΔPcr (the difference between the fuel injection pressure for PCCI combustion Pcr and the fuel-injection-time cylinder interior gas pressure Pg), a swirl flow rate (i.e., a value obtained by multiplying a swirl ratio Ratioswl by the engine speed NE), and the nature of fuel (in the present example, fuel density ρf). Therefore, it is possible to prepare in advance a map for obtaining the above-mentioned nonuniformity degree by use of these values as arguments. In the first modification, such a map is previously stored in the ROM 62.

In view of the above, during the execution of the routine shown in FIGS. 14 to 18, the control apparatus according to the first modification obtains the degree of nonuniformity of the premixed gas mixture at the cool flame start time on the basis of the above-mentioned arguments and the above-mentioned map, and the estimated value of the cylinder interior temperature Tg in the third mode period (specifically, the value calculated in step 1745) is corrected to assume a higher value in accordance with the obtained nonuniformity degree. At this time, the greater the obtained nonuniformity degree, the higher the value to which the correction amount is set.

As a result, after start of a cool flame (in the third mode period), the maximum temperature in the temperature distribution of the premixed gas mixture is estimated as the temperature of the premixed gas mixture (accordingly, the cylinder interior temperature Tg). Therefore, the premixed-gas-mixture autoignition start time (CAig) can be estimated more accurately.

In the above-described embodiment, when the determination as to whether the autoignition start crank angle CAig falls in the PCCI control performable range is performed on the basis of the estimated autoignition start crank angle CAig, the equivalent ratio φ of the premixed gas mixture, and the above-mentioned map Mapjudge (accordingly, when a fuel injection mode is selected), the value obtained in accordance with the above-described Eq. (20) under the assumption that the premixed gas mixture is uniformly distributed within the combustion chamber is used as the equivalent ratio φ of the premixed gas mixture.

However, in actuality, the value of the equivalent ratio φ, which determines the PCCI control performable range, is considered to be the maximum value in the distribution of the equivalent ratio φ of the premixed gas mixture nonuniformly dispersed within the combustion chamber, and the maximum value of the equivalent ratio φ depends on the degree of nonuniformity of the premixed gas mixture at the cool flame start time (CAcool).

In view of the above, during the execution of the routine shown in FIGS. 14 to 18, the control apparatus according to the first modification corrects, in an increasing direction, the equivalent ratio φ of the premixed gas mixture calculated in step 1805 in accordance with the degree of nonuniformity of the premixed gas mixture at the cool flame start time. At this time, the greater the obtained nonuniformity degree, the higher the value to which the correction amount is set. As a result, the above-mentioned determination (accordingly, selection of a fuel injection mode) is performed on the basis of the maximum temperature in the distribution of the equivalent ratio φ of the premixed gas mixture, which nonuniformly distributes in actuality. Therefore, the fuel injection mode in the present operation cycle can be controlled more properly.

SECOND MODIFICATION

Next, there will be described a control apparatus including a gas-mixture-ignition-time estimation apparatus for an internal combustion engine according to a second modification of the above-described embodiment. This second modification is configured to perform learning of the cool flame heat generation quantity $\Delta Qlto$.

Figure 20:
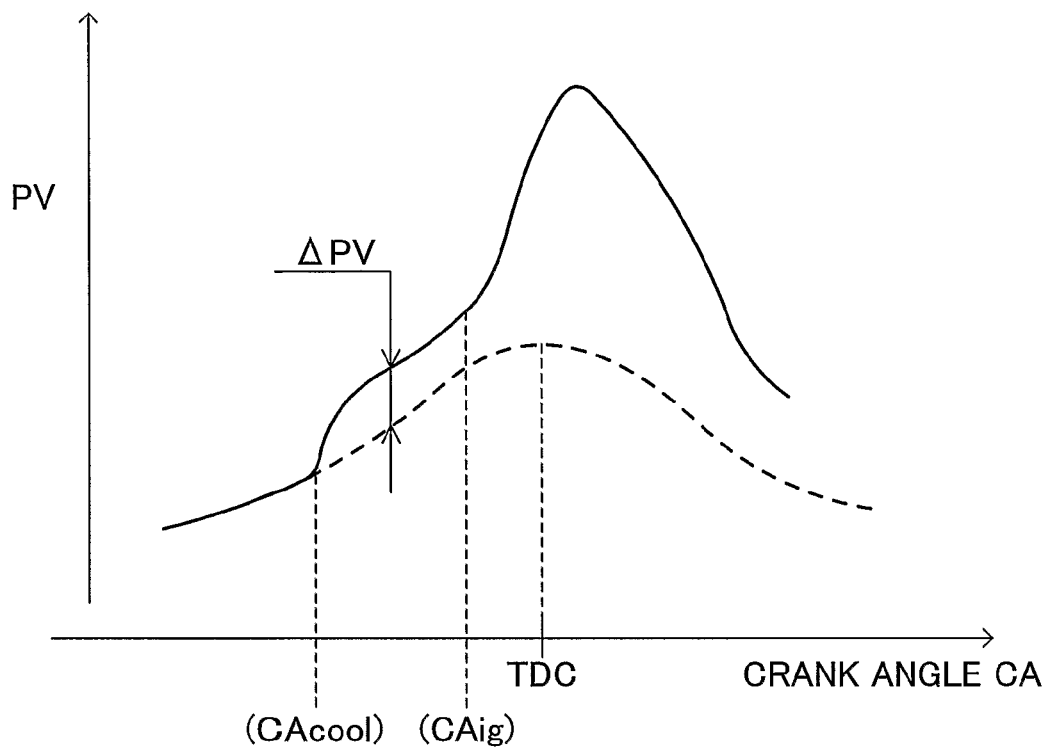
FIG. 20 is a chart used for describing $\Delta PV$ which an engine control apparatus according to a second modification of the embodiment of the present invention uses for detection of a cool-flame heat generation quantity from PV value of a cylinder interior gas.

FIG. 20 is a chart showing changes in the product (PV value) of the pressure Pg and the volume Va of the cylinder interior gas in the compression stroke (and the expansion stroke). In FIG. 20, a broken line shows a change in the PV value for the case where the cylinder interior gas is assumed to cause adiabatic changes without generation of cool flame and autoignition (hot flame), and a solid line shows a change in the PV value for the case where generation of a cool flame and autoignition (hot flame) actually occurs.

As shown in FIG. 20, after the cool flame start time (CAcool), the PV value increases by an amount corresponding to the cool flame heat generation quantity $\Delta Qlto$. In other words, the difference between the value indicated by the solid line and the value indicated by the broken line ($\Delta PV$ in FIG. 20) at a predetermined time after the actual cool flame start time can serve as a value which accurately represents the cool flame heat generation quantity $\Delta Qlto$. Accordingly, the cool flame heat generation quantity $\Delta Qlto$ can be accurately detected through calculation of the $\Delta PV$ value.

Meanwhile, in the above-described embodiment, the cool flame heat generation quantity $\Delta Qlto$ is estimated in accordance with the above-described Eq. (19) and on the basis of the table Map$\Delta Qlto$ whose arguments are the fuel injection quantity for PCCI combustion qpcci, the nature (cetane number CN) of fuel, the intake-gas oxygen concentration RO2in, and the cylinder interior gas density ρcool at the cool flame start time. Of the arguments, the cetane number CN of fuel can be accurately detected by detecting an ignition delay time (a time between start of fuel injection and start of ignition) during an idling operation from the output value of a cylinder interior pressure sensor for detecting the pressure inside the combustion chamber. Also, the quantity of fuel for PCCI combustion actually injected from the fuel injection valve 21 is considered to be equal to the instruction value (accordingly, the above described fuel injection quantity for PCCI combustion qpcci). Accordingly, the cetane number CN of fuel and the fuel injection quantity for PCCI combustion qpcci can serve as accurate arguments. However, the remaining arguments; i.e., the intake-gas oxygen concentration RO2in, and the cylinder interior gas density ρcool may involve errors.

In view of the above, when an error is generated in the estimation value of the cool flame heat generation quantity $\Delta Qlt$ with regard to the detection value detected on the basis of the $\Delta PV$ value shown in FIG. 20, such error can be considered to be caused by errors in the values of the intake-gas oxygen concentration RO2in and the cylinder interior gas density ρcool, which are used as arguments.

The control apparatus according to the second modification has a cylinder interior pressure sensor provided for each cylinder in order to detect the pressure of each combustion chamber (actual cylinder interior gas pressure Pgact). Further, every time a predetermined condition is satisfied, the control apparatus according to the second modification calculates an actual PV value, which is the product of the cylinder interior volume Va(CAact) and the actual cylinder interior gas pressure Pgact in the compression stroke detected on the basis of the output value of the cylinder interior pressure sensor in such a manner that the actual PV value is related to the actual crank angle CAact. Then, the control apparatus according to the second modification obtains the difference $\Delta PV$ between the actual PV value at a predetermined time after the actual cool flame start time and an adiabatic PV value at that predetermined time, which value is calculated under assumption that the cylinder interior gas causes an adiabatic change in the compression stroke, and obtains the detection value of the cool flame heat generation quantity $\Delta Qlto$ in the present operation cycle in accordance with the $\Delta PV$.

Subsequently, the control apparatus according to the second modification obtains the difference between the detection value of the cool flame heat generation quantity $\Delta Qlto$ and the estimation value of the cool flame heat generation quantity $\Delta Qlto$ in the present operation cycle which has already been obtained in step 1710 of FIG. 17, and obtains correction coefficients Kr and Kρ for the intake-gas oxygen concentration RO2in and the cylinder interior gas density ρcool on the basis of the difference. The correction ratio of the intake-gas oxygen concentration RO2in and the cylinder interior gas density ρcool is determined in accordance with the operation state of the engine 10.

Then, in the next and subsequent operation cycles, the control apparatus according to the second modification corrects the value of the intake-gas oxygen concentration RO2in detected by means of the intake-gas oxygen concentration sensor 77, by multiplying it by the above-mentioned correction coefficient Kr, and corrects the value of the cylinder interior gas density ρcool obtained in step 1705, by multiplying it by the above-mentioned correction coefficient Kρ. As a result, the respective values of the intake-gas oxygen concentration RO2in and the cylinder interior gas density ρcool, which are used as arguments for estimating the cool flame heat generation quantity $\Delta Qlto$, are learned on the basis of the detection value of the cool flame heat generation quantity $\Delta Qlto$. Therefore, the premixed-gas-mixture autoignition start time (CAig) in relation to PCCI combustion can be estimated more accurately.

Figure 21:
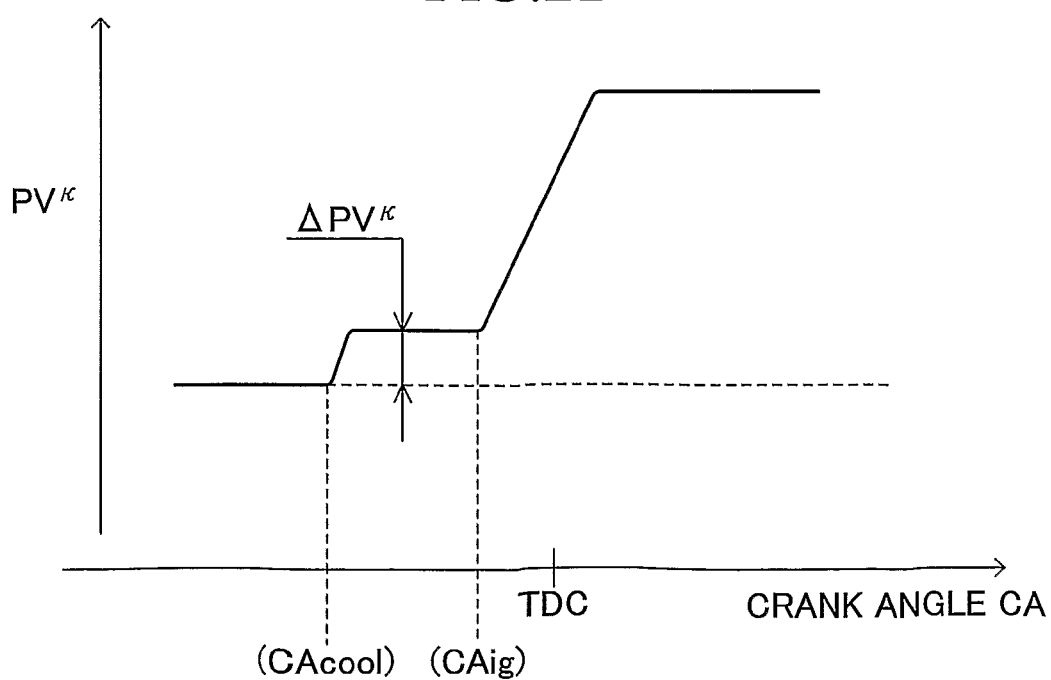
FIG. 21 is a chart used for describing $\Delta PV^\kappa$ which the engine control apparatus according to the second modification uses for detection of a cool-flame heat generation quantity from $PV^\kappa$ value of a cylinder interior gas.

FIG. 21 is a chart showing changes in the product ($PV^\kappa$ value) of the pressure Pg of the cylinder interior gas and a value of the volume Va to the κ-th power (where κ is the specific heat ratio) in the compression stroke (and the expansion stroke). In FIG. 21, a broken line shows a change in the $PV^\kappa$ value for the case where the cylinder interior gas is assumed to cause adiabatic changes without generation of cool flame and autoignition (hot flame), and a solid line shows a change in the $PV^\kappa$ value for the case where generation of a cool flame and autoignition (hot flame) actually occur.

As shown in FIG. 21, after the cool flame start time (CAcool), the $PV^\kappa$ value increases by an amount corresponding to the cool flame heat generation quantity $\Delta$Qlto. In other words, the difference between the value indicated by the solid line and the value indicated by the broken line ($\Delta PV^\kappa$ in FIG. 21) at a predetermined time after the actual cool flame start time can be a value which accurately represents the cool flame heat generation quantity $\Delta$Qlto. Accordingly, the intake-gas oxygen concentration RO2in, and the cylinder interior gas density $\rho$cool can be learned on the basis the $\Delta PV^\kappa$ value instead of the $\Delta PV$ value.

Also, the intake-gas oxygen concentration has a strong correlation with the period between the cool flame start time and the hot flame end time (hereinafter referred to as "combustion period") of the premixed gas mixture in relation to PCCI combustion; and the higher the intake-gas oxygen concentration, the faster the combustion speed, and the shorter the combustion period. Accordingly, the intake-gas oxygen concentration can be accurately detected, if the combustion period can be detected.

Figure 22:
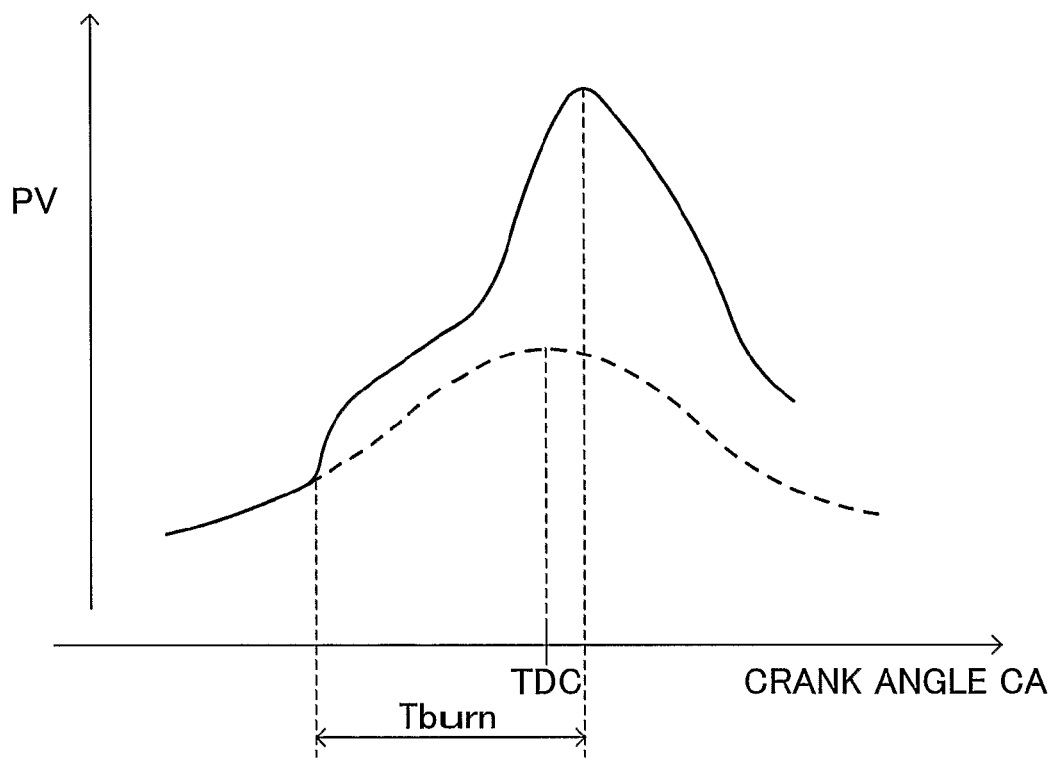
FIG. 22 is a chart showing a method by which the engine control apparatus according to the second modification detects a combustion period from the PV value of the cylinder interior gas.

As shown in FIG. 22, which shows a change in the PV value in the compression stroke (and expansion stroke) as in the previously described FIG. 20, the combustion period can be accurately detected by detecting as the cool flame start time, the time at which the difference between the actual PV value and the adiabatic PV value becomes equal to or greater than a predetermined small value, and detecting, as the hot flame end time, the time at which the actual PV value reaches the peak. This is based on the experiment result such that the time at which the actual PV value reaches the peak generally corresponds to the time at which the hot flame actually ends.

In view of the above, the control apparatus of the second modification may be configured to obtain the combustion period by the above-described method, accurately obtain the intake-gas oxygen concentration on the basis of the obtained combustion period, and obtain the above-mentioned correction coefficient Kr (accordingly, the correction coefficient K$\rho$) on the basis of the difference between the obtained intake-gas oxygen concentration and the intake-gas oxygen concentration RO2in detected by means of the intake-gas oxygen concentration sensor 77.

Figure 23:
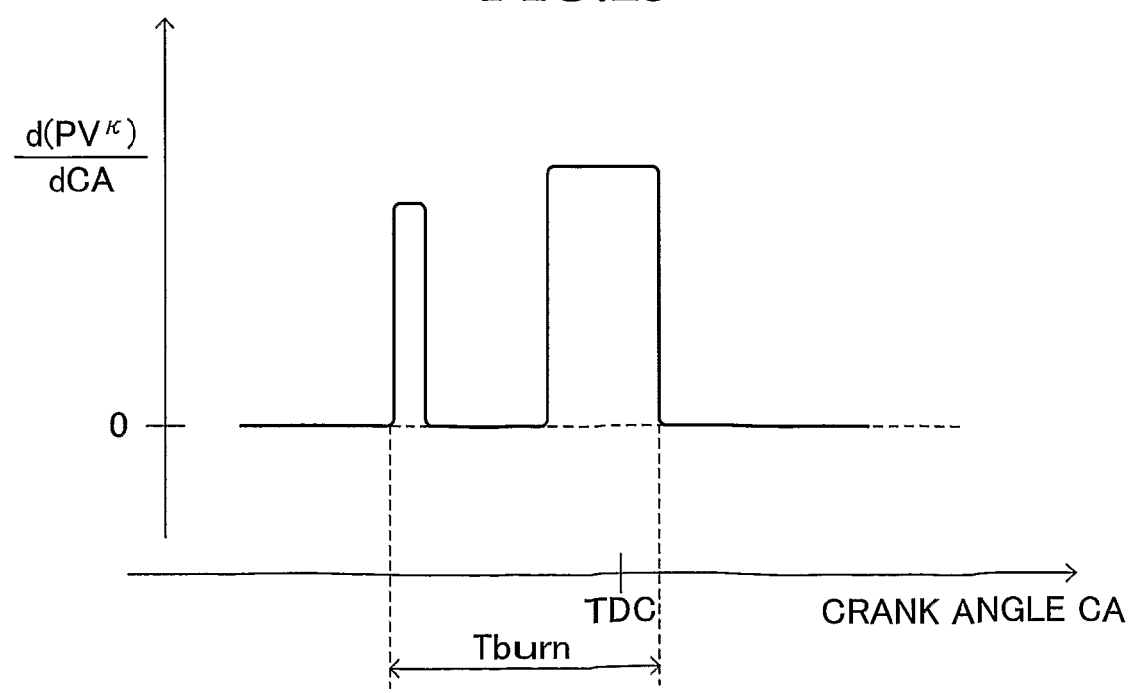
FIG. 23 is a chart showing a method by which the engine control apparatus according to the second modification detects a combustion period from the $(dPV^\kappa/dCA)$ value of the cylinder interior gas.

Notably, as shown in FIG. 23, which showing changes in the value ($PV^\kappa/dCA$) obtained by differentiating, with respect to the crank angle CA, the product ($PV^\kappa$ value; see FIG. 21) of the pressure Pg of the cylinder interior gas and a value of the volume Va to the $\kappa$-th power (where $\kappa$ is the specific heat ratio) in the compression stroke (and the expansion stroke), the combustion period can also be accurately detected by detecting as the cool flame start time, the time at which the value ($PV^\kappa/dCA$) first exceeds a predetermined value in the compression stroke, and detecting, as the hot flame end time, the time at which the value ($PV^\kappa/dCA$) exceeds the predetermined value second time in the compression stroke.

THIRD MODIFICATION

Next, there will be described a control apparatus including a gas-mixture-ignition-time estimation apparatus for an internal combustion engine according to a third modification of the above-described embodiment. This third modification is configured to perform learning of the cool flame heat generation quantity $\Delta$Qlto as in the second modification.

The control apparatus according to the third modification also has a cylinder interior pressure sensor provided for each cylinder in order to detect the pressure of each combustion chamber (actual cylinder interior gas pressure Pgact). Further, every time a predetermined condition is satisfied, the control apparatus according to the third modification detects the actual autoignition start time CAigact in the present operation cycle on the basis of a change in the actual cylinder interior gas pressure Pgact. Subsequently, the control apparatus according to the third modification obtains the difference between the actual autoignition start time CAigact and the estimation value of the autoignition start time CAig in the present operation cycle which has already been obtained in step 1765 of FIG. 17, and obtains a correction coefficient Kq for the cool flame heat generation quantity $\Delta$Qlto on the basis of the difference, under the assumption that this difference is attributable to the estimation error of the cool flame heat generation quantity $\Delta$Qlto.

Figure 17:
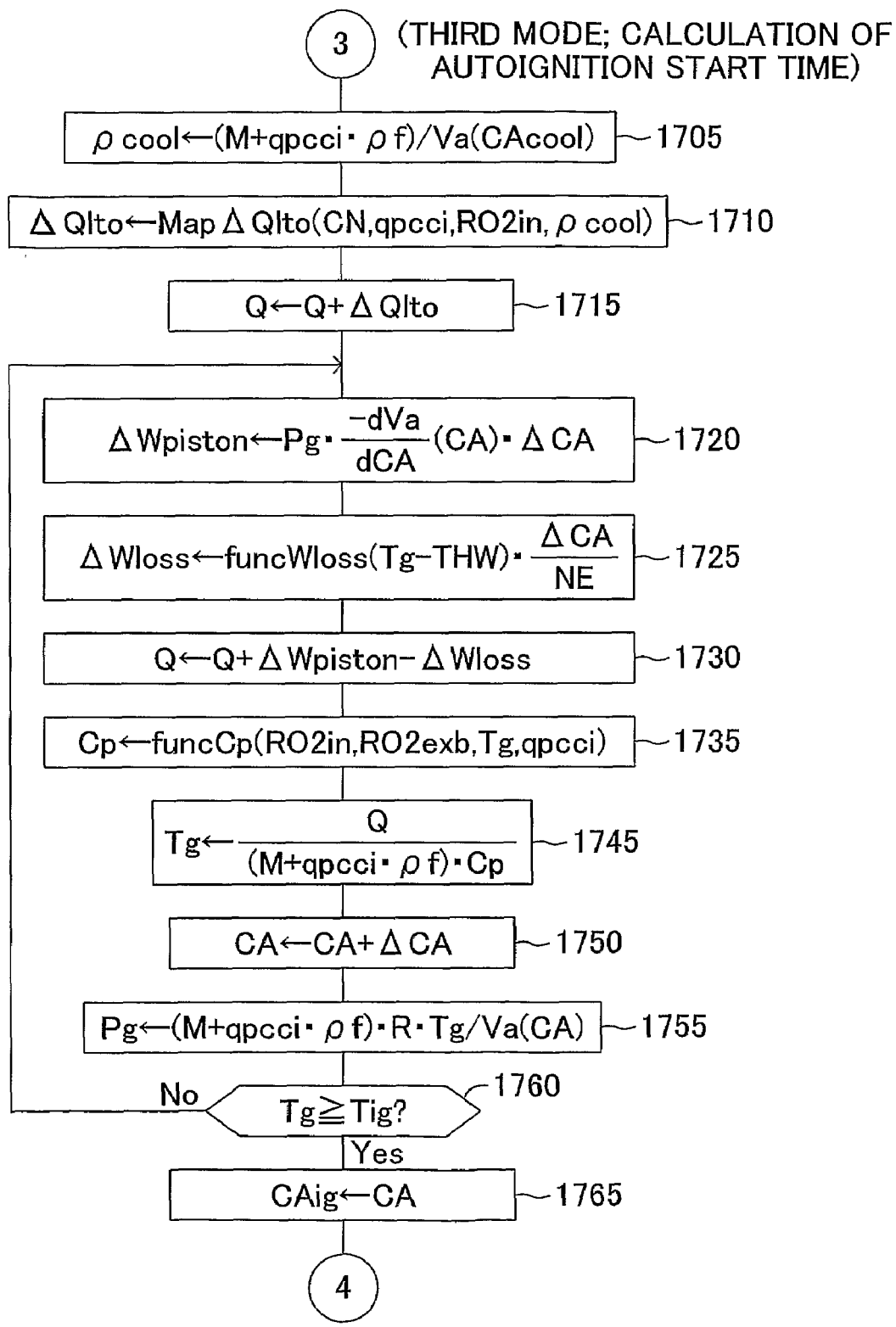
FIG. 17 shows a fourth portion of the routine which the CPU shown in FIG. 1 executes so as to calculate autoignition start time in PCCI combustion and determine whether PCCI control can be performed.

Then, in the next and subsequent operation cycles, the control apparatus according to the third modification corrects the estimation value of the cool flame heat generation quantity $\Delta$Qlto obtained in step 1710 of FIG. 17, by multiplying it by the above-mentioned correction coefficient Kq. As a result, the estimation value of the cool flame heat generation quantity $\Delta$Qlto is learned on the basis of the actual autoignition start time CAigact, whereby the autoignition start time (CAig) of the premixed gas mixture in relation to PCCI combustion can be estimated more accurately.

Notably, in the third modification, the estimation value of the cool flame heat generation quantity $\Delta$Qlto is corrected and learned on the basis of the actual autoignition start time CAigact. On the assumption that the difference between the actual autoignition start time CAigact in the present operation cycle and the estimation value of the autoignition start time CAig in the present operation cycle which has already been obtained in step 1765 of FIG. 17 is attributable to the setting error of the autoignition start temperature Tig, the apparatus of the third modification may be configured to correct and learn the autoignition start temperature Tig on the basis of the difference.

FOURTH MODIFICATION

Next, there will be described a control apparatus including a gas-mixture-ignition-time estimation apparatus for an internal combustion engine according to a fourth modification of the above-described embodiment. This fourth modification is configured to estimate the cool flame heat generation quantity $\Delta$Qlto in consideration of the quantity of fuel injected for PCCI combustion and adhering to the inner wall surface of the combustion chamber at the cool flame start time (CAcool).

As described previously, of the fuel injected for PCCI combustion before the near compression top dead center, the fuel adhering to the inner wall surface of the combustion chamber at the cool flame start time (CAcool) is considered not to contribute to heat generation by a cool flame. In contrast, in the above-described embodiment, the cool flame heat generation quantity $\Delta$Qlto is estimated on the assumption that all the fuel injected for PCCI combustion contributes to the cool flame heat generation. Therefore, the estimation value of the cool flame heat generation quantity $\Delta$Qlto is calculated as a value greater than the actual value by an amount corresponding to the quantity of fuel adhering to the inner wall surface of the combustion chamber at the actual cool flame start time.

Figure 24:
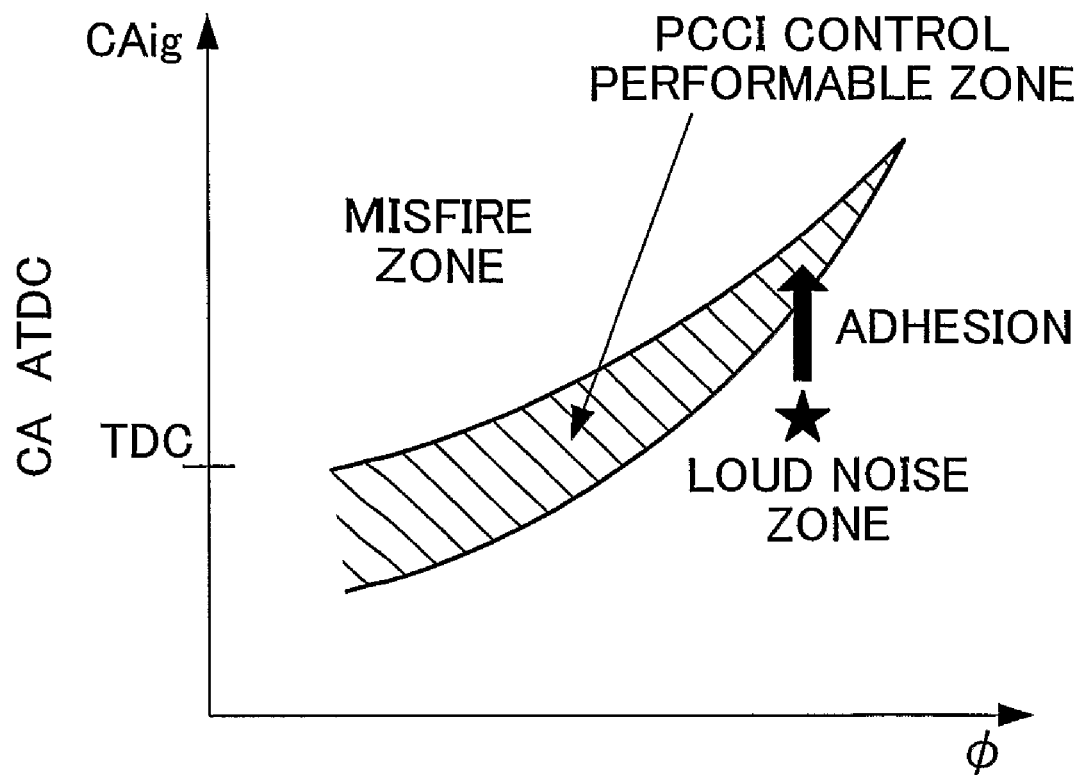
FIG. 24 is a graph used for describing a delay in actual autoignition start time because of adhesion of fuel to an inner wall surface of the combustion chamber.

In this case, the autoignition-start-time crank angle CAig is estimated to be a time (crank angle) earlier than the actual autoignition start time by an amount corresponding to the above-described adhering quantity. As a result, even when the estimated the autoignition-start-time crank angle CAig assumes a value corresponding to the loud noise zone, as indicated by a black star mark in FIG. 24, in actuality, the autoignition-start-time crank angle CAig may assume a value corresponding to the PCCI control performable zone. In such a case, the selection of the fuel injection mode may be erroneously performed.

Meanwhile, the quantity (adhering quantity) of the fuel adhering to the inner wall surface of the combustion chamber at the cool flame start time is considered to increase with the fuel injection quantity for PCCI combustion qpcci and to be greatly influenced by the cylinder interior gas density ρg at the fuel injection start time (CAqpcci) and the above-mentioned effective injection pressure ΔPcr.

Figure 25:
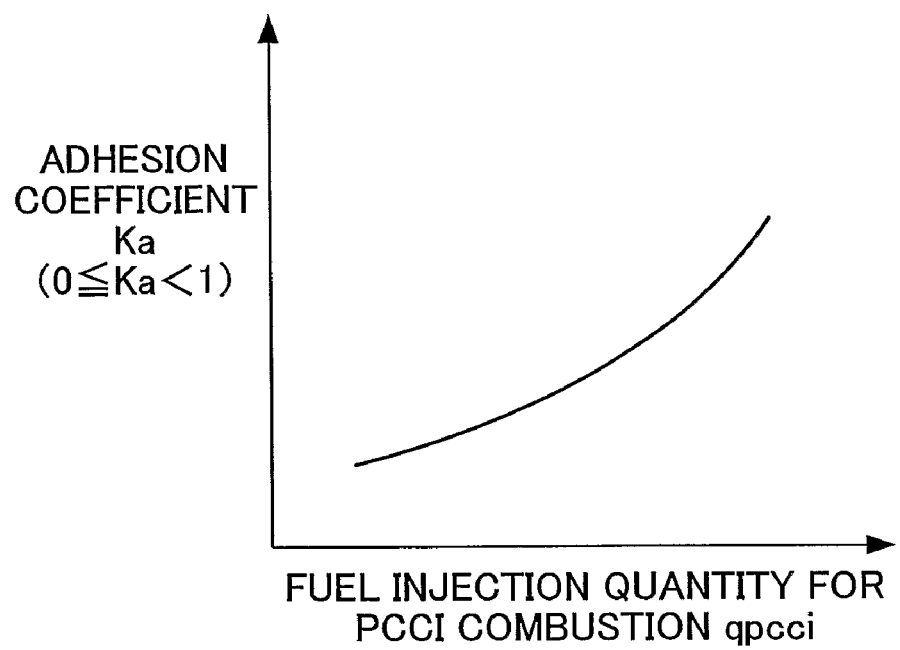
FIG. 25 is a table for determining an adhesion coefficient Ka, to which the CPU of an engine control apparatus according to a fourth modification of the embodiment of the present invention refers.
Figure 26:
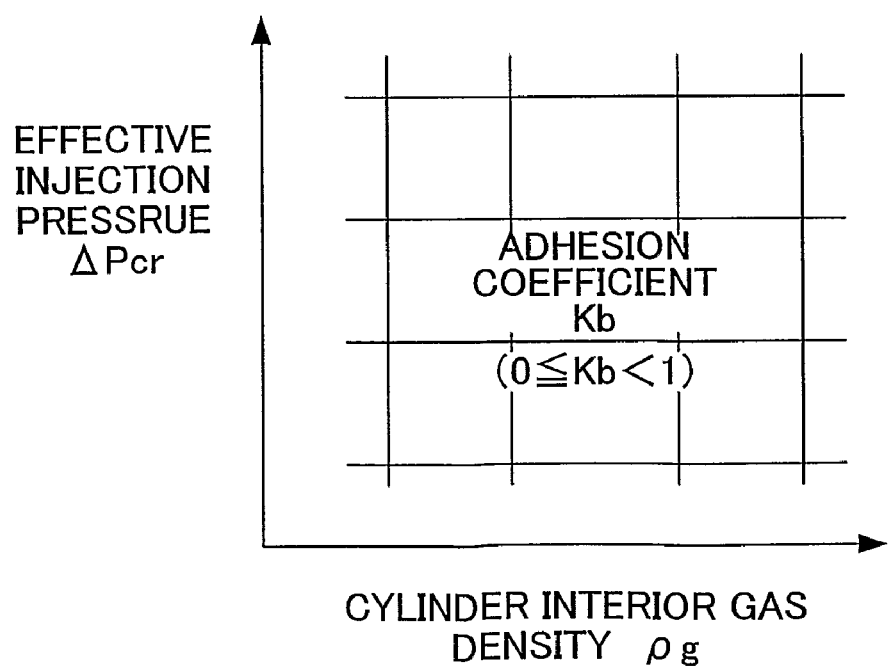
FIG. 26 is a table for determining an adhesion coefficient Kb, to which the CPU of the engine control apparatus according to the fourth modification refers.

In view of the above, during the execution of the routine shown in FIGS. 14 to 18, the control apparatus according to the fourth modification obtains an adhesion coefficient Ka from the fuel injection quantity for PCCI combustion qpcci and a table which is shown in FIG. 25 and defines the relation between qpcci and the adhesion coefficient Ka (0≦Ka<1). Further, the control apparatus according to the fourth modification obtains an adhesion coefficient Kb from the cylinder interior gas density ρg at the fuel injection start time for PCCI combustion (CAqpcci), the effective injection pressure ΔPcr, and a table which is shown in FIG. 26 and defines the relation between ρg and ΔPcr, and the adhesion coefficient Kb (0≦Kb<1).

On the assumption that the ratio of the quantity of fuel not adhering to the inner wall surface of the combustion chamber at the cool flame start time to the entire quantity qpcci of fuel injected for PCCI combustion is equal to the ratio of the actual cool flame heat generation quantity to the above-described cool flame heat generation quantity ΔQlto estimated under assumption that the entirety of the injected fuel contributes to the cool flame heat generation, the control apparatus of the fourth modification corrects the cool flame heat generation quantity ΔQlto obtained in step 1710 of FIG. 17 by multiplying it by the value (1-Ka) and the value (1-Kb). Thus, the cool flame heat generation quantity can be estimated more accurately in consideration of the adhering quantity. As a result, the premixed-gas-mixture autoignition start time can be estimated more accurately.

FIFTH MODIFICATION

Next, there will be described a control apparatus including a gas-mixture-ignition-time estimation apparatus for an internal combustion engine according to a fifth modification of the above-described embodiment. This fifth modification is configured to estimate the cool flame heat generation quantity ΔQlto in consideration of the degree to which the premixed gas mixture disperses to the vicinity of the inner wall surface of the combustion chamber at the cool flame start time (CAcool).

Figure 27:
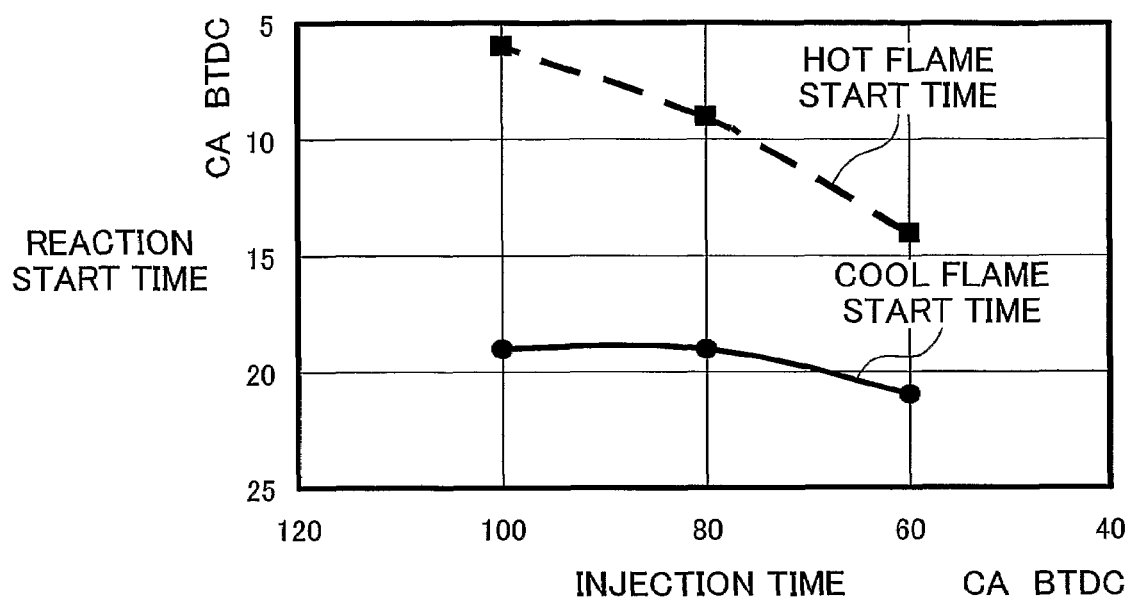
FIG. 27 is graph showing example results of an experiment performed for finding the relation between fuel injection start time for PCCI combustion and cool flame and hot flame reaction start times under certain conditions.

FIG. 27 is a graph showing results of an experiment performed on the relation between the fuel injection start time for PCCI combustion and the start times of cool flame reaction and hot flame reaction. As can be understood from FIG. 27, the cool flame start time is not influenced very much by the fuel injection start time for PCCI combustion, and the hot flame start time (i.e., autoignition start time) tends to advance as the fuel injection time for PCCI combustion delays. In other words, the longer the elapsed time ΔTdelay between the fuel injection start time for PCCI combustion (CApcci) to the cool flame start time (CAcool), the greater the degree to which the autoignition start time delays.

This result can be considered to occur because of the fact that as in the case of fuel adhering to the inner wall surface of the combustion chamber, of the premixed gas mixture within the combustion chamber, a premixed gas mixture dispersed in the vicinity of the inner wall surface of the combustion chamber at the cool flame start time cannot contribute to the cool flame heat generation. That is, as the elapsed time ΔTdelay increases, the degree to which the premixed gas mixture disperses to the vicinity of the inner wall surface of the combustion chamber at the cool flame start time increases, and the quantity of the premixed gas mixture which contributes to the cool flame heat generation decreases. Further, the degree to which the quantity of the premixed gas mixture contributing to the cool flame heat generation decreases as a result of an increase in the degree to which the premixed gas mixture disperses to the vicinity of the inner wall surface of the combustion chamber can be considered to become more remarkable as the fuel injection quantity for PCCI combustion qpcci decreases.

Figure 28:
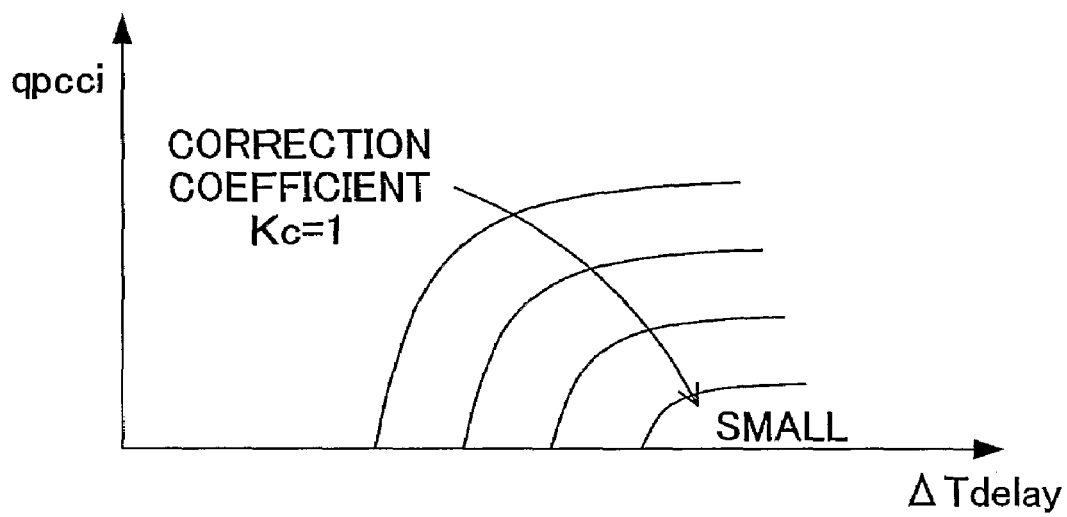
FIG. 28 is a table for determining a cool flame heat generation quantity correction coefficient Kc, to which the CPU of an engine control apparatus according to a fifth modification of the embodiment of the present invention refers.

In view of the above, during the execution of the routine shown in FIGS. 14 to 18, the control apparatus according to the fifth modification obtains a correction coefficient Kc from the fuel injection quantity for PCCI combustion qpcci, the above-mentioned elapsed time ΔTdelay, and a table which is shown in FIG. 28 and defines the relation between qpcci and ΔTdelay, and the correction coefficient Kc (0<Kc≦1). Subsequently, the control apparatus of the fifth modification corrects the cool flame heat generation quantity ΔQlto obtained in step 1710 of FIG. 17 by multiplying it by the above-mentioned correction coefficient Kc. Thus, the cool flame heat generation quantity can be estimated more accurately in consideration of the degree to which the premixed gas mixture disperses to the vicinity of the inner wall surface of the combustion chamber at the cool flame start time. As a result, the premixed-gas-mixture autoignition start time can be estimated more accurately.

As described above, there is a tendency that the longer the elapsed time ΔTdelay, the smaller the cool flame heat generation quantity and the greater the degree to which the autoignition start time of the premixed gas mixture delays. In other words, the cool flame heat generation quantity (accordingly, the autoignition start time of the premixed gas mixture) can be adjusted through adjustment of the elapsed time ΔTdelay. Meanwhile, as can be easily understood from the experiment results shown in FIG. 27, in general, the elapsed time ΔTdelay tends to increase as the fuel injection start time for PCCI combustion (CAqpcci) becomes earlier. Therefore, the elapsed time ΔTdelay can be adjusted through adjustment of the fuel injection start time for PCCI combustion.

As is understood from the above, even in the case where the estimated autoignition-start-time crank angle CAig in the present operation cycle is determined to fall outside the PCCI control performable range, in some cases, the actual autoignition start time in the present operation cycle can be controlled to fall within the PCCI control performable range by adjusting the elapsed time ΔTdelay in the present operation cycle through adjustment of the fuel injection start time for PCCI combustion (CAqpcci) in the present operation cycle.

Figure 29:
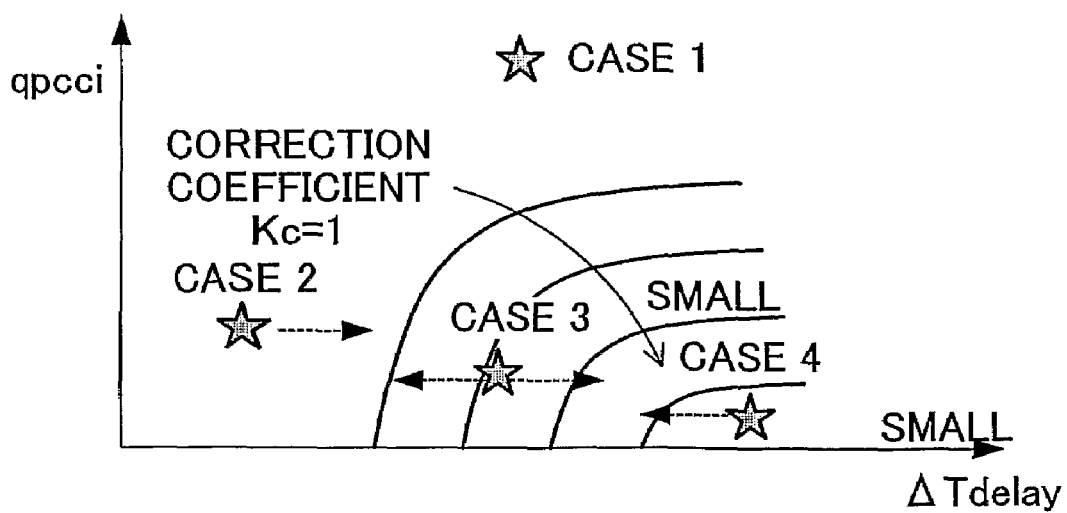
FIG. 29 is a table for determining whether adjustment of autoignition start time through adjustment of fuel injection time for PCCI combustion can be performed, to which the CPU of the engine control apparatus according to the fifth modification refers.

More specifically, as can be understood from FIG. 29 which shows the same table as that of FIG. 28, when the relation between the elapsed time ΔTdelay and the fuel injection quantity for PCCI combustion qpcci is the relation of case 1 (the case where qpcci is equal to or greater than a predetermined value), the correction coefficient Kc for correcting the cool flame heat generation quantity ΔQlto becomes always "1" and cannot change the cool flame heat generation quantity ΔQlto. This means that even when the fuel injection time for PCCI combustion is adjusted, the autoignition start time cannot be adjusted.

When the relation between the elapsed time ΔTdelay and the fuel injection quantity for PCCI combustion qpcci is the relation of case 2 (the case where qpcci is less than the predetermined value and ΔTdelay is equal to or less than a first predetermined value), the correction coefficient Kc can be decreased from "1" by increasing ΔTdelay. This means that the autoignition start time can be adjusted in the delaying direction by correcting the fuel-injection-start-time crank angle for PCCI combustion CAqpcci in the advanced angle direction from the value determined in step 815 of FIG. 8. In other words, when "loud noise" is determined to be generated (when XHAN is set to 1 in step 1825), in some cases, the actual autoignition start time can be controlled to the PCCI control performable range by correcting CAqpcci in the advanced angle direction from the value determined in step 815.

When the relation between the elapsed time ΔTdelay and the fuel injection quantity for PCCI combustion qpcci is the relation of case 3 (the case where qpcci is less than the predetermined value and ΔTdelay is greater than the first predetermined value and not greater than a second predetermined value), the correction coefficient Kc can be decreased by increasing ΔTdelay, and can be increased by decreasing ΔTdelay. This means that the autoignition start time can be adjusted in the delaying direction by correcting the fuel-injection-start-time crank angle for PCCI combustion CAqpcci in the advanced angle direction from the value determined in step 815 of FIG. 8, and can be adjusted in the advancing direction by correcting the fuel-injection-start-time crank angle for PCCI combustion CAqpcci in the delayed angle direction from the value determined in step 815 of FIG. 8. In other words, when "loud noise" is determined to be generated (when XHAN is set to 1 in step 1825), in some cases, the actual autoignition start time can be controlled to the PCCI control performable range by correcting CAqpcci in the advanced angle direction from the value determined in step 815. Further, when "generation of misfire" is determined to occur (when XHAN is set to 2 in step 1825), in some cases, the actual autoignition start time can be controlled to the PCCI control performable range by correcting CAqpcci in the delayed angle direction from the value determined in step 815.

When the relation between the elapsed time ΔTdelay and the fuel injection quantity for PCCI combustion qpcci is the relation of case 4 (the case where qpcci is less than the predetermined value and ΔTdelay is greater than the second predetermined value), the correction coefficient Kc can be increased by decreasing ΔTdelay. This means that the autoignition start time can be adjusted in the advancing direction by correcting the fuel-injection-start-time crank angle for PCCI combustion CAqpcci in the delayed angle direction from the value determined in step 815 of FIG. 8. In other words, when "generation of misfire" is determined to occur (when XHAN is set to 2 in step 1825), in some cases, the actual autoignition start time can be controlled to the PCCI control performable range by correcting CAqpcci in the delayed angle direction from the value determined in step 815.

Figure 30:
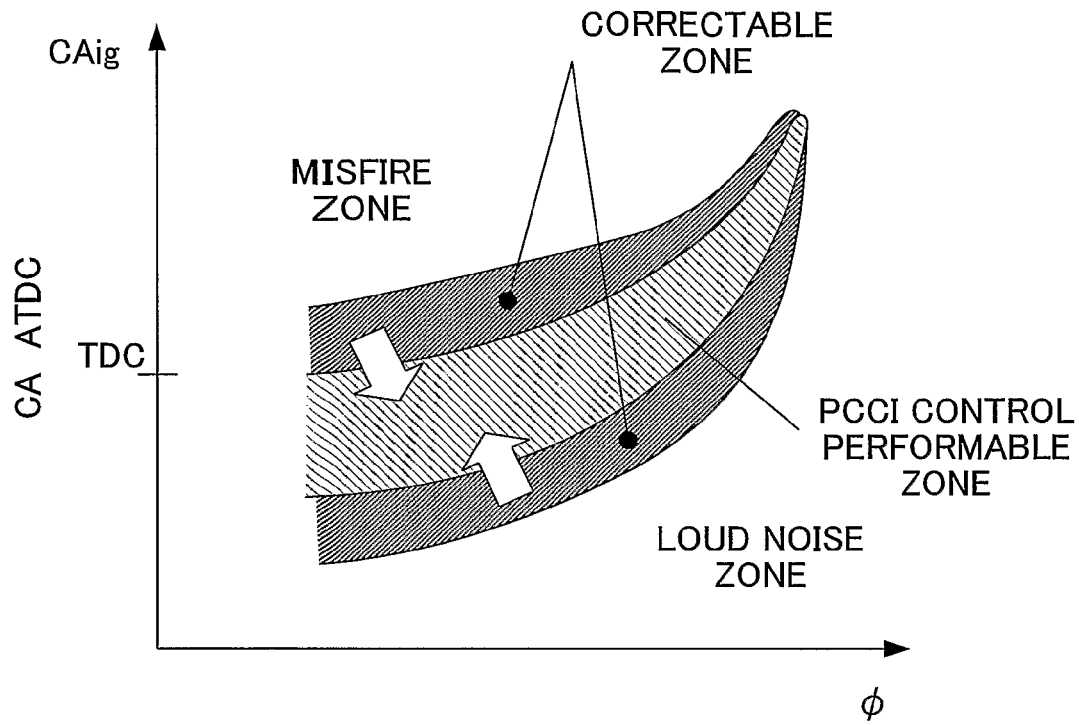
FIG. 30 is a chart showing a zone in which the autoignition start time crank angle can be corrected through adjustment of fuel injection time for PCCI combustion.

Meanwhile, there is a certain limit on the degree to which the fuel-injection-start-time crank angle for PCCI combustion CAqpcci can be corrected from the value (i.e., steady-state suitable value (time) determined in step 815, and such a CAqpcci correctable range corresponds to he correctable zone of the autoignition-start-time crank angle CAig shown in FIG. 30.

In view of the above, during the execution of the routine shown in FIGS. 14 to 18, when "PCCI control" is determined to be possible (when XHAN is set to 3 in step 1825 of FIG. 18), as in the above-described embodiment, the control apparatus according to the fifth modification, in principle, injects the entirety of fuel of the demanded fuel injection quantity qfin as fuel for PCCI combustion at the fuel injection start time for PCCI combustion (CAqpcci).

Figure 18:
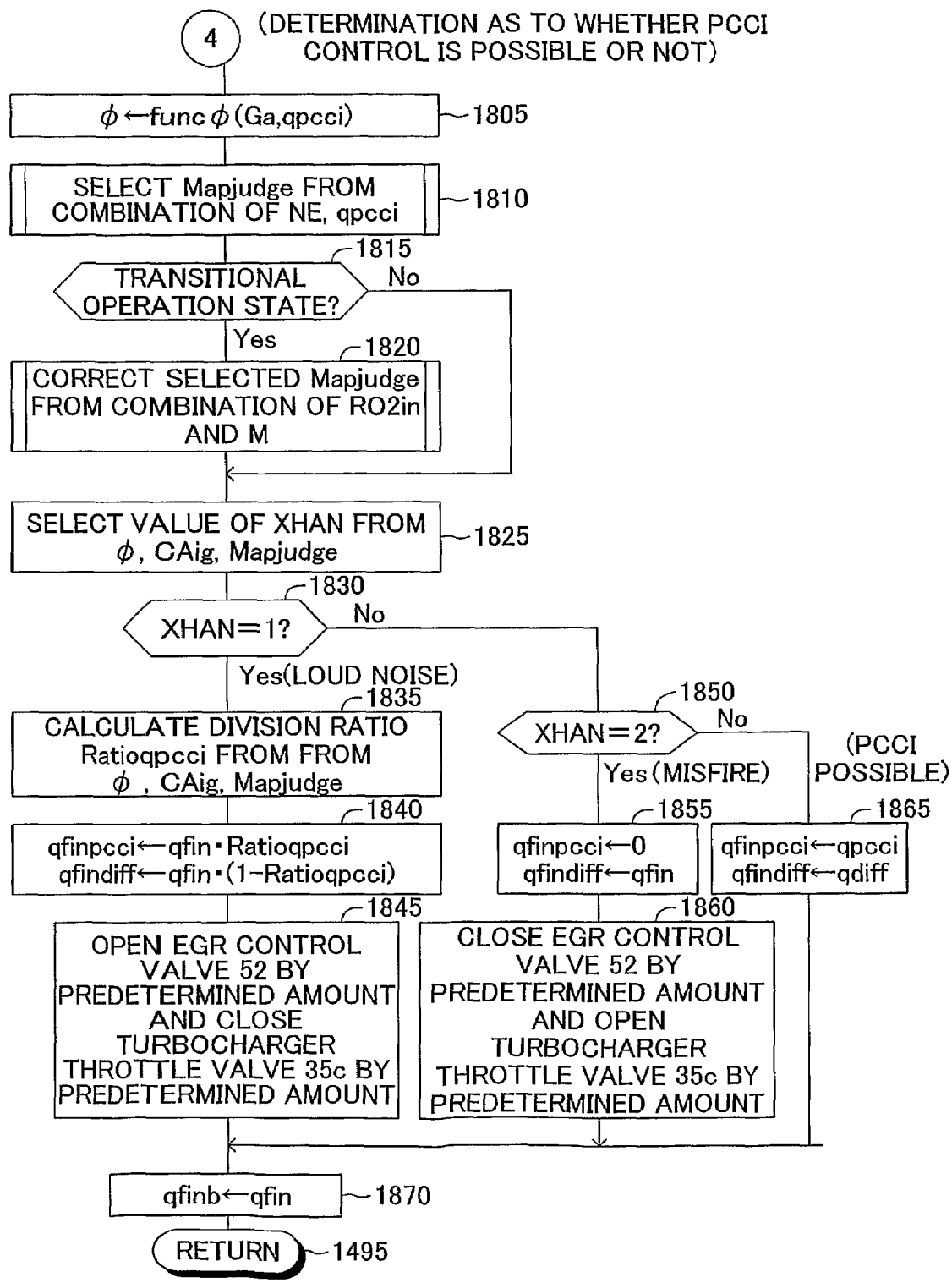
FIG. 18 shows a fifth portion of the routine which the CPU shown in FIG. 1 executes so as to calculate autoignition start time in PCCI combustion and determine whether PCCI control can be performed.

Meanwhile, when "loud noise" is determined to be generated (when XHAN is set to 1 in step 1825), the control apparatus of the fifth modification determines whether the relation between the autoignition-start-time crank angle CAig calculated in step 1765 of FIG. 17 and the equivalent ratio φ calculated in step 1805 of FIG. 18 corresponds to the correctable zone of the autoignition-start-time crank angle CAig shown in FIG. 30 on the selected Mapjudge and the relation between the elapsed time ΔTdelay and the fuel injection quantity for PCCI combustion qpcci is the relation of case 2 or case 3. When the control apparatus of the fifth embodiment makes a "No" determination, as in the case of the above-described embodiment, the control apparatus injects fuel of the demanded fuel injection quantity qfin, while dividing it at the division ratio Ratioqpcci into fuel for PCCI combustion and fuel for diffusion combustion. On the other hand, when the control apparatus of the fifth embodiment makes a "Yes" determination, unlike the case of the above-described embodiment, the control apparatus advances the fuel-injection-start-time crank angle for PCCI combustion CAqpcci by a predetermined amount from the value determined in step 815, and injects the entire fuel of the demanded fuel injection quantity qfin as fuel for PCCI combustion at the advanced fuel injection start time for PCCI combustion (CAqpcci). This operation reduces the generation quantities of $NO_x$ and PM without creation of a state in which loud noise is produced.

Meanwhile, when "generation of misfire" is determined to occur (when XHAN is set to 2 in step 1825), the control apparatus of the fifth modification determines whether the relation between the autoignition-start-time crank angle. CAig calculated in step 1765 of FIG. 17 and the equivalent ratio φ calculated in step 1805 of FIG. 18 corresponds to the correctable zone of the autoignition-start-time crank angle CAig shown in FIG. 30 on the selected Mapjudge and the relation between the elapsed time ΔTdelay and the fuel injection quantity for PCCI combustion qpcci is the relation of case 4. When the control apparatus of the fifth embodiment makes a "No" determination, as in the case of the above-described embodiment, the control apparatus injects the entire fuel of the demanded fuel injection quantity qfin as fuel for diffusion combustion at fuel injection start time for diffusion combustion (CAqdiff). On the other hand, when the control apparatus of the fifth embodiment makes a "Yes" determination, unlike the case of the above-described embodiment, the control apparatus delays the fuel-injection-start-time crank angle for PCCI combustion CAqpcci by a predetermined amount from the value determined in step 815, and injects the entire fuel of the demanded fuel injection quantity qfin as fuel for PCCI combustion at the delayed fuel injection start time for PCCI combustion (CAqpcci). This operation reduces the generation quantities of $NO_x$ and PM without creation of a state in which misfire occurs.

SIXTH MODIFICATION

Next, there will be described a control apparatus including a gas-mixture-ignition-time estimation apparatus for an internal combustion engine according to a sixth modification of the above-described embodiment. This sixth modification is configured to correct the fuel injection pressure Pcr when the estimated autoignition-start-time crank angle CAig is not determined to fall within the PCCI control performable zone.

As described previously, when the load of the engine is relatively high or heavy (accordingly, when the equivalent ratio φ of the premixed gas mixture is relatively large), there is a trend such that the higher the fuel injection pressure Pcr, the greater the degree to which the autoignition start time of the premixed gas mixture advances. This phenomenon occurs mainly because of the fact that the higher the fuel injection pressure Pcr, the higher the speed (evaporation speed) at which liquid fuel is atomized.

Figure 31:
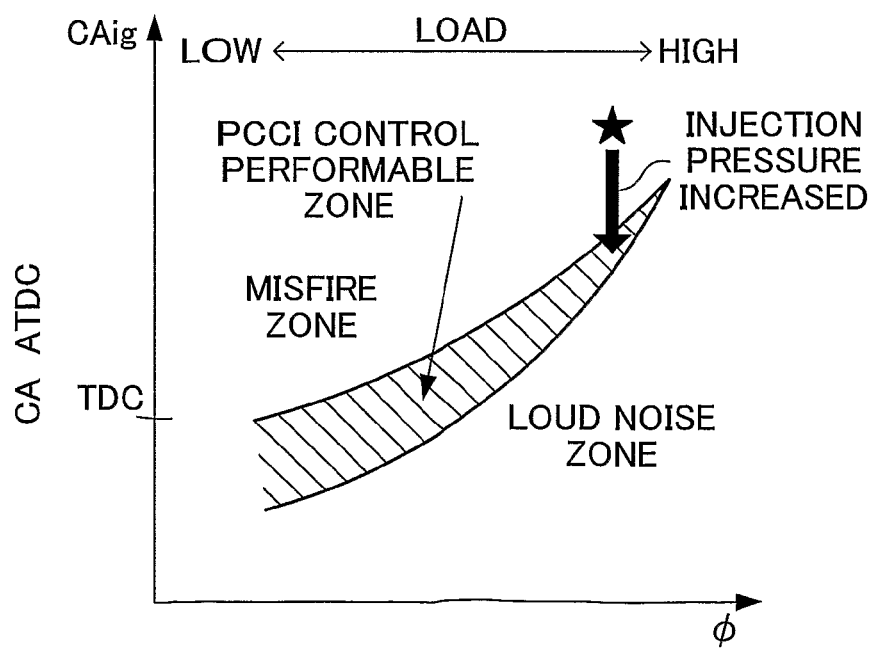
FIG. 31 is a chart used for describing the phenomenon that the actual autoignition start time becomes earlier because of an increase in injection pressure in the case where the load of the engine is relatively high.

Accordingly, even when as shown in FIG. 31 the load of the engine (accordingly, the equivalent ratio φ of the premixed gas mixture) is greater than a predetermined value and the estimated autoignition-start-time crank angle CAig in the present operation cycle deviates from the PCCI control performable range to the delaying direction (i.e., "generation of misfire" is determined to occur; see a black star mark in FIG. 31), in some cases, the actual autoignition start time in the present operation cycle can be controlled to the PCCI control performable range by increasing the fuel injection pressure Pcr in the present operation cycle by a predetermined amount from the value (steady-state suitable value) determined in step 825 of FIG. 8.

Figure 32:
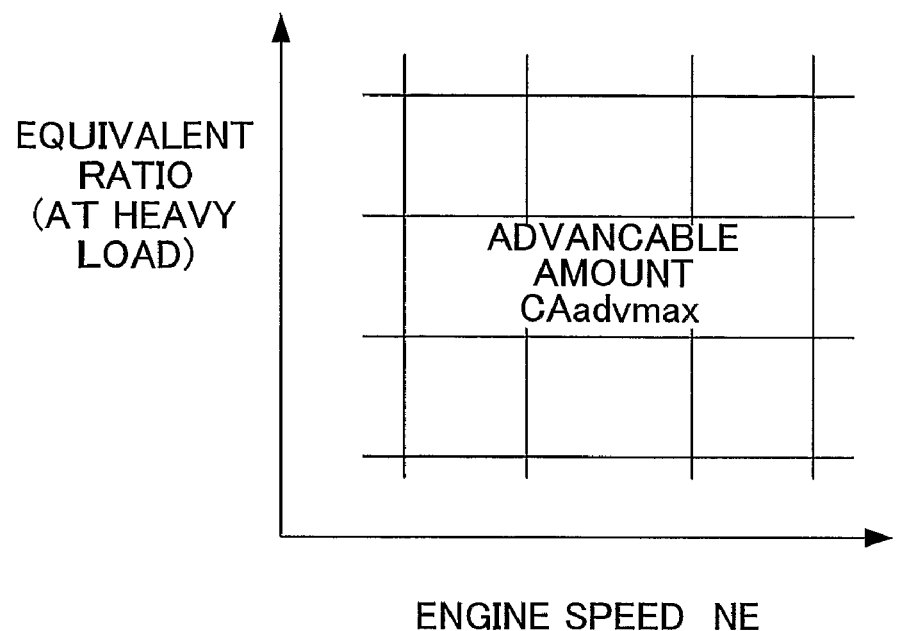
FIG. 32 is a table for determining an advancable amount of the autoignition start time, to which the CPU of an engine control apparatus according to a sixth modification of the embodiment of the present invention refers.

In this case, the amount (advancable amount CAadvmax) by which the actual autoignition start time can be advanced is determined in accordance with the state of the engine 10, and the advancable amount CAadvmax is obtained from the engine speed NE, the equivalent ratio φ, and a table which is shown in FIG. 32 and defines the relation between NE and φ, and the advancable amount CAadvmax.

In view of the above, during the execution of the routine shown in FIGS. 14 to 18, the control apparatus according to the sixth modification operates as follows. When "PCCI control" is determined to be possible (when XHAN is set to 3 in step 1825 of FIG. 18), as in the above-described embodiment, the control apparatus, in principle, injects the entirety of fuel of the demanded fuel injection quantity qfin as fuel for PCCI combustion at the fuel injection start time for PCCI combustion (CAqpcci). Further, when "loud noise" is determined to be generated (when XHAN is set to 1 in step 1825), as in the case of the above-described embodiment, the control apparatus of the sixth modification injects fuel of the demanded fuel injection quantity qfin, while dividing it at the division ratio Ratioqpcci into fuel for PCCI combustion and fuel for diffusion combustion.

Figure 33:
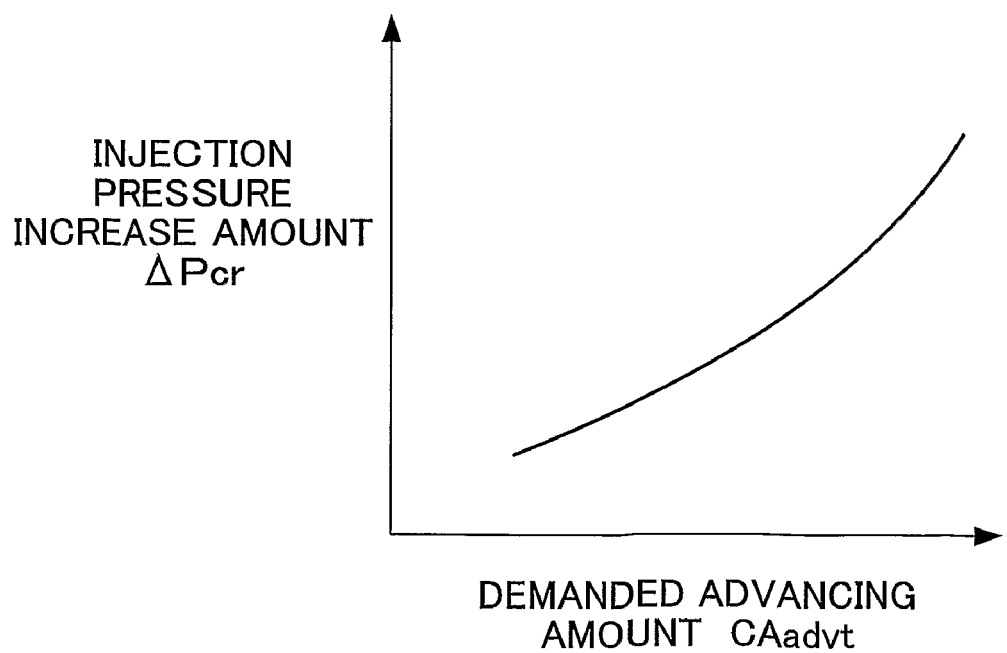
FIG. 33 is a table for defining the relation between demanded advancement amount and injection pressure increase amount, to which the CPU of the engine control apparatus according to the sixth modification refers.

On the other hand, when "generation of misfire" is determined to occur (when XHAN is set to 2 in step 1825), the control apparatus of the sixth modification obtains an advancing amount (demanded advancing amount CAadvt) which is necessary to bring CAig into the PCCI control performable zone, from the autoignition-start-time crank angle CAig calculated in step 1765 of FIG. 17, the equivalent ratio φ calculated in step 1805 of FIG. 18, and the selected Mapjudge. Subsequently, the control apparatus of the sixth modification determines whether the equivalent ratio φ of the premixed gas mixture is greater than the predetermined value and the demanded advancing amount CAadvt is equal to or less than the advancable amount CAadvmax, which is obtained from the engine speed NE, the equivalent ratio φ, and a table shown in FIG. 32. When the control apparatus of the sixth embodiment makes a "No" determination, as in the case of the above-described embodiment, the control apparatus injects the entire fuel of the demanded fuel injection quantity qfin as fuel for diffusion combustion at fuel injection start time for diffusion combustion (CAqdiff). On the other hand, when the control apparatus of the sixth embodiment makes a "Yes" determination, unlike the case of the above-described embodiment, the control apparatus obtains a fuel injection pressure increase amount ΔPcr on the basis of the demanded advancing amount CAadvt and a table which is shown in FIG. 33 and defines the relation between CAadvt and the fuel injection pressure increase amount ΔPcr, increases the fuel injection pressure Pcr in the present operation cycle by the obtained fuel injection pressure increase amount ΔPcr from the value (steady-state suitable value) determined in step 825, and injects the entire fuel of the demanded fuel injection quantity qfin as fuel for PCCI combustion at the fuel injection start time for PCCI combustion (CAqpcci) under the increased injection pressure. This operation reduces the generation quantities of $NO_x$ and PM without creation of a state in which misfire occurs.

Moreover, when the load of the engine is relatively low or light (accordingly, when the equivalent ratio φ of the premixed gas mixture is relatively small), there is a trend such that the lower the fuel injection pressure Pcr, the greater the degree to which the autoignition start time of the premixed gas mixture advances. This phenomenon occurs mainly because of the fact that the lower the fuel injection pressure Pcr, the greater the degree to which excessive dispersion of the premixed gas mixture is suppressed (that is, the greater the degree of nonuniformity of the premixed gas mixture, and as a result, the autoignition start time becomes earlier, as described above.

Figure 34:
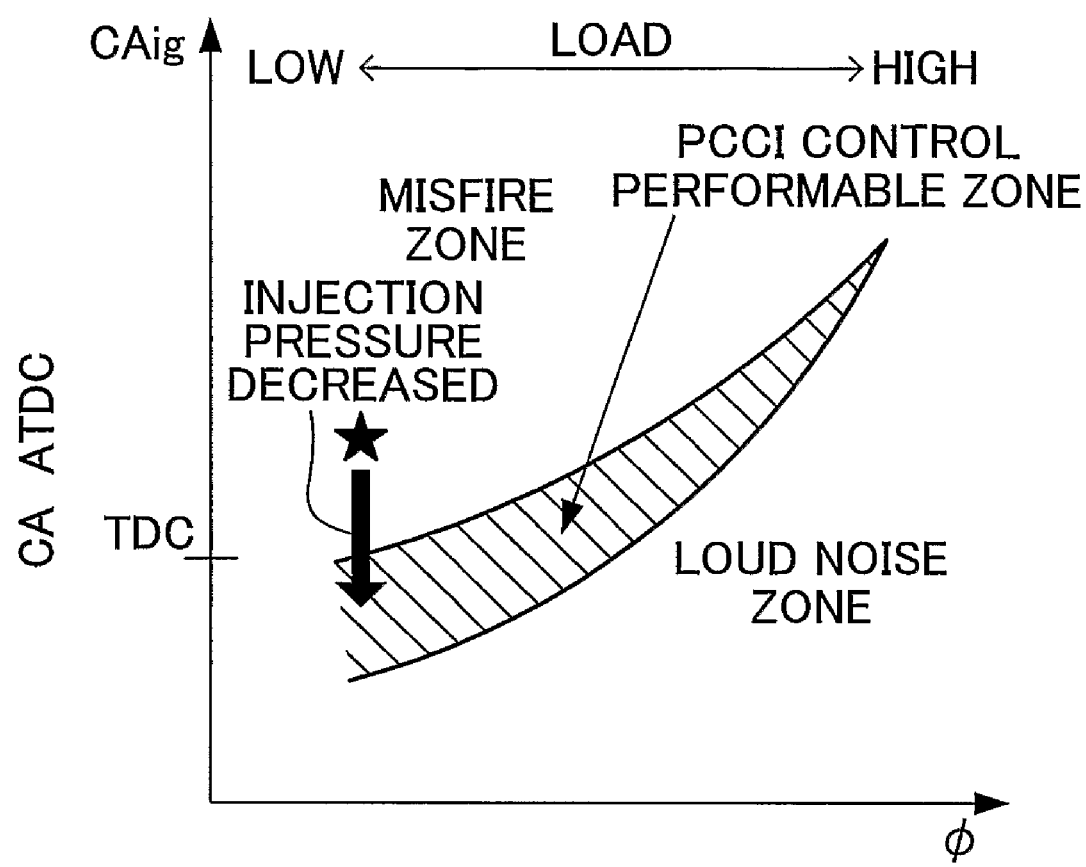
FIG. 34 is a chart used for describing the phenomenon that the actual autoignition start time becomes earlier because of a decrease in injection pressure in the case where the load of the engine is relatively low.

Accordingly, even when as shown in FIG. 34 the load of the engine (accordingly, the equivalent ratio φ of the premixed gas mixture) is smaller than a predetermined value and the estimated autoignition-start-time crank angle CAig in the present operation cycle deviates from the PCCI control performable range to the delaying direction (i.e., "generation of misfire" is determined to occur; see a black star mark in FIG. 34), in some cases, the actual autoignition start time in the present operation cycle can be controlled to the PCCI control performable range by decreasing the fuel injection pressure Pcr in the present operation cycle by a predetermined amount from the value (steady-state suitable value) determined in step 825 of FIG. 8.

Figure 35:
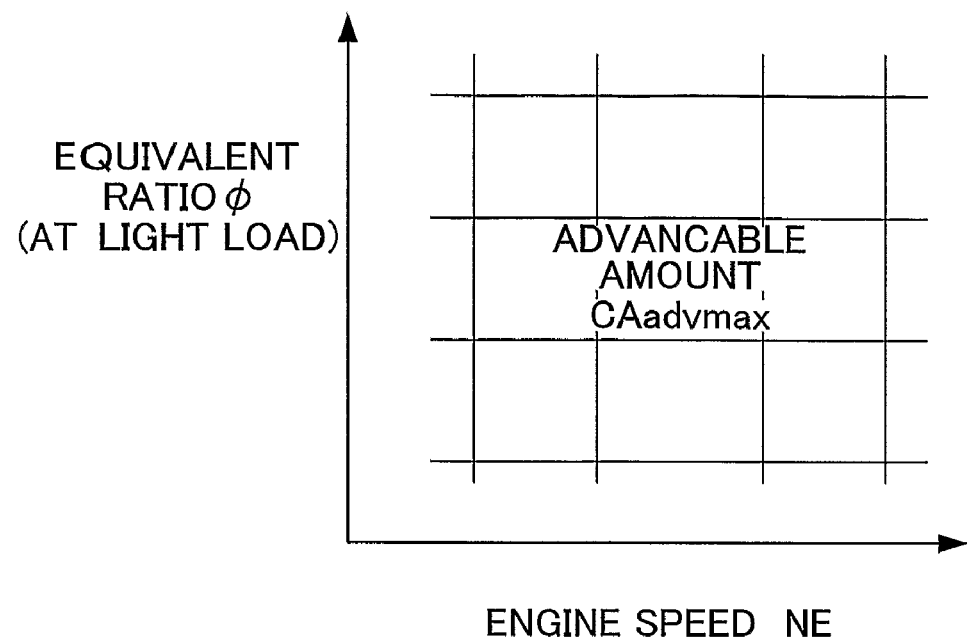
FIG. 35 is a table for determining an advancable amount of the autoignition start time, to which the CPU of the engine control apparatus according to the sixth modification refers.

In this case as well, the amount (advancable amount CAadvmax) by which the actual autoignition start time can be advanced is determined in accordance with the state of the engine 10, and the advancable amount CAadvmax is obtained from the engine speed NE, the equivalent ratio φ, and a table which is shown in FIG. 35 and defines the relation between NE and φ, and the advancable amount CAadvmax.

Figure 36:
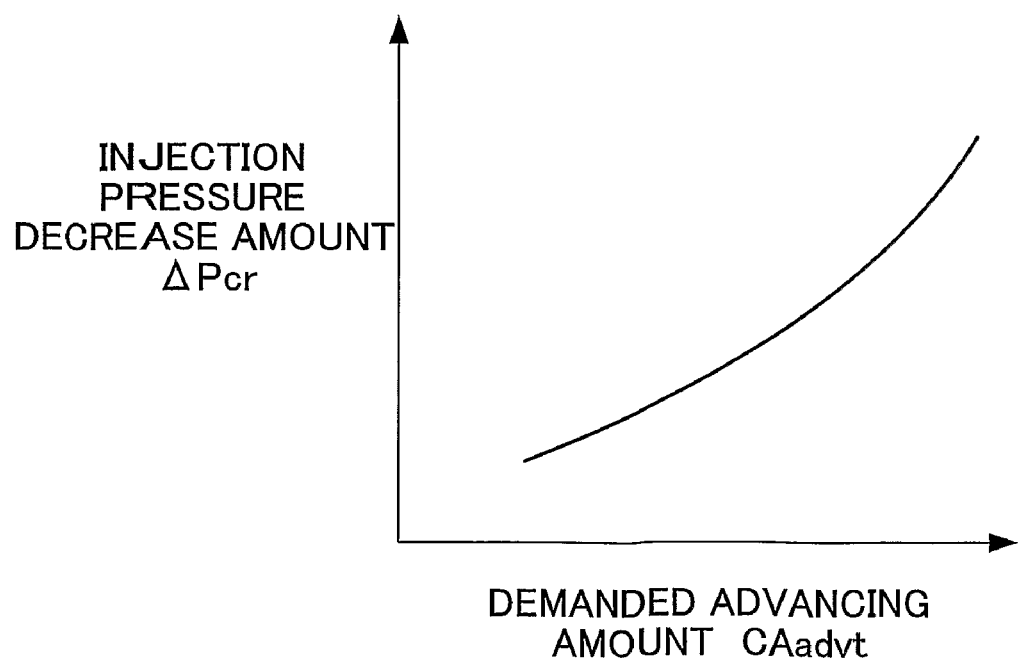
FIG. 36 is a table for defining the relation between demanded advancement amount and injection pressure decrease amount, to which the CPU of the engine control apparatus according to the sixth modification refers.

In view of the above, during the execution of the routine shown in FIGS. 14 to 18, when "generation of misfire" is determined to occur (when XHAN is set to 2 in step 1825), the control apparatus of the sixth modification obtains an advancing amount of CAig (demanded advancing amount CAadvt) which is necessary to bring CAig into the PCCI control performable zone, from the autoignition-start-time crank angle CAig calculated in step 1765 of FIG. 17, the equivalent ratio φ calculated in step 1805 of FIG. 18, and the selected Mapjudge. Subsequently, the control apparatus of the sixth modification determines whether the equivalent ratio φ of the premixed gas mixture is smaller than the predetermined value and the demanded advancing amount CAadvt is equal to or less than the advancable amount CAadvmax, which is obtained from the engine speed NE, the equivalent ratio φ, and a table shown in FIG. 35. When the control apparatus of the sixth embodiment makes a "No" determination, as in the case of the above-described embodiment, the control apparatus injects the entire fuel of the demanded fuel injection quantity qfin as fuel for diffusion combustion at fuel injection start time for diffusion combustion (CAqdiff). On the other hand, when the control apparatus of the sixth embodiment makes a "Yes" determination, unlike the case of the above-described embodiment, the control apparatus obtains a fuel injection pressure decrease amount ΔPcr on the basis of the demanded advancing amount CAadvt and a table which is shown in FIG. 36 and defines the relation between CAadvt and the fuel injection pressure decrease amount ΔPcr, decreases the fuel injection pressure Pcr in the present operation cycle by the obtained fuel injection pressure decrease amount ΔPcr from the value (steady-state suitable value) determined in step 825, and injects the entire fuel of the demanded fuel injection quantity qfin as fuel for PCCI combustion at the fuel injection start time for PCCI combustion (CAqpcci) under the decreased injection pressure. This operation reduces the generation quantities of $NO_x$ and PM without creation of a state in which misfire occurs.

SEVENTH MODIFICATION

Next, there will be described a control apparatus including a gas-mixture-ignition-time estimation apparatus for an internal combustion engine according to a seventh modification of the above-described embodiment. This seventh modification is configured to forcedly increase or decreases the cylinder interior temperature Tg when the estimated autoignition-start-time crank angle CAig is not determined to fall within the PCCI control performable zone.

In the case where estimated premixed-gas-mixture autoignition start time (CAig) in the present operation cycle is determined to have deviated from the PCCI control performable range to the advancing direction (i.e., "loud noise" is determined to be generated), if the temperature of the premixed gas mixture (accordingly, the cylinder interior temperature Tg) in the present operation cycle can be forcedly decreased, the actual autoignition start time in the present operation cycle can be controlled to the PCCI control performable range.

Figure 37:
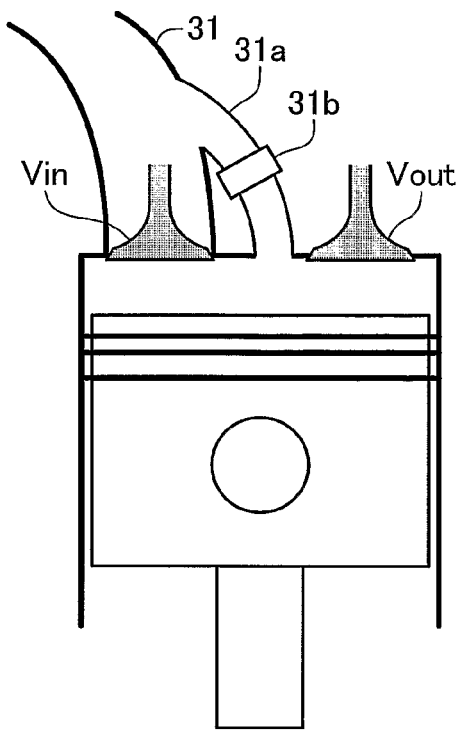
FIG. 37 is a schematic view of a combustion chamber and its vicinity of an engine which includes, for reduction of the mass of cylinder interior gas, a communication passage which establishes communication between an intermediate portion of the intake manifold and the combustion chamber and an open-close valve disposed in the communication passage.
Figure 38:
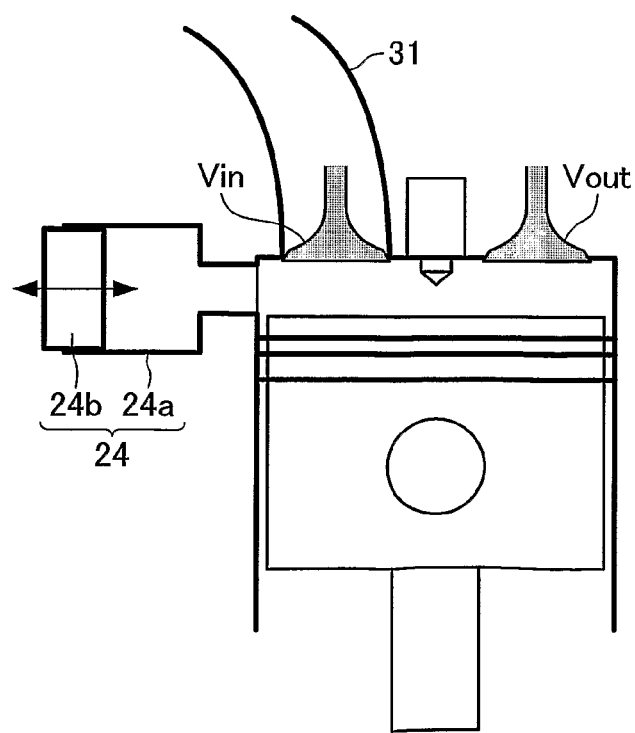
FIG. 38 is a schematic view of a combustion chamber and its vicinity of an engine which includes a combustion chamber volume adjustment mechanism so as to decrease the compression ratio of the engine.

Example methods for forcedly lowering the cylinder interior temperature Tg include decreasing the quantity of the cylinder interior gas by releasing a portion of the cylinder interior gas to the outside of the combustion chamber, lowering the compression ratio of the engine, and newly injecting a predetermined cooling material (e.g., water) into the combustion chambers. Specific methods for decreasing the quantity of the cylinder interior gas include opening the intake valve Vin for a predetermined short period of time at the point in time when "loud noise" is determined to be generated (at the time of execution of step 1825 of FIG. 18; point in time immediately after start of compression) and opening for a predetermined short period an open/closed valve 31b disposed in the middle of a communication passage 31a which establishes communication between an intermediate portion of the intake manifold 31 and the combustion chamber as shown in FIG. 37.

Further, a specific method for lowering the compression ratio of the engine is providing a combustion-chamber-volume adjustment mechanism 24 which can adjust the combustion chamber volume irrespective of the position of the piston and which is composed of a cylinder 24a and a piston 24b, which airtightly moves within the cylinder 24a, and increasing the volume of the combustion chamber by controlling the position of the piston 24b.

On the other hand, in the case where the estimated premixed-gas-mixture autoignition start time (CAig) in the present operation cycle is determined to have deviated from the PCCI control performable range to the delaying direction (i.e., "generation of misfire" is determined to occur), if the temperature of the premixed gas mixture (accordingly, the cylinder interior temperature Tg) in the present operation cycle can be forcedly increased, the actual autoignition start time in the present operation cycle can be controlled to the PCCI control performable range.

Example methods for forcedly increasing the cylinder interior temperature Tg include increasing the quantity of the cylinder interior gas by newly injecting a predetermined gas into the combustion chamber, increasing the compression ratio of the engine, and heating the combustion chamber by means of a glow plug.

In view of the above, during the execution of the routine shown in FIGS. 14 to 18, the control apparatus according to the seventh modification operates as follows. When "PCCI control" is determined to be possible (when XHAN is set to 3 in step 1825 of FIG. 18), as in the above-described embodiment, the control apparatus, in principle, injects the entirety of fuel of the demanded fuel injection quantity qfin as fuel for PCCI combustion at the fuel injection start time for PCCI combustion (CAqpcci).

Meanwhile, when "generation of misfire" is determined to occur (when XHAN is set to 2 in step 1825), unlike the case of the above-described embodiment, the control apparatus of the seventh modification forcedly increases the cylinder interior gas temperature Tg in the present operation cycle by the above-described method for forcedly increasing the cylinder interior temperature Tg, and injects the entire fuel of the demanded fuel injection quantity qfin as fuel for PCCI combustion at the fuel injection start time for PCCI combustion (CAqpcci). This operation reduces the generation quantities of $NO_x$ and PM without creation of a state in which misfire occurs.

Similarly, when "loud noise" is determined to be generated (when XHAN is set to 1 in step 1825), unlike the case of the above-described embodiment, the control apparatus of the seventh modification forcedly decreases the cylinder interior gas temperature Tg in the present operation cycle by the above-described method for forcedly decreasing the cylinder interior temperature Tg, and injects the entire fuel of the demanded fuel injection quantity qfin as fuel for PCCI combustion at the fuel injection start time for PCCI combustion (CAqpcci). This operation reduces the generation quantities of $NO_x$ and PM without creation of a state in which misfire occurs.

EIGHTH MODIFICATION

Next, there will be described a control apparatus including a gas-mixture-ignition-time estimation apparatus for an internal combustion engine according to an eighth modification of the above-described embodiment. This eighth modification is configured to calculate, in a simplified manner, the cylinder interior temperature Tg used to estimate the autoignition start time (CAig) of the premixed gas mixture related to PCCI combustion.

In the above-described embodiment, various heat quantities and energy quantities must be calculated for estimation of the cylinder interior temperature Tg in the compression stroke, and therefore, the calculation load is relatively large. In contrast, the control apparatus of the eighth modification obtains, at the compression start time, an adiabatic-change-time cylinder interior temperature Tadi as a function funcTadi(CA) of the crank angle CA on the basis of the state of the cylinder interior gas at the compression start time, under the assumption that, as shown in FIG. 39, the state of the cylinder interior gas adiabatically changes after the compression start time.

Meanwhile, the control apparatus according to the eighth modification obtains, at the compression start time, an increase amount $\Delta Tlto$ of the cylinder interior temperature Tg by the cool flame heat generation quantity $\Delta Qlto$ obtained by the same method as that used in step 1710 of FIG. 17, in accordance with the following Eq. (23). In Eq. (23), M0 represents the compression-start-time cylinder interior gas mass calculated by the above-described Eq. (3), and Cp represents the specific heat (here, a constant value) of the cylinder interior gas. $\rho f$ represents the density of fuel.

$$\Delta Tlto=\Delta Qlto/\{M0+qpcci\cdot\rho f)\cdot Cp\} \quad (23)$$

Figure 39:
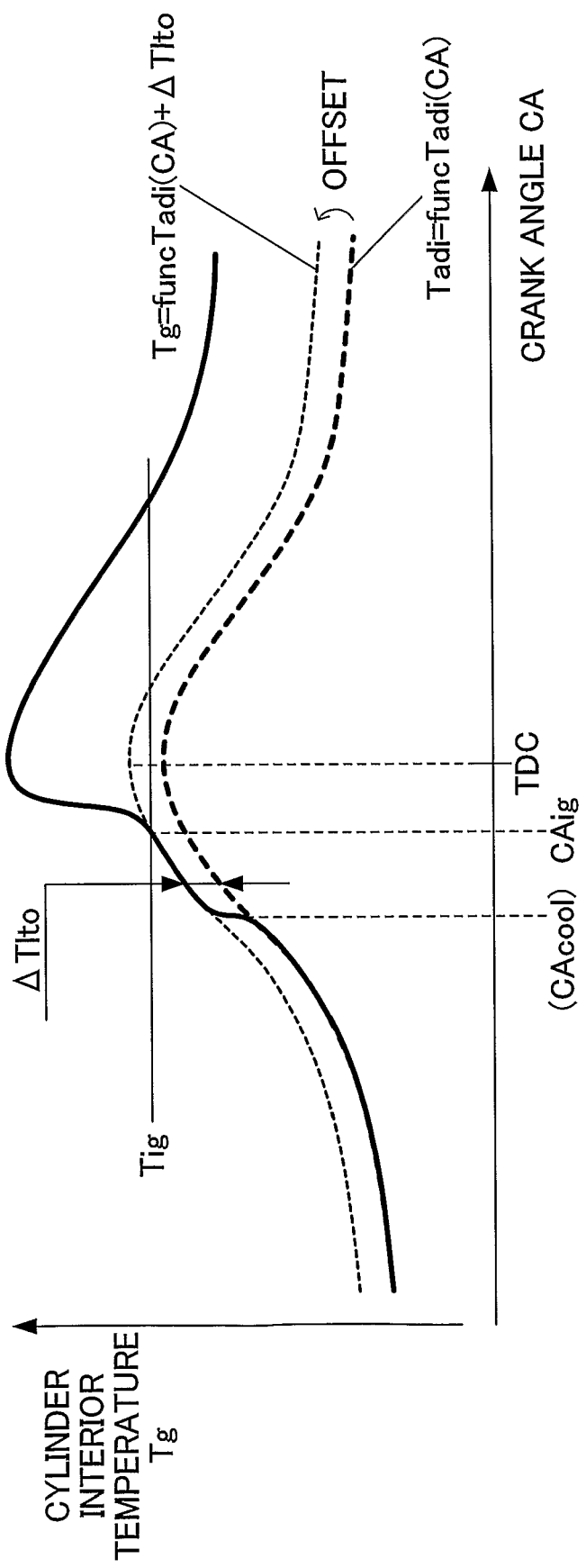
FIG. 39 is a chart used for describing a simple method for obtaining cylinder interior temperature.

Subsequently, as shown in FIG. 39, the control apparatus according to the eighth modification uses, as the cylinder interior temperature Tg, a value obtained by adding the above-mentioned $\Delta Tlto$ to (offsetting by $\Delta Tlto$) the value of the funcTadi(CA) (accordingly, the adiabatic-change-time cylinder interior temperature Tadi), and estimates, as the autoignition start time (CAig), the point in time when the cylinder interior temperature Tg reaches the autoignition start temperature Tig. By virtue of this processing, the autoignition start time (CAig) can be estimated through simple calculation.

INDUSTRIAL APPLICABILITY

The gas-mixture-ignition-time estimation apparatus according to the present invention can be applied to an internal combustion engine (in particular, a diesel engine) in which a premixed gas mixture is previously formed through mixing of a cylinder interior gas and fuel for PCCI combustion injected into the combustion chamber earlier than the near compression top dead center, and the premixed gas mixture starts autoignition upon compression in the compression stroke.

The invention claimed is:

1. A gas-mixture-ignition-time estimation apparatus for an internal combustion engine which comprises premixed-gas-mixture-autoignition-start-time estimation means for estimating a time at which a premixed gas mixture previously formed through mixing of a cylinder interior gas and fuel starts autoignition upon compression, the cylinder interior gas being a gas within a combustion chamber, and the fuel being fuel for premixed-charge compression ignition combustion injected into the combustion chamber earlier than a near compression top dead center and being different from fuel for diffusion combustion injected into the combustion chamber at the near compression top dead center, the gas-mixture-ignition-time estimation apparatus being characterized by comprising:

compression-start-time cylinder-interior-gas-state-quantity acquisition means for acquiring a state quantity of the cylinder interior gas at the time of start of compression of the cylinder interior gas;

compression-attributable-cylinder-interior-gas-state-quantity-change-amount estimation means for estimating the amount of a change in the state quantity of the cylinder interior gas attributable to compression of the cylinder interior gas; and cool-flame-heat-generation-quantity estimation means for estimating a cool-flame-heat-generation-quantity-corresponding value, which is a value corresponding to a heat generation quantity of a cool flame generated prior to autoignition of the premixed gas mixture, wherein the premixed-gas-mixture-autoignition-start-time estimation means estimates the time at which the premixed gas mixture starts autoignition, on the basis of at least the acquired cylinder interior gas state quantity at the time of start of compression, the estimated compression-attributable interior gas state quantity change amount, and the estimated cool-flame-heat-generation-quantity-corresponding value.

2. A gas-mixture-ignition-time estimation apparatus for an internal combustion engine according to claim 1, wherein the cool-flame-heat-generation-quantity estimation means is configured to estimate the cool-flame-heat-generation-quantity-corresponding value on the basis of at least the injection quantity of the fuel for premixed-charge compression ignition combustion, the nature of the fuel, the oxygen concentration of an intake gas taken into the combustion chamber, and the density of the cylinder interior gas.

3. A gas-mixture-ignition-time estimation apparatus for an internal combustion engine according to claim 1, wherein the premixed-gas-mixture-autoignition-start-time estimation means comprises premixed-gas-mixture-temperature estimation means for estimating the temperature of the premixed gas mixture on the basis of at least the acquired cylinder interior gas state quantity at the time of start of compression, the estimated compression-attributable interior gas state quantity change amount, and the estimated cool-flame-heat-generation-quantity-corresponding value, and estimates, as the premixed-gas-mixture autoignition start time, a time when the estimated temperature of the premixed gas mixture reaches a predetermined temperature.

4. A gas-mixture-ignition-time estimation apparatus for an internal combustion engine according to claim 3, further comprising nonuniformity degree estimation means for estimating a value representing the degree of nonuniformity of the premixed gas mixture at the time of start of the cool flame, wherein the premixed-gas-mixture-temperature estimation means is configured to estimate the temperature of the premixed gas mixture in consideration of the value representing the nonuniformity degree of the premixed gas mixture.

5. A gas-mixture-ignition-time estimation apparatus for an internal combustion engine according to claim 1, further comprising adhesion quantity estimation means for estimating a quantity of fuel adhering to an inner wall surface of the combustion chamber at the time of start of the cool flame, the fuel being a portion of the fuel injected into the combustion chamber for premixed-charge compression ignition combustion, wherein the cool-flame-heat-generation-quantity estimation means is configured to estimate the cool-flame-heat-generation-quantity-corresponding value in consideration of the estimated adhesion quantity.

6. A gas-mixture-ignition-time estimation apparatus for an internal combustion engine according to claim 1, further comprising dispersion degree estimation means for estimating a value which represents the degree to which the premixed gas mixture disperses to the vicinity of the inner wall surface of the combustion chamber at the time of start of the cool flame, on the basis of a time elapsed between start of injection of the fuel for premixed-charge compression ignition combustion into the combustion chamber and start of the cool flame, wherein the cool-flame-heat-generation-quantity estimation means is configured to estimate the cool-flame-heat-generation-quantity-corresponding value in consideration of the estimated value representing the degree of dispersion.

7. A gas-mixture-ignition-time estimation apparatus for an internal combustion engine according to claim 1, wherein the premixed-gas-mixture-autoignition-start-time estimation means is configured to complete estimation of the premixed-gas-mixture autoignition start time at a predetermined point in time after start of compression of the cylinder interior gas and before start of injection of the fuel for premixed-charge compression ignition combustion.

8. A control apparatus for an internal combustion engine, comprising:
data storage means for storing data which define the relation between an operation state quantity of the internal combustion engine and a range of the autoignition start time of the premixed gas mixture for bringing the internal combustion engine into a state suitable for premixed-charge compression ignition combustion;
operation state quantity acquisition means for acquiring the operation state quantity of the internal combustion engine;
determination means for determining whether the premixed-gas-mixture autoignition start time in the present operation cycle estimated by means of the gas-mixture-ignition-time estimation apparatus for an internal combustion engine according to claim 7 falls within the range of the autoignition start time of the premixed gas mixture obtained on the basis of the acquired operation state quantity of the engine and the data; and
fuel injection mode control means for controlling a fuel injection mode in the present operation cycle on the basis of the results of determination by the determination means.

9. A control apparatus for an internal combustion engine according to claim 8, further comprising data correction means for correcting the data in accordance with at least one of the oxygen concentration of an intake gas taken into a combustion chamber and the quantity of a gas within the combustion chamber.

10. A control apparatus for an internal combustion engine according to claim 8, wherein
when the estimated premixed-gas-mixture autoignition start time in the present operation cycle falls within the obtained range of the autoignition start time of the premixed gas mixture, the fuel injection mode control means injects into the combustion chamber the entire fuel of a demanded fuel injection quantity determined in accordance with the operation state quantity as fuel for premixed-charge compression ignition combustion earlier than a near compression top dead center;
when the estimated premixed-gas-mixture autoignition start time in the present operation cycle deviates from the obtained range of the autoignition start time of the premixed gas mixture in a delaying direction, the fuel injection mode control means injects into the combustion chamber the entire fuel of the demanded fuel injection quantity as fuel for diffusion combustion at the near compression top dead center; and
when the estimated premixed-gas-mixture autoignition start time in the present operation cycle deviates from the obtained range of the autoignition start time of the premixed gas mixture in an advancing direction, the fuel injection mode control means injects into the combustion chamber a predetermined quantity of fuel, which is a portion of the fuel of the demanded fuel injection quantity, as the fuel for premixed-charge compression ignition combustion earlier than the near compression top dead center, and injects the remaining portion of the fuel of the demanded fuel injection quantity as the fuel for diffusion combustion at the near compression top dead center.

11. A control apparatus for an internal combustion engine according to claim 10, wherein when the estimated premixed-gas-mixture autoignition start time in the present operation cycle deviates from the obtained range of the autoignition start time of the premixed gas mixture in an advancing direction, the fuel injection mode control means sets the predetermined quantity of the fuel injected as the fuel for premixed-charge compression ignition combustion to a fuel injection quantity for premixed-charge compression ignition combustion which is necessary to bring the estimated premixed-gas-mixture autoignition start time in the present operation cycle to the obtained range of the autoignition start time of the premixed gas mixture.

12. A control apparatus for an internal combustion engine according to claim 8, further comprising nonuniformity degree estimation means for estimating a value representing the degree of nonuniformity of the premixed gas mixture at the time of start of the cool flame, wherein the determination means performs the determination in consideration of the value representing the nonuniformity degree of the premixed gas mixture.

13. A control apparatus for an internal combustion engine according to claim 8, wherein
when the estimated premixed-gas-mixture autoignition start time in the present operation cycle falls within the obtained range of the autoignition start time of the premixed gas mixture, the fuel injection mode control means injects into the combustion chamber the entirety of fuel of the demanded fuel injection quantity determined in accordance with the operation state quantity as fuel for premixed-charge compression ignition combustion from a predetermined injection start time which is determined in accordance with the operation state quantity and is earlier than a near compression top dead center; and
when the estimated premixed-gas-mixture autoignition start time in the present operation cycle falls outside the obtained range of the autoignition start time of the premixed gas mixture, the fuel injection mode control means corrects the predetermined injection start time in order to bring the actual premixed-gas-mixture autoignition start time in the present operation cycle into the obtained range of the autoignition start time of the premixed gas mixture, and injects into the combustion chamber the entirety of fuel of the demanded fuel injection quantity determined in accordance with the operation state quantity as the fuel for premixed-charge compression ignition combustion from the corrected injection start time.

14. A control apparatus for an internal combustion engine according to claim 8, wherein when the estimated premixed-gas-mixture autoignition start time in the present operation cycle falls within the obtained range of the autoignition start time of the premixed gas mixture, the fuel injection mode control means injects into the combustion chamber the entirety of fuel of the demanded fuel injection quantity determined in accordance with the operation state quantity as fuel for premixed-charge compression ignition combustion earlier than a near compression top dead center and under a predetermined injection pressure determined in accordance with the operation state quantity; and when the estimated premixed-gas-mixture autoignition start time in the present operation cycle falls outside the obtained range of the autoignition start time of the premixed gas mixture, the fuel injection mode control means corrects the predetermined injection pressure in order to bring the actual premixed-gas-mixture autoignition start time in the present operation cycle into the obtained range of the autoignition start time of the premixed gas mixture, and injects into the combustion chamber the entirety of fuel of the demanded fuel injection quantity determined in accordance with the operation state quantity as the fuel for premixed-charge compression ignition combustion earlier than the near compression top dead center and under the corrected predetermined injection pressure.

15. A control apparatus for an internal combustion engine according to claim 8, comprising, in place of the fuel injection mode control means, premixed-gas-mixture temperature adjustment means, wherein when the estimated premixed-gas-mixture autoignition start time in the present operation cycle falls outside the obtained range of the autoignition start time of the premixed gas mixture, the premixed-gas-mixture temperature adjustment means increases or decreases the temperature of the premixed gas mixture in the present operation cycle by a predetermined amount in order to bring the actual premixed-gas-mixture autoignition start time in the present operation cycle into the obtained range of the autoignition start time of the premixed gas mixture.

* * * * *